United States Patent
Hisada et al.

(10) Patent No.: US 6,743,320 B2
(45) Date of Patent: Jun. 1, 2004

(54) METHOD AND APPARATUS OF OPTICAL INFORMATION RECORDING MEDIUM, AND OPTICAL INFORMATION RECORDING MEDIUM

(75) Inventors: Kazuya Hisada, Osaka (JP); Kazuhiro Hayashi, Kadoma (JP); Eiji Ohno, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/950,079

(22) Filed: Sep. 12, 2001

(65) Prior Publication Data

US 2002/0031632 A1 Mar. 14, 2002

(30) Foreign Application Priority Data

Sep. 12, 2000 (JP) ........................................ 2000-275986
Sep. 22, 2000 (JP) ........................................ 2000-288345
Dec. 28, 2000 (JP) ........................................ 2000-400442

(51) Int. Cl.$^7$ .......................... B29C 35/08; B32B 31/28; B32B 33/00
(52) U.S. Cl. ..................... 156/233; 156/246; 156/275.5; 156/275.7; 156/286; 156/289; 369/275.2; 369/275.4
(58) Field of Search ........................ 156/74, 242, 246, 156/272.2, 233.7, 275.5, 275.7, 285, 286, 289; 369/275.1–275.5

(56) References Cited

U.S. PATENT DOCUMENTS

| | | | | | |
|---|---|---|---|---|---|
| 5,200,120 A | * | 4/1993 | Sakai | ....................... | 264/1.33 |
| 5,608,715 A | * | 3/1997 | Yokogawa et al. | ....... | 369/275.1 |
| 6,309,496 B1 | * | 10/2001 | Van Hoof | .................... | 156/230 |
| 6,312,547 B1 | * | 11/2001 | Fujimori et al. | ............ | 156/242 |
| 6,599,385 B1 | * | 7/2003 | Liao et al. | ................ | 156/272.2 |

* cited by examiner

Primary Examiner—Curtis Mayes
Assistant Examiner—Sing P Chan
(74) Attorney, Agent, or Firm—Wenderoth, Lind & Ponack, L.L.P.

(57) ABSTRACT

An optical disk is manufactured by bonding a resin stamper having, on a principal plane, asperity pits on which a thin film is formed and a second substrate having a thickness of 0.3 mm or less with radiation cured resin such that the asperity pits face to the second substrate. The resin stamper is peeled off after curing the radiation cured resin to form asperity pits on the second substrate. A metal film is formed on the asperity pits on the second substrate to attain an information recording layer on the second substrate. A first substrate having an information recording layer and the second substrate having the formed information recording layer are bonded such that the both information recording layers face each other.

131 Claims, 36 Drawing Sheets

S1 | BOND RESIN STAMPER HAVING GROOVE OR ASPERITY PITS ON WHICH A THIN FILM IS FORMED AND SECOND SUBSTRATE WITH RADIATION CURED RESIN

S2 | PEEL RESIN STAMPER OFF SECOND SUBSTRATE TO FORM GROOVE OR ASPERITY PITS ON FIRST SUBSTRATE

S3 | FORM REFLECTIVE FILM OR RECORDING FILM ON GROOVE OR ASPERITY PITS ON SECOND SUBSTRATE

S4 | BOND FIRST AND SECOND SUBSTRATES

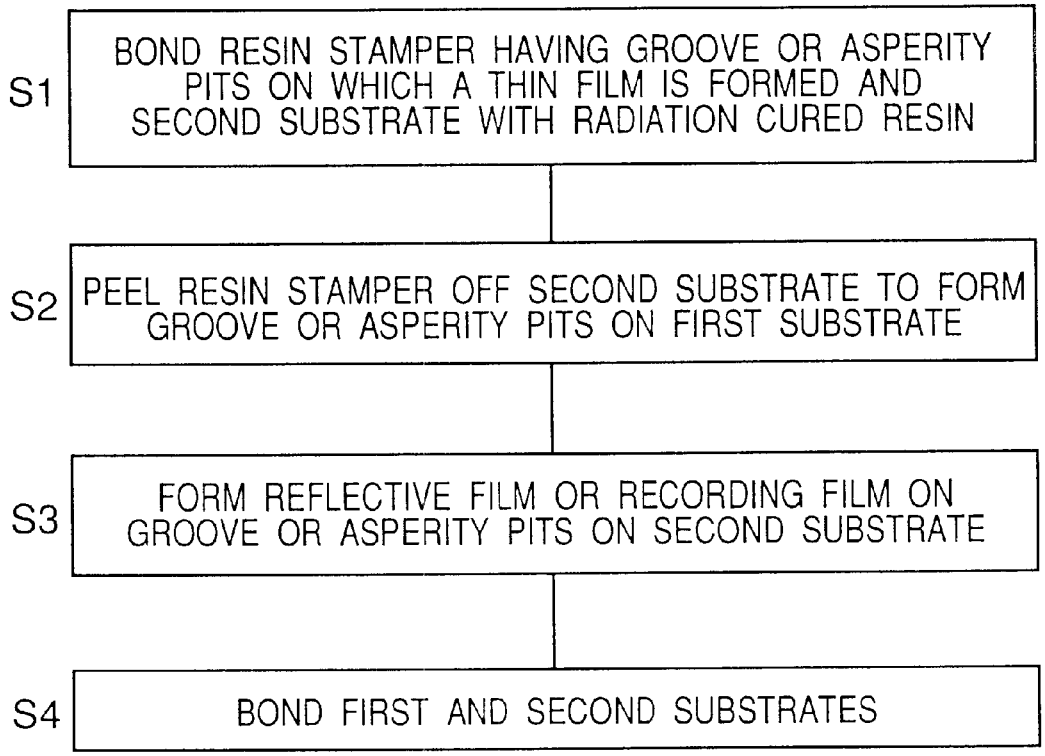

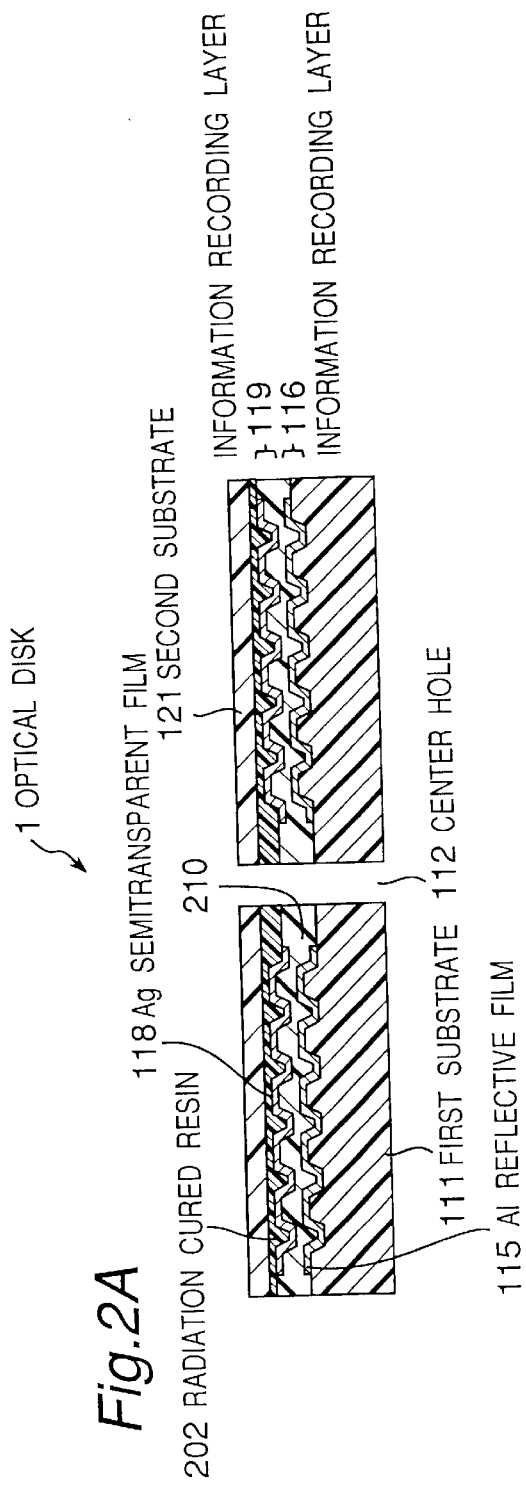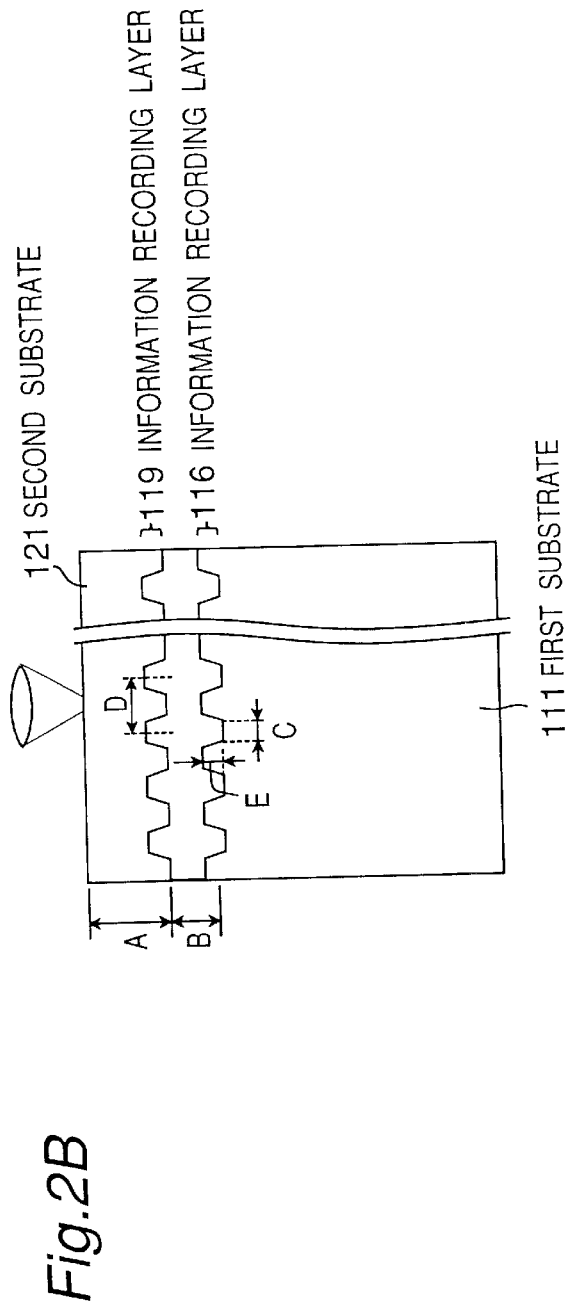

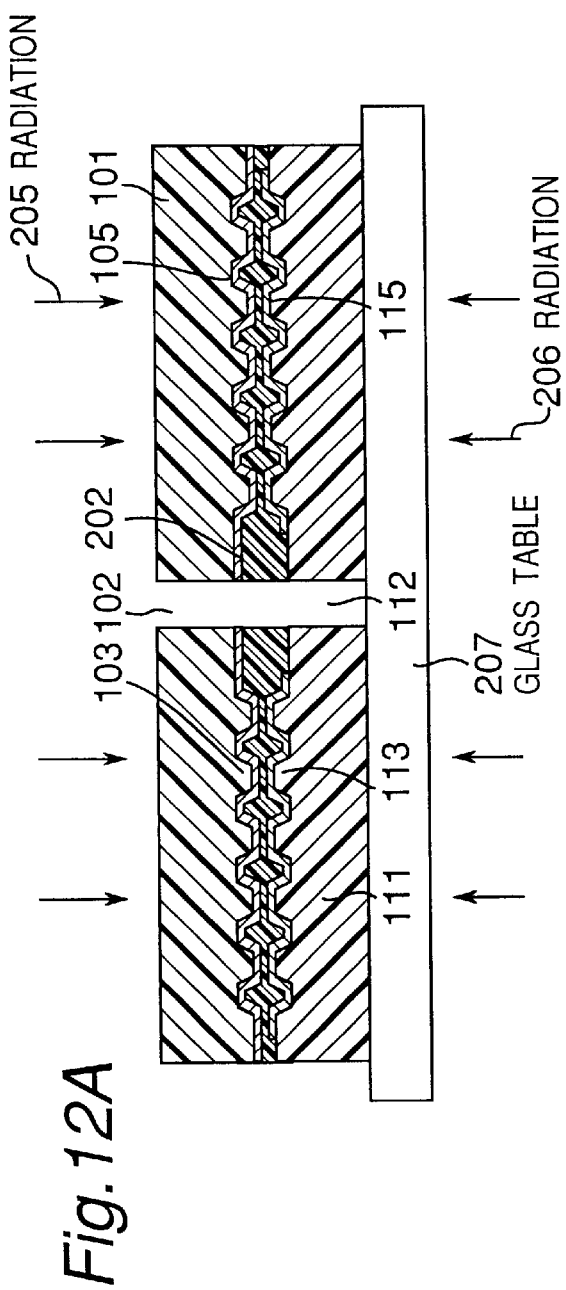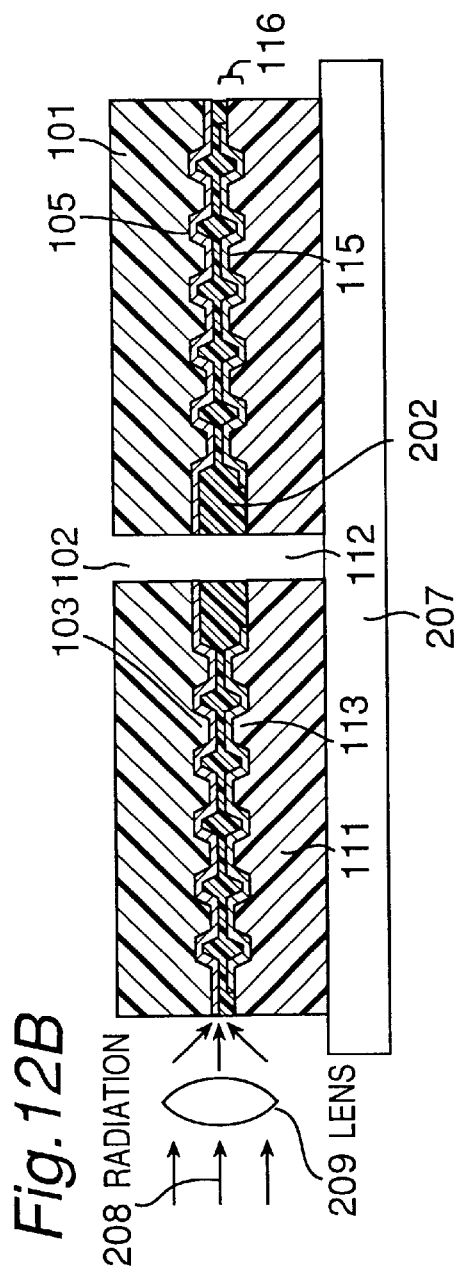

111  113   112  114   115

118 Ag SEMITRANSPARENT FILM 111  113   112  114   115

} 119
} 116

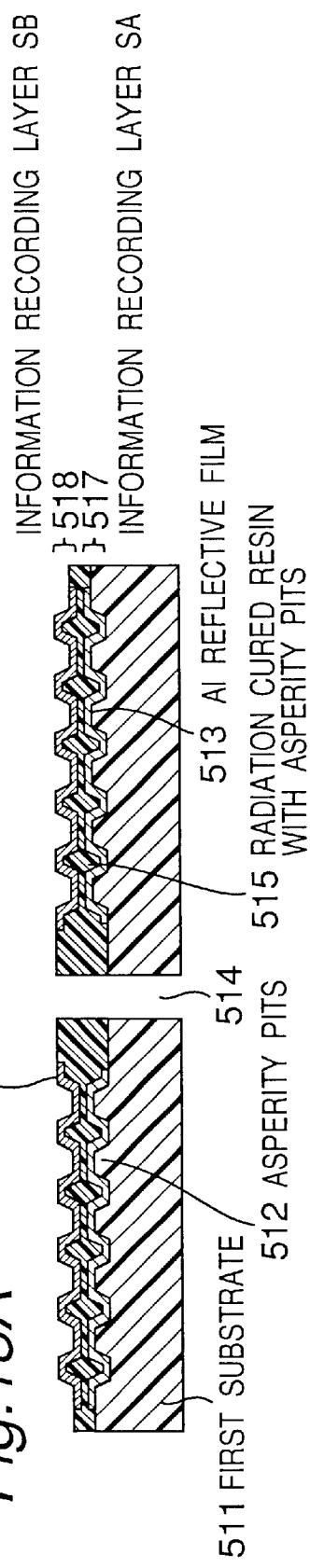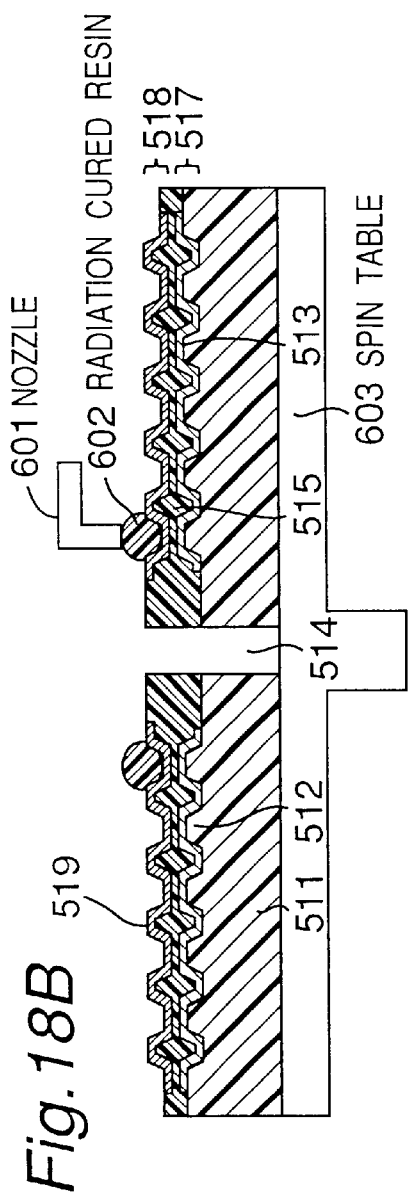
Fig. 18A
Fig. 18B

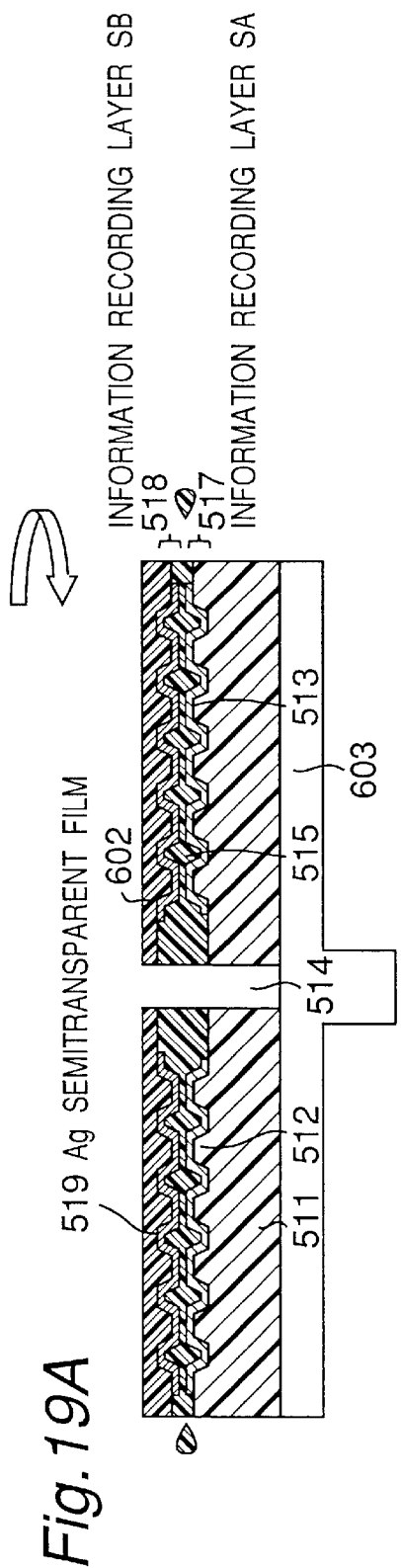
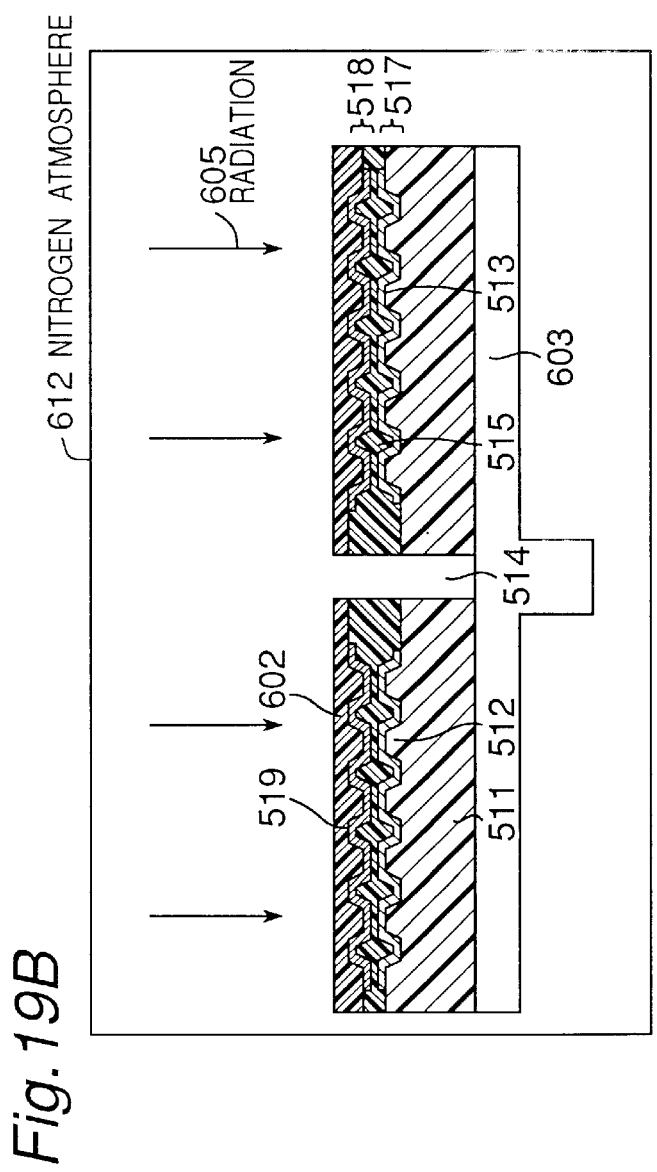
Fig. 19A
Fig. 19B

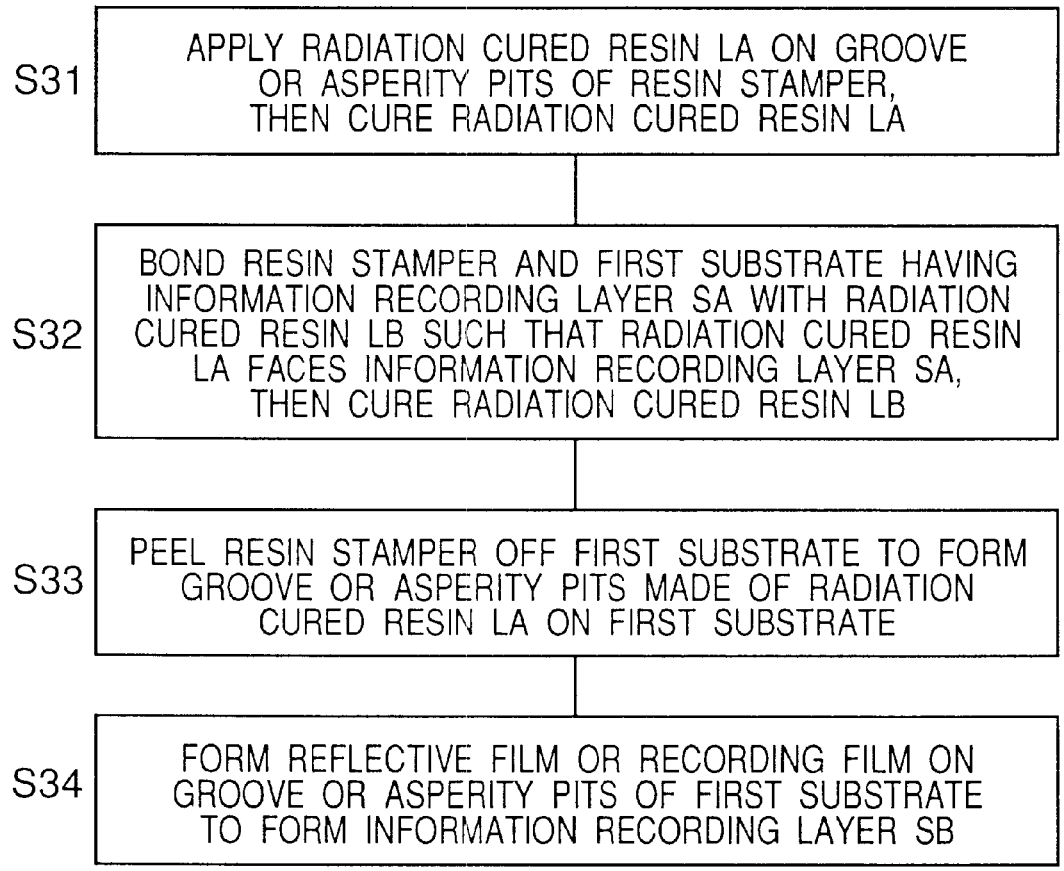

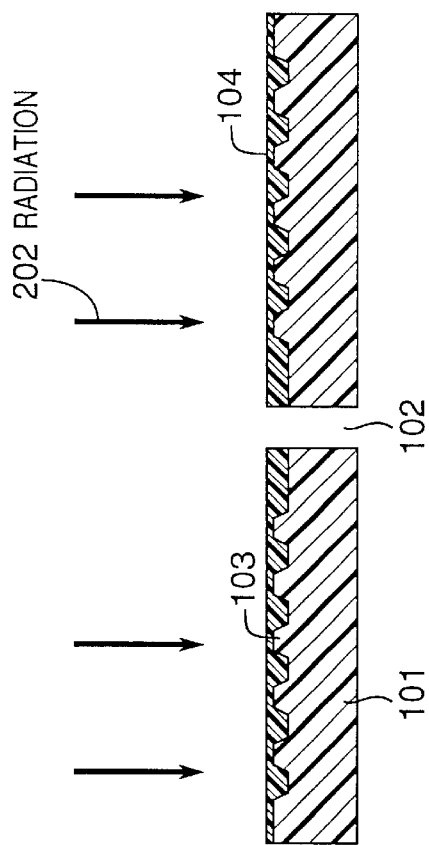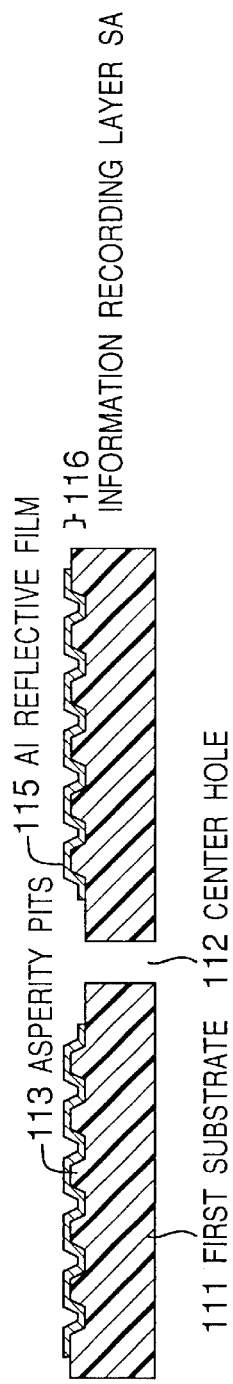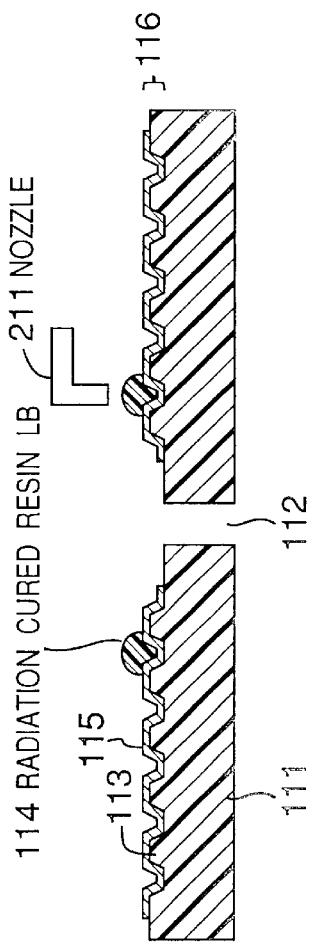

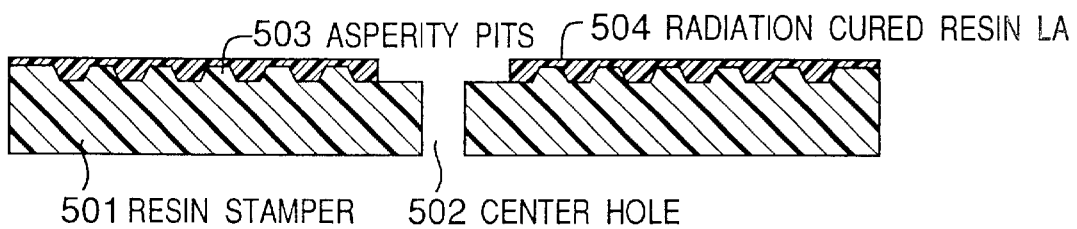
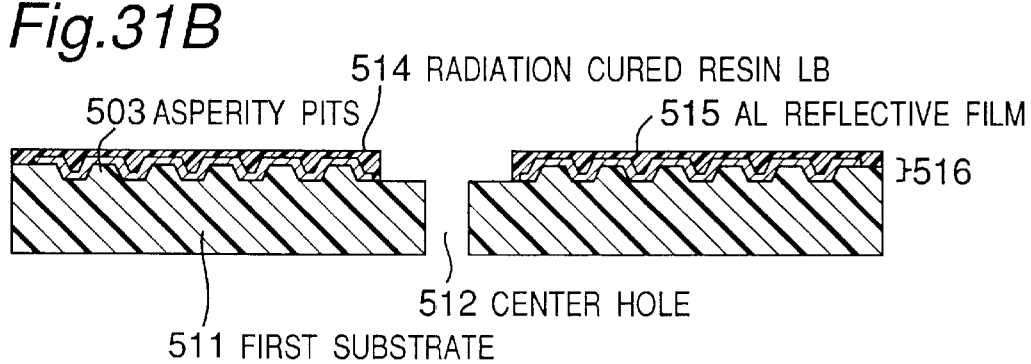
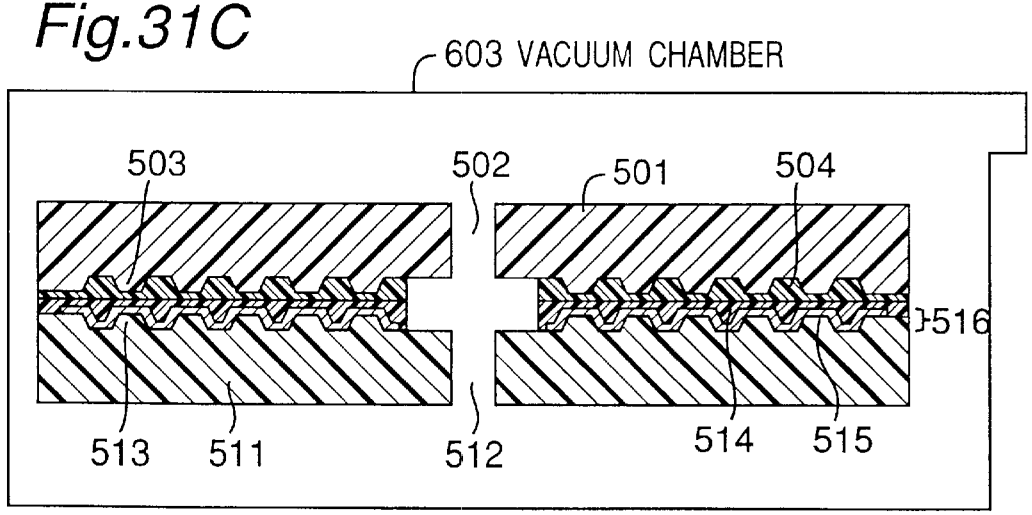

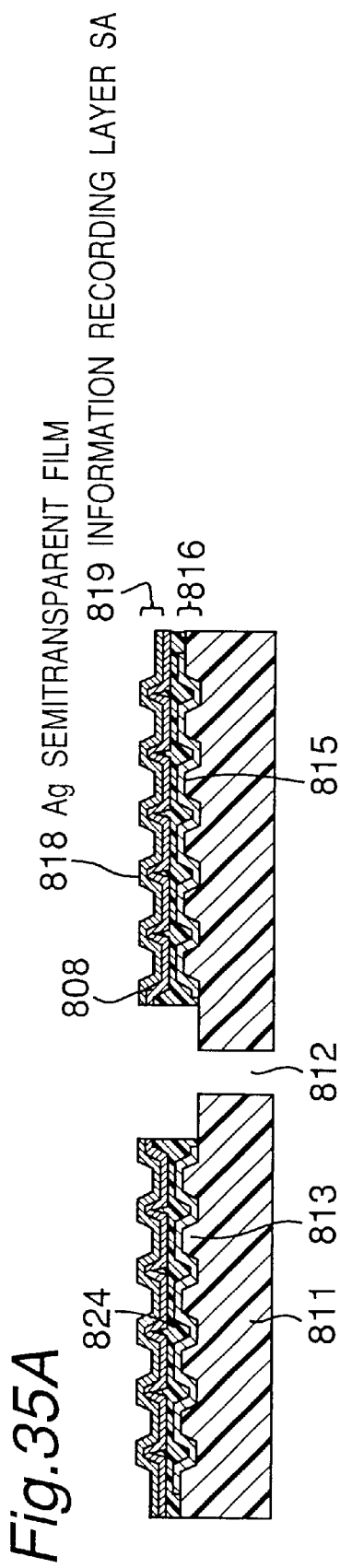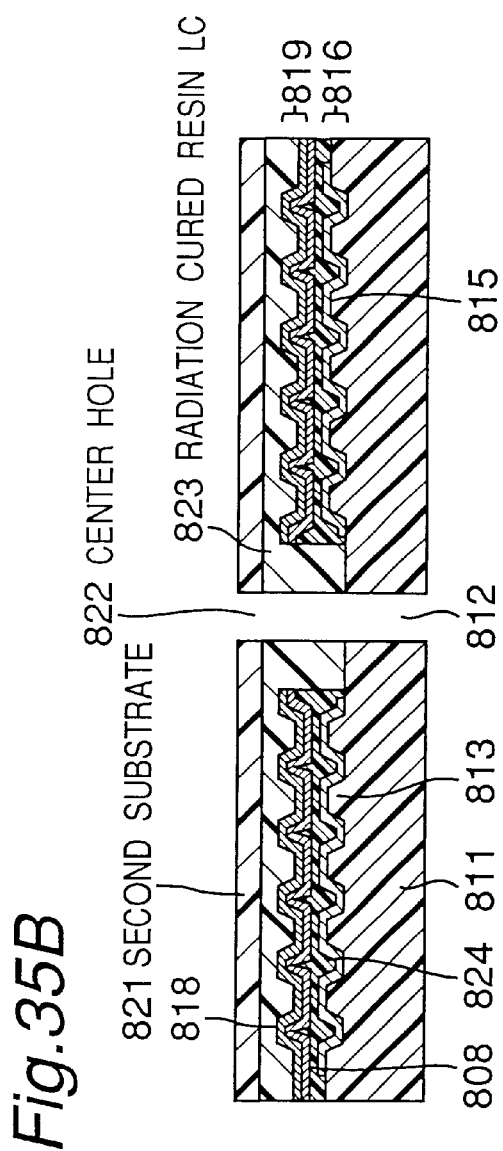

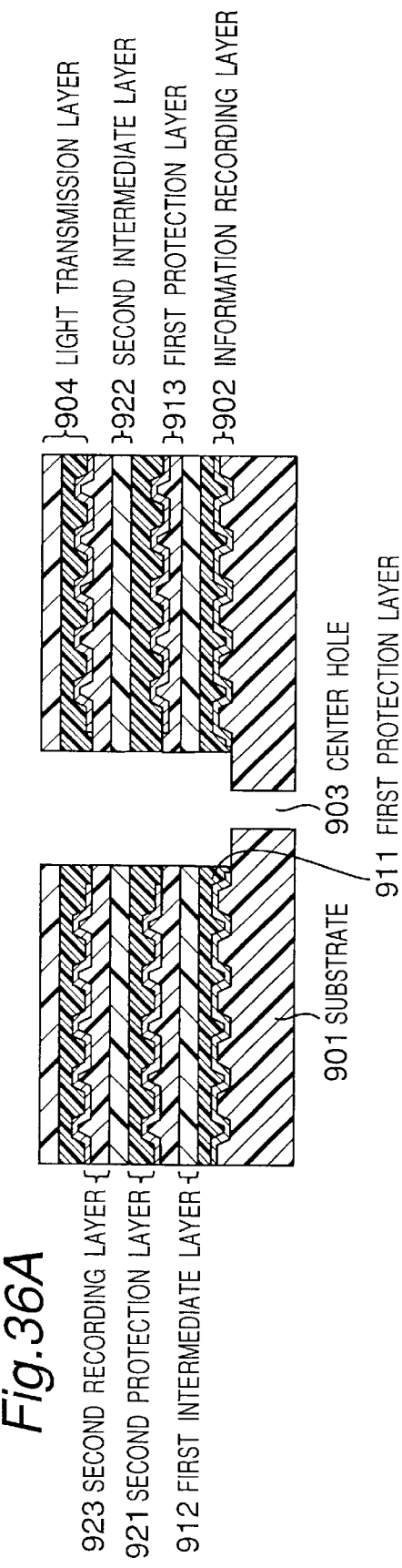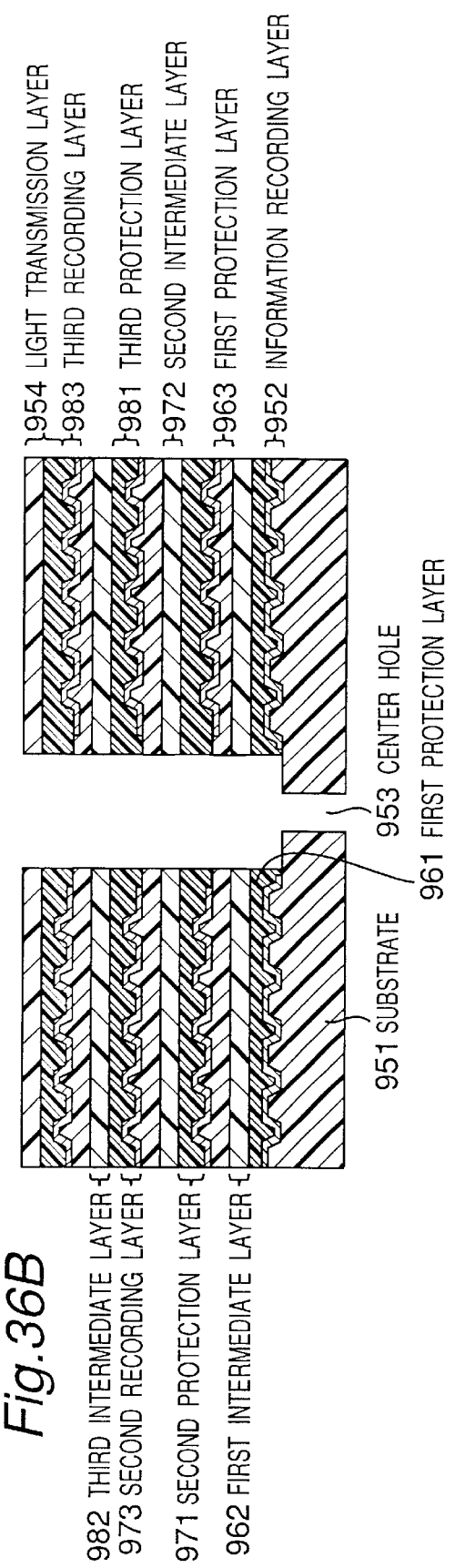

METHOD AND APPARATUS OF OPTICAL INFORMATION RECORDING MEDIUM, AND OPTICAL INFORMATION RECORDING MEDIUM

BACKGROUND OF THE INVENTION

1. Field of the Invention

The present invention relates to a manufacturing method and an optical information recording medium, and more specifically relates to a multilayer manufacturing method and a multilayer optical information recording medium.

2. Description of the Prior Art

In recent years, various types of optical information recording technology have been studied. According to the optical information recording, high density recording and non-contact recording/reproduction can be realized at a low cost. The method therefore has begun to be applied to various technical fields. An optical disk is used as a medium for the optical information recording. Optical disks are roughly classified into three types: read-only type; additional written type; and rewritable type. All the types of optical disks are commercialized and widely distributed. For example, the read-only type disk is distributed as a disk called as a compact disk (CD) on which music data is recorded or a laser disk (LD) on which image data is recorded. The additional written type disk is used for a document file or a still picture file. The rewritable type disk is used for a data file for a personal computer, or the like. The optical disk is formed in a structure in which an information recording layer is formed on a transparent resin substrate having a thickness of 1.2 mm and covered with an overcoat layer, or a structure in which an information recording layer is formed on one side or both sides of a transparent resin substrate having a thickness of 1.2 mm and the two substrates are bonded to each other.

In addition thereto, a digital versatile disk (DVD) having a larger capacity has been developed and commercialized to record not only audio data, but also video data such as a movie, and has begun to be popularized. In order to realize a high-density optical disk, a laser light beam having a short wavelength and an objective lens having a large numerical aperture (NA) are used. With use of the laser light beam having a short wavelength and the objective lens having a large NA, however, the tolerance of the inclination angle (tilt) of the disk to the incident direction of the laser beam will be decreased. In order to increase the tolerance of the tilt of the disk, it is effective to decrease the substrate in thickness. For example, in a DVD, the laser beam of the wavelength of 650 nm, and NA of 0.60, and the disk of the thickness of 0.6 mm are used. The resin substrate of 0.6 mm thick has poor mechanical strength and generates a tilt, and thus the DVD is formed by bonding two substrates to each other such that information recording face thereof is inside.

On the other hand, "a one side face reproduction and double layer DVD" has been also put into practical use, in which one substrate having a transparent reflective layer formed of gold, silicon, or the like on the information recording face and another substrate having a reflective layer formed of aluminum or the like on the information recording face are bonded each other such that the information recording faces thereof are bonded each other. For that DVD, the data on the information recording faces are reproduced by emitting a laser beam from the substrate side provided with the transparent reflective layer. Also, a rewritable DVD having the double layer structure as mentioned above in which a rewritable thin film recording layer is formed on the information recording face instead of a metal reflective layer, is also proposed.

Recently, the amount of the information grows larger as exemplarily seen in high definition television broadcasting, and therefore, the recording medium having high density is further required. In order to increase the recording density of the optical disk, various methods have been proposed: forming of the disk having a multilayer structure of more than three layers; increasing the NA of the objective lens; and using a blue-violet laser beam. As the method of forming the multilayer structure, a signal transferring (2P method) using a metal stamper has been widely used.

When the optical disk is formed to the multilayer structure, however, it is difficult to form an information recording face other than that having a groove or asperity pits formed by injection molding. It is proposed to decrease the recording/reproducing substrate in thickness and set the NA at 0.85, and the wavelength of the laser beam at 400 nm because the thinner the recording/reproducing substrate the larger the tolerance of the tilt of the disk, as described before. In a case where the recording/reproducing substrate is formed thinner than 0.3 mm that is the limit to form the groove or pits by the injection molding, the double layer structure cannot be easily formed. Also with use of the metal stamper, some problems will occur because a radiation cured resin film for transferring a signal recording face onto the disk cannot be easily formed uniformly, a radiation cured resin film cannot be formed uniformly and the radiation can not pass easily through the stamper. There are also some problems such that the radiation cured resin cannot be easily cured, a disk manufacturing apparatus is inevitably formed large, and signal transferring requires a long time.

SUMMARY OF THE INVENTION

The present invention intends to provide a manufacturing method of an optical information recording medium and an optical information recording medium having a multilayer structure, and more specifically, the optical information recording medium having a multi optical information recording layer and a thinner recording/reproducing substrate.

In a first aspect of the invention, provided is a method of manufacturing an optical information recording medium. The method comprises bonding a stamper having a principal plane formed with a groove or asperity pits and a second substrate having a thickness of 0.3 mm or less with radiation cured resin so as to cause the groove or the asperity pits to face to the second substrate, the stamper being transparent, the groove or asperity pits having a thin film formed thereon, curing the radiation cured resin, peeling off the stamper to form the groove or the asperity pits on the second substrate, forming a metal film or a recording film on the groove or the asperity pits on the second substrate to create a second information recording layer on the second substrate, and bonding a first substrate and the second substrate on which the second information recording layer is formed, such that the information recording layers are placed between the first and second substrates.

According to the above-mentioned manufacturing method, the optical disk having information recording layers can be formed on the substrate having a thickness of 0.3 mm or less which cannot be formed by the injection molding. Further, when the first substrate is provided with an information recording layer, the optical disk having a double layer structure can be attained.

According to the above-mentioned first manufacturing method, the stamper may be formed by injection molding. With this method, the disk can be formed at a low cost by the conventional optical disk manufacturing apparatus.

Preferably the stamper may be made of resin material, and more specifically, polycarbonate. With this method, a light and low-cost stamper can be attained. With this stamper, the radiation cured resin can be uniformly spread by spinning after overlapping the stamper and the first substrate by the radiation cured resin.

In the above-mentioned method, a metal film or a semi-metal film may be formed on the information recording layer of the stamper. With this method, the stamper can be easily peeled off the first substrate.

The metal film may be formed from Al or metal mainly composed of Al. Thus, the stamper can be easily peeled off at a low cost. Further, the semimetal film of the information recording layer of the stamper may be formed from Si (silicon) or metal mainly composed of Si, and the manufacturing at lower cost can be attained.

In the above-mentioned first manufacturing method, the thin film may be applied with release agent thereon. With this method, the stamper can be more easily peeled off.

According to the above-mentioned first manufacturing method, the thickness of the second substrate may be substantially 0.1 mm. With this constitution, especially, when the objective lens of the pick-up has a large N.A., the high density optical disk can have the tilt margin equal to the conventional DVD.

In the above-mentioned first manufacturing method, the thickness at a clamp portion after the first substrate and the second substrate are bonded each other may be substantially 1.2 mm. With this constitution, compatibility to the conventional DVD and CD in a thickness of the clamp portion can be attained.

In the above-mentioned first manufacturing method, the thickness of the stamper may be substantially equal to that of the first substrate. With this constitution, both the stamper and the first substrate can be manufactured by substantially the same apparatus.

In the above-mentioned first manufacturing method, the center holes of the stamper and the second substrate may have different diameters. With this constitution, the stamper can be easily peeled off the first substrate.

In the above-mentioned first manufacturing method, each of the stamper and the second substrate may be different in outer diameter. With this constitution, the stamper can be easily peeled off the first substrate.

In the above-mentioned first manufacturing method, the second substrate having the information recording layer may be bonded with a supporting substrate on a face opposite to the face on which the information recording layer is formed, and a reflective film or a recording film is deposited on the information recording layer. With this constitution, the strength of the stamper having a thickness as thin as 0.3 mm or less can be increased to help the handling and film-forming.

In the above-mentioned first manufacturing method, it is preferable that a sum of thicknesses of the second substrate and the supporting substrate is substantially equal to that of the stamper or the first substrate. With this constitution, the manufacturing can be performed by substantially the same apparatus used for the film deposition of the stamper or the first substrate.

In a second aspect of the invention, provided is a method of manufacturing an optical information recording medium. The method comprises bonding a stamper having a principal plane formed with a groove or asperity pits and a first substrate having a first information recording layer with radiation cured resin so as to cause the groove or the asperity pits to face to the first information recording layer, the stamper being transparent, curing the radiation cured resin, peeling off the stamper to form the groove or the asperity pits on the first information recording layer of the first substrate, forming a metal film or a recording film over the groove or the asperity pits on the first substrate to create a second information recording layer on the first substrate, and forming a light transmission layer over the second information recording layer.

This method can produce an optical disk having plural information recording layers. The stamper is formed of light and flexible resin, and thus can be easily handled. Therefore, the radiation cured resin for transmitting signal pits can be spread substantially uniformly on the substrate by rotating the substrate with the spin-coating. The stamper can be easily handled and formed in mass production at a low manufacturing cost in comparison with the metal stamper.

In the above-mentioned second manufacturing method, the thickness of the light transmission layer may be 0.3 mm or less. With this structure, the NA of the recording/reproducing optical system can be easily increased, thereby the recording density of the optical disk can be increased.

In the above-mentioned second manufacturing method, the thickness of the light transmission layer may be substantially 0.1 mm. With this structure, the optical disk can maintain the tilt margin equal to that of the DVD even if the NA of the recording/reproducing optical system is increased to around 0.9.

In the above-mentioned second manufacturing method, the light transmission layer may be formed of radiation cured resin. By forming the layer in this manner, the layer can be manufactured at a low cost.

In the above-mentioned second manufacturing method, the light transmission layer may be formed by bonding the first and second substrates. By forming the layer in this manner, the variety of the light transmission layer can be suppressed.

In the above-mentioned second manufacturing method, the stamper may be formed by injection molding. With this method, the disk can be formed at a low cost by the conventional optical disk manufacturing apparatus.

In the above-mentioned second manufacturing method, the stamper may be formed from resin material, and more specifically, polycarbonate.

By forming the stamper from polycarbonate, a light and low-cost stamper can be attained. With this stamper, the radiation cured resin can be uniformly spread by spinning after overlapping the stamper and the first substrate by the radiation cured resin.

Further, the first substrate and the stamper are bonded in a vacuum, and no bubbles may be inserted.

In the above-mentioned second manufacturing method, the thin film may be applied with release agent thereon. With this method, the stamper can be more easily peeled off, and the transferring of the groove and the pits can be improved.

In the above-mentioned second manufacturing method, a thin film may be formed on the groove or asperity pits of the stamper. By forming the thin film, the stamper can be more easily peeled off.

In the above-mentioned second manufacturing method, the thin film may be a metal film or a dielectric film. With this method, if the Si is used as the metal, the manufacturing at lower cost can be attained. Further, the thin film is applied with release agent, and thus the stamper can be more easily peeled off.

In the above-mentioned second manufacturing method, radiation may be emitted substantially parallel to the principal plane of the stamper when the radiation cured resin is cured after the stamper and the first substrate are integrated by the radiation cured resin. With this method, the radiation cured resin can be cured even if the stamper and the first substrate have principal planes with poor radiation transmittance.

In the above-mentioned second manufacturing method, the thickness at a clamp portion may be substantially 1.2 mm. With this constitution, the interchangeability to the conventional DVD and CD in the thickness of the claim portion can be attained.

In the above-mentioned second manufacturing method, the thickness of the stamper may be substantially equal to that of the first substrate. With this constitution, both the stamper and the first substrate can be manufactured by substantially the same apparatus.

In the above-mentioned second manufacturing method, the center holes of the stamper and the first substrate may have substantially the same diameter. With this constitution, the center of the groove or asperity pits of the stamper can be aligned to the center of the signal recording layer of the first substrate by aligning the center holes.

In the above-mentioned second manufacturing method, it is preferable that each of the stamper and the first substrate are different in outer diameter. With this constitution, the stamper can be easily peeled off the first substrate.

In the third aspect of the invention, provided is a method of manufacturing an optical information recording medium. The method comprises: applying first radiation cured resin onto a groove or asperity pits formed on a principal plane of a stamper; bonding the stamper and a first substrate having a principal plane on which a first information recording layer is formed with second radiation cured resin such that the first radiation cured resin and the first information recording layer face each other, and curing the second radiation cured resin; peeling off the stamper to form a groove or asperity pits made of the first radiation cured resin on the first substrate; and forming a reflective film or a recording film on the groove or the asperity pits on the first substrate to make a second information recording layer.

With this method, the multilayered optical disk can be easily formed even if the disk has a thin recording/reproducing side substrate. Since the stamper is formed of light and flexible resin, it can be easily handled. Therefore, the radiation cured resin for transmitting signal pits can be spread substantially uniformly on the substrate by rotating the substrate with the use of the spin-coating. The stamper can be easily handled and formed in mass production at a low manufacturing cost in comparing with the metal stamper.

In the fourth aspect of the invention, provided is a method of manufacturing an optical information recording medium. The method comprises: applying second radiation cured resin onto a first information recording layer formed on a principal plane of a first substrate, and curing the second resin; bonding a stamper having a principal plane formed with a groove or asperity pits and the first substrate with first radiation cured resin such that the groove or asperity pits and the second resin face each other, and curing the first radiation cured resin; peeling off the stamper to form groove or asperity pits made of the first radiation cured resin on the first substrate; and forming a reflective film or a recording film on the groove or the asperity pits on the first substrate to make a second information recording layer.

With this manufacturing method, equivalent advantages to those described for the first method can be attained.

In the fifth aspect of the invention, provided is a method of manufacturing an optical information recording medium. The method comprises: applying first radiation cured resin onto a groove or asperity pits formed on a principal plane of a stamper; applying second radiation cured resin onto a first information recording layer formed on a principal plane of a first substrate; bonding the stamper and the first substrate such that the first radiation cured resin and the second radiation cured resin face each other, and curing the first and second radiation cured resin; peeling off the stamper to form a groove or asperity pits made of the first radiation cured resin on the first substrate; and forming a reflective film or a recording film over the groove or the asperity pits on the first substrate to form a second information recording layer.

With this manufacturing method, equivalent advantages to those described for the first method can be attained.

In the sixth aspect of the invention, provided is a method of manufacturing an optical information recording medium. The method comprises: forming a first thin film comprising at least one layer on a groove or asperity pits formed on a principal plane of a stamper; forming a second thin film comprising at least one layer over the first thin film; bonding the stamper and a first substrate having a principal plane on which a first information recording layer is formed with radiation cured resin such that the second thin film and the first information recording layer face each other; peeling off the stamper and the first substrate at an interface of the first and second thin films to form a groove or asperity pits made of the second thin film on the first substrate; and forming a reflective film or recording film on the groove or the asperity pits on the first substrate to form a second information recording layer.

In the above-mentioned the third to sixth manufacturing methods, third radiation cured resin may be applied on the first information recording layer SA of the first substrate in advance, and the third radiation cured resin HC is cured. In this manner, the first information recording layer SA can be prevented from being damaged when the stamper is peeled off. Especially, this is more effective for a case where the first information recording layer SA is a rewritable recording layer comprising a plurality of thin films, since the thin films may have poor strength. The advantage of protecting the first information recording layer SA from deterioration such as corrosion can also be attained.

Further, the third radiation cured resin may have a pencil hardness of B or more. The first information recording layer SA can be thereby prevented from being damaged. The third radiation cured resin HC also may be applied at least from an inner peripheral edge to an outer peripheral edge of the first information recording layer. By applying the resin HC in this manner, the resin HC can function effectively.

In the above-mentioned third to sixth manufacturing methods, a light transmission layer may be formed on the second information recording layer SB. By forming this layer, the second information recording layer SB can be protected. The thickness of the light transmission layer may be 0.3 mm or less. By forming the layer so thick, the wavelength of the light emitted from the recording/reproducing optical system can be shortened, and the NA can be easily increased. Further, the optical disk having information recording layers can be formed on the substrate having a thickness of 0.3 mm or less which cannot be formed by injection molding, and the optical disk having high density can be attained.

Further, the thickness of the light transmission layer may be substantially 0.1 mm. With this structure, the optical disk can maintain the tilt margin equal to that of the DVD even if the NA of the recording/reproducing optical system is increased to around 0.9. Also, the light transmission layer may be formed of radiation cured resin. With this method, the disk can be formed at a low cost. Further, the light transmission layer may be formed of radiation cured resin and a resin substrate. By forming the layer in this manner, the variety of the light transmission layer in thickness can be suppressed, and the layer can be easily formed.

In the above-mentioned the third to fifth manufacturing methods, it is preferable that the stamper transmits at least one of radiations having wavelengths for curing the first or second radiation cured resin LA or LB. In the above-mentioned the fourth manufacturing method, the stamper and the first and second thin films FA and FB may transmit at least one of radiations having wavelengths for curing the first or second radiation cured resin. With this method, the first radiation cured resin LA, the second radiation cured resin LB, or the radiation cured resin can be cured even if radiation cannot transmit through the first substrate or the information recording layer SA.

In the above-mentioned the third to fifth manufacturing methods, the stamper may be formed from resin material. The stamper is formed of light and flexible resin in comparison with the metal stamper. Therefore, the radiation cured resin for transmitting signal pits can be spread substantially uniformly on the substrate by rotating the substrate with use of the spin-coating employed for DVD manufacturing, not by applying a high pressure as in the 2P method employed for the metal stamper or taking a long period of time, and can be easily handled. The stamper can be easily handled and formed in mass production by the injection molding at a low manufacturing cost in comparison with the metal stamper. It is difficult to prepare a lot of spare metal stampers, and thus the replacing of the stamper is troublesome.

The stamper may be formed by injection molding. With this method, the disk can be formed at a low cost by the conventional optical disk manufacturing apparatus. The stamper may be formed mainly of polycarbonate. With this method, the disk can be formed by the conventional optical disk manufacturing apparatus.

In the above-mentioned the third, fourth, and sixth manufacturing methods, the radiation cured resin may be spread by spinning after overlapping the stamper and the first substrate by the radiation cured resin in order to uniformly spread the radiation cured resin. By forming the stamper from resin material, a light and low-cost stamper can be attained. With this method, the disk can be formed by the conventional manufacturing apparatus employed for adhesion of the DVD. Further, the first substrate and the stamper may be bonded in a vacuum, and thus no bubbles may be inserted. In addition, the radiation cured resin and the stamper can be stuck more strongly, and the transferability can be improved.

In the above-mentioned the third manufacturing method, an inner diameter of the first radiation cured resin LA may be smaller than an inner diameter of the second radiation cured resin LB. By applying resin in this manner, the second radiation cured resin LB will not adhere to the stamper in the inner peripheral portion, and thus the stamper can be easily peeled off the first substrate.

In the above-mentioned third and fifth manufacturing methods, the first radiation cured resin LA may be applied toward an outer peripheral edge of the stamper. By applying resin in this manner, the second radiation cured resin LB will be prevented from contacting with the stamper in the inner peripheral portion, and thus the stamper can be easily peeled off the first substrate.

In the above-mentioned fourth manufacturing method, an inner diameter of the second radiation cured resin LB is smaller than an inner diameter of the first radiation cured resin LA. By applying resin in this manner, the first radiation cured resin LA will not adhere to the first substrate in the inner peripheral portion, and thus the stamper can be easily peeled off the first substrate.

In the above-mentioned fourth and fifth manufacturing methods, the second radiation cured resin LB is applied toward an outer peripheral edge of the first substrate. By applying resin in this manner, the first radiation cured resin LA will not adhere to the first substrate in the inner peripheral portion, and thus the stamper can be easily peeled off the first substrate.

In the above-mentioned sixth manufacturing method, inner diameters of the thin first and second thin films FA and FB may be smaller than an inner diameter of the radiation cured resin. By forming the thin films in this manner, the radiation cured resin will be prevented from adhering to the first substrate in the inner peripheral portion, and thus the stamper can be easily peeled off the first substrate.

In the above-mentioned sixth manufacturing method, the thin first and second thin films FA and FB may be formed to cover an outer peripheral edge of the stamper. By forming the thin films in this manner, the radiation cured resin will be prevented from adhering to the first substrate in the outer peripheral portion, and thus the stamper can be easily peeled off the first substrate.

In the above-mentioned third to fifth manufacturing methods, the groove or the asperity pits of the stamper may be subjected to a process for facilitating the peeling of the stamper. With this method, the stamper can be more easily peeled off, and the transferring can be improved. The groove or the asperity pits of the stamper may be applied with release agent. With this method, the stamper can be more easily peeled off, and the transferring can be improved. A film mainly formed from metal may be formed on the groove or the asperity pits of the stamper. With this method, the stamper can be more easily peeled off, and the transferring can be improved.

In the above-mentioned the sixth manufacturing method, the first thin film FA may be formed of Au and the second thin film FB may be formed of $SiO_2$. With this method, the stamper can be more easily peeled off.

In the above-mentioned third to sixth manufacturing methods, center holes of the stamper and the first substrate may be substantially equal to each other in diameter. With these center holes, centers of a plurality of information recording layers formed on the first substrate can be aligned with ease.

With use of the optical information recording medium manufactured according to the above-mentioned third to sixth manufacturing methods, high-density recording using a plurality of information recording layers can be attained.

In the seventh aspect of the invention, provided is an optical information recording medium having a substrate.

The medium comprises: an information recording layer formed on the substrate; at least one basic layer which is stacked on the information layer, and includes an intermediate layer and a recording layer; and a light transmission layer formed on the basic layer. With the optical information recording medium of the present invention, high-density recording using a plurality of information recording layers can be attained. Further, the protection layer and the light transmission layer protect the information recording layers, and thus stable manufacturing can be secured. The medium is also advantageous in being manufactured by the above-mentioned first, second, third, and fourth manufacturing methods with ease.

In the medium, the thickness of the light transmission layer may be 0.3 mm or less. By forming the layer so thick, the wavelength of the light emitted from the recording/reproducing optical system can be shortened, and NA can be easily increased, thereby the recording density of the optical recoding medium can be increased. Further, the thickness of the light transmission layer may be substantially 0.1 mm. With this structure, the optical disk can maintain the tilt margin equal to that of the DVD even if the wavelength of the recording/reproducing light beam is shortened to around 400 nm and the NA of the recording/reproducing optical system is increased to around 0.9. The thickness of the basic layer may be not less than 15 $\mu$m and not more than 45 $\mu$m when the thickness of the light transmission layer is substantially 0.1 mm. By setting the thickness in this manner, the influence of the interference of reproduction signals of a plurality of optical recording media and the influence of the recording light can be suppressed. Further, the recording/reproducing with use of the lens having the high NA can be easily prevented from being influenced by spherical aberration or the like.

Further, the light transmission layer may be formed of radiation cured resin. With this method, the disk can be securely formed at a low cost, and the variety of the light transmission layer in thickness can be suppressed, and the layer can be formed uniformly. Further, the light transmission layer may be formed of radiation cured resin and a resin substrate. By forming the layer in this manner, the variety of the light transmission layer can be suppressed, and the layer can be easily formed.

The recording layer may comprise radiation cured resin having the groove or the asperity pits, and a reflective film or a recording film formed on the groove or the asperity pits. With this structure, the high-density recording medium comprising a plurality of information recording layers can be attained. Using radiation cured resin, the manufacturing can be performed with ease at a low cost.

The intermediate layer may have a function as adhesive. Thus, the optical information recording medium can be stabilized. The intermediate layer may be formed of radiation cured resin. Thus, the manufacturing can be performed with ease at a low cost.

The protection layer may have a pencil hardness B or more. By setting the hardness of the protection layer in this manner, the information recording layer can be protected from corrosion or shock, and damage applied to the information recording layer during the manufacturing can be also suppressed. The protection layer may be formed of radiation cured resin. Thus, the manufacturing can be performed with ease at a low cost.

The protection layer and the intermediate layer may have substantially equal refractive indexes. By setting the refractive indexes in this manner, the recording/reproducing light can stably perform the recording/reproducing without optical interference of spherical aberration. The protection layer and the intermediate layer may be substantially transparent to transmit recording/reproducing light. By employing such layers, the recording/reproducing light can stably perform the recording/reproducing without optical interference of absorption or dispersion.

The intermediate layer may be substantially transparent to transmit recording/reproducing light. By employing such a layer, the recording/reproducing light can stably perform the recording/reproducing without optical interference of absorption or dispersion.

In an eighth aspect of the invention, provided is an optical information recording medium comprising a first substrate, and a second substrate which is thinner than the first substrate. Two information recording layers are provided between the first and second substrates.

In a ninth aspect of the invention, provided is an optical information recording medium comprising a first substrate, and a light transmission layer which is provided on the first substrate and is made of radiation cured resin. Two information recording layers are provided between the first substrate and the light transmission layer.

The manufacturing method of the optical information recording medium according to the present invention can be more fully understood from the following detailed description of embodiments of the invention in conjunction with the accompanying drawings.

BRIEF DESCRIPTION OF THE DRAWINGS

FIG. 1 is a flowchart showing a flow of the manufacturing method of the optical disk according to the first embodiment of the present invention;

FIG. 2A is a sectional view showing the structure of the optical disk manufactured according to the manufacturing method of the present invention;

FIG. 2B is a view showing dimensions of the optical disk manufactured according to the manufacturing method of the present invention;

FIGS. 12A and 12B are drawings showing a process (3) of the manufacturing method of the optical disk according to the second embodiment of the present invention;

FIGS. 18A and 18B are drawings showing a process (1) of the manufacturing method of the optical disk according to the third embodiment of the present invention;

FIGS. 19A and 19B are drawings showing a process (2) of the manufacturing method of the optical disk according to the third embodiment of the present invention;

FIG. 20 is a flowchart showing a flow of the manufacturing method of the optical disk according to the fourth embodiment of the present invention;

FIGS. 22A to 22C are drawings showing a process (2) of the manufacturing method of the optical disk according to the fourth embodiment of the present invention;

FIGS. 31A to 31C are drawings showing a process of the manufacturing method of the optical disk according to the sixth embodiment of the present invention;

FIGS. 35A and 35B are drawings showing a process (3) of the manufacturing method of the optical disk according to the seventh embodiment of the present invention; and FIGS. 36A and 36B are drawings showing a process of the manufacturing method of the optical disk having a multi-layer structure according to the eighth embodiment of the present invention.

PREFERRED EMBODIMENTS OF THE INVENTION

Figure 3A:
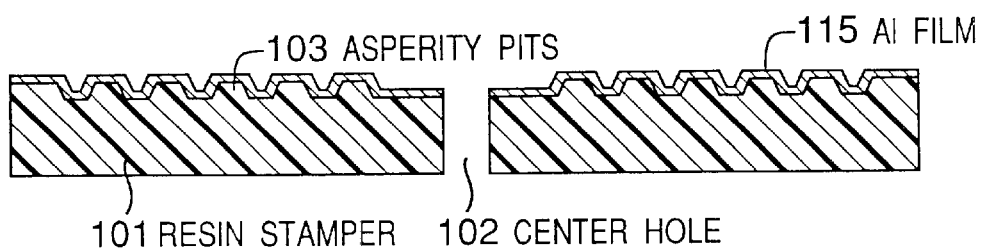
FIGS. 3A to 3C are drawings showing a process (1) of the manufacturing method of the optical disk according to the first embodiment of the present invention.

The preferred embodiments of the present invention are described below with reference to the accompanying drawings.

First Embodiment

FIG. 1 is a flowchart showing a flow of a manufacturing method of the optical information recording medium according to the first embodiment of the present invention.

FIG. 2 is a sectional view showing the structure of the optical disk as the optical information recording medium manufactured according to the present invention. As shown in FIG. 2, an optical disk 1 comprises a first substrate 111 and a second substrate 121 thinner than the first substrate 111, and has a first information recording layer 116 and a second information recording layer 119 between these substrates. The distance A between the recording/reproducing surface of the optical disk 1 and the second information recording layer 119 is set at 10 to 300 $\mu$m, more preferably 60 to 100 $\mu$m. The distance B between the first information recording layer 116 and the second information recording layer 119 is set at 5 to 60 $\mu$m, more preferably 10 to 40 $\mu$m. A track width C is set at 0.16 to 0.20 $\mu$m. A track pitch D is set at 0.1 to 1 $\mu$m, more preferably 0.2 to 0.4 $\mu$m. A pitch height E is set at 10 to 100 nm, more preferably 50 to 80 nm. The second substrate 121 preferably has a thickness of 0.3 mm or less, more preferably, approximate 0.1 mm or less. The recording/reproducing of data to/from the optical disk is performed with use of a laser beam emitted from the side of the thinner substrate, i.e., the second substrate.

Figure 3B:
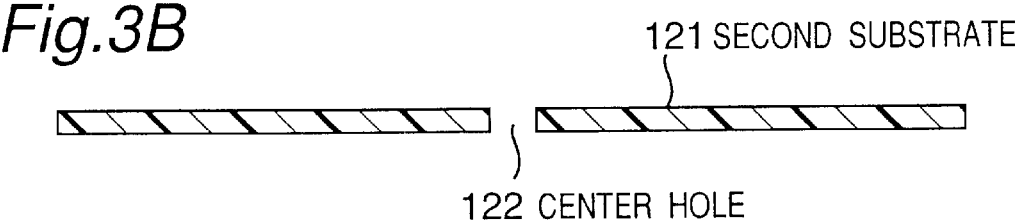

A resin stamper 101 shown in FIG. 3A is formed of a polycarbonate substrate made by injection molding to have a thickness of 1.1 mm, a diameter 120 mm, and a center hole 102 with a 15 mm diameter. The resin stamper 101 has asperity pits 103 on a principal plane. The resin stamper 101 may be formed of resin material other than polycarbonate, such as acrylic resin, polyolefin-based resin, or the like. The sputtering is performed on the asperity pits 103 to deposit metal 115 mainly composed of Al for 100 nm. In this time, metal mainly composed of Si may be sputtered on the asperity pits to manufacture the optical disk at a lower cost. By forming the metal film 115 in this manner, the resin stamper 101 and the second substrate 121 can be easily peeled off each other. The resin stamper 101 has the thickness of 1.1 mm in this embodiment, but may have a smaller thickness, for example, of 0.6 mm. By forming the resin stamper 101 to have the smaller thickness, the material cost can be further decreased The second substrate 121 shown in FIG. 3B is formed of a polycarbonate or acrylic sheet substrate having a thickness of 80 µm, an outer diameter 119.5 mm, and a center hole with a 22 mm diameter. The second substrate 121 has no information recording layer, and is formed smooth. The second substrate 121 is formed by cutting the sheet made by the casting method. The second substrate 121 may be formed of acrylic resin, norbolnane-based resin, or the like.

Figure 3C:
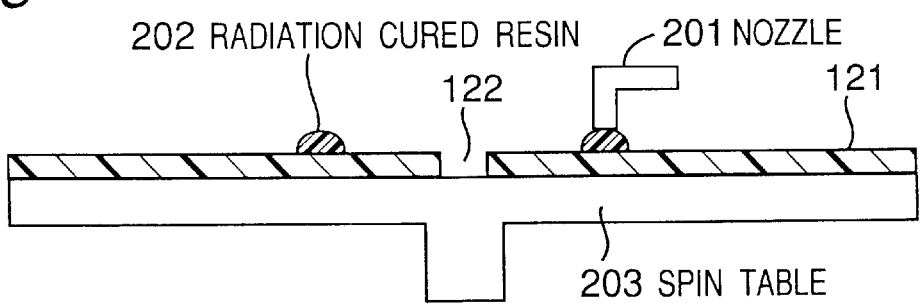

At first, in the manufacturing process, as shown in FIG. 3C, radiation cured resin 202 is applied onto the second substrate 121 to make a circle having a radius of approximate 27 mm with a nozzle 201. In this time, a spin table 203 on which the second substrate 121 is placed or the nozzle 201 is rotated at a low speed (20 to 120 rpm)

Figure 4A:
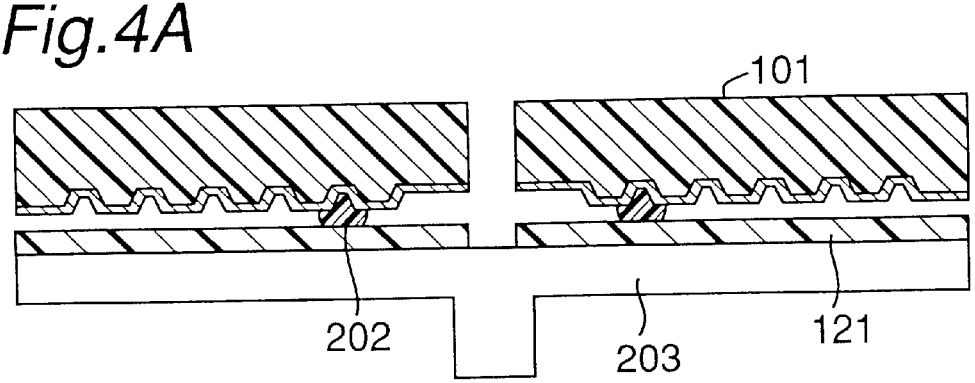
FIGS. 4A to 4C are drawings showing a process (2) of the manufacturing method of the optical disk according to the first embodiment of the present invention.

Next, the resin stamper 101 is overlaid on the second substrate 121 to make a concentric circle as shown in FIG. 4A.

In overlaying the stamper, radiation cured resin 202 may be applied circularly onto the stamper 101, then overlaid on the second substrate 121. The radiation cured resin is resin cured by radiation, and the radiation includes all electromagnetic waves and particle waves. The radiation cured resin includes resin which is cured by ultraviolet ray, resin which is cured by electron beam, or the like.

Figure 4B:
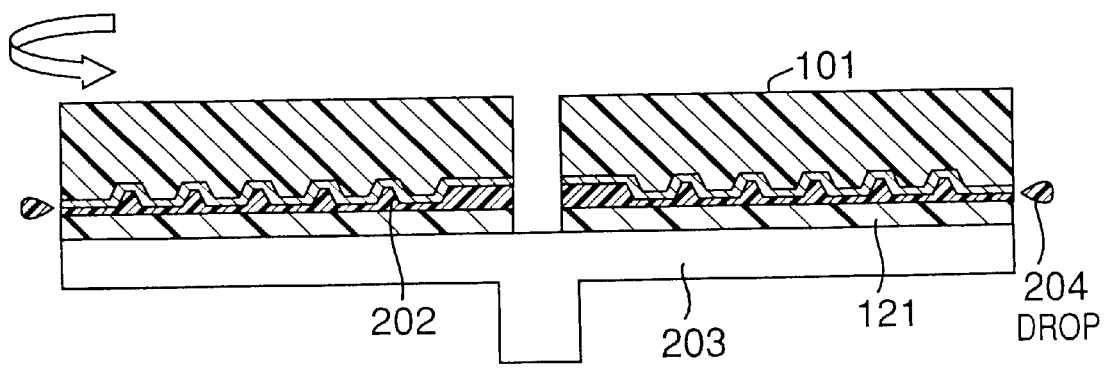

After overlaying the stamper and the second substrate, the spin table 203 is rotated at a high speed (1000 to 10000 rpm, for example) to rotate the substrate so that the radiation cured resin 202 may be scattered to the outer periphery of the substrate, as shown in FIG. 4B. By rotating the substrate in this manner, the formation of bubbles may be minimized on the bonded interface and the surplus radiation cured resin may be shaken off. The stamper according to the present invention is formed of resin material lighter than metal, and thus the rotation handling can be easily performed and the radiation cured resin 202 can be easily extended uniformly by the rotation. In addition, when the stamper is rotated at a high speed, the curve or distortion may easily occur in the metal stamper, but will not easily occur in the resin stamper. Further, the rotation step can be performed with use of the conventional bonding step and the conventional apparatus used for the manufacturing of the DVD.

Figure 4C:
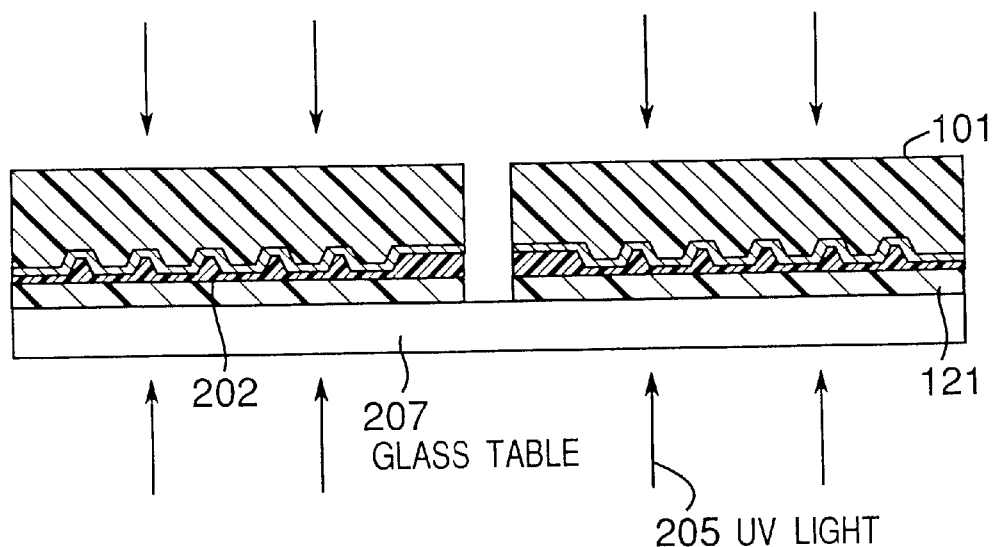

Subsequently, rays (ultraviolet) 205 and 206 are emitted as shown in FIG. 4C to cure the radiation cured resin 202. The light may be emitted from one of resin stamper side (rays 205) and first substrate side (rays 206), or from both the sides. It is preferable to select the optimum emitting method in accordance with the transmittance of the thin film formed on the resin stamper 101.

Figure 5A:
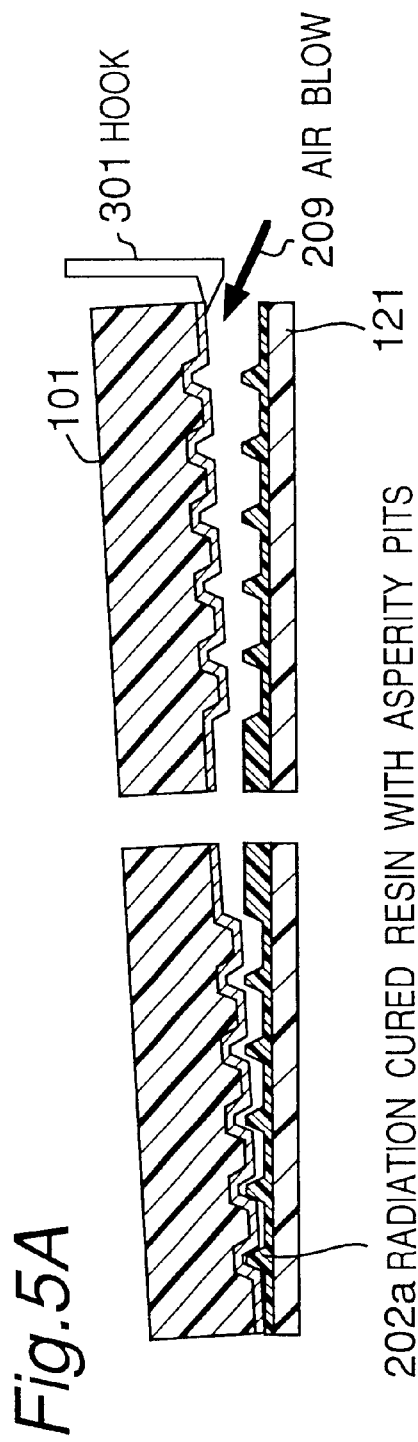
FIGS. 5A and 5B are drawings showing a process (3) of the manufacturing method of the optical disk according to the first embodiment of the present invention.
Figure 5B:
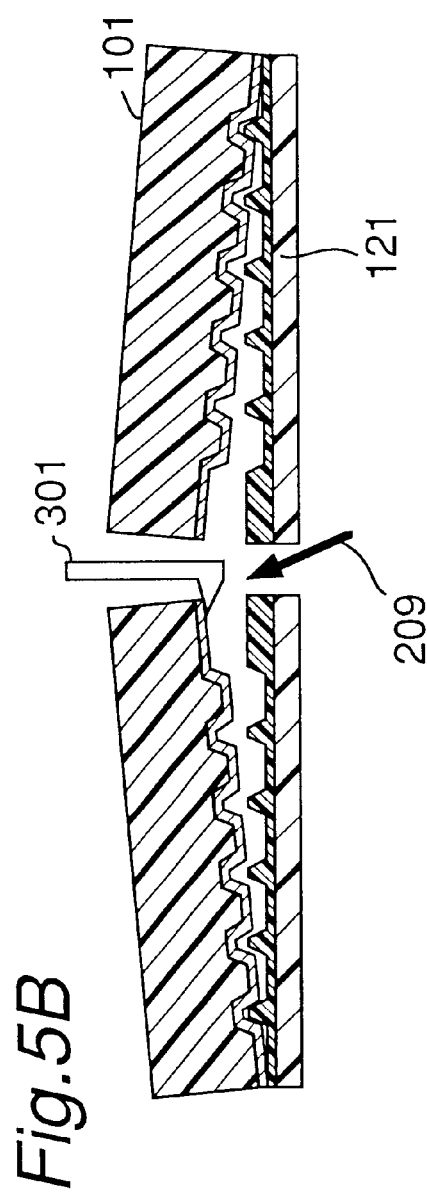

The resin stamper 101 is then peeled off the second substrate 121 as shown in FIGS. 5A and 5B. In this embodiment, a part of the outer or inner periphery of the resin stamper 101 is raised with a hook 301 formed in a hook shape, and an air blower blows air 209 into a space between the stamper and the second substrate to separate them. The inner or outer periphery of the resin stamper 101 may be approximately equal to that of the second substrate 121. When the resin stamper 101 is formed to have the inner or outer periphery smaller or larger than that of the second substrate 121, the insertion of the hook 301 can be facilitated to effectively separate them. The inner or outer periphery of the resin stamper 101 may be either smaller or larger than that of the second substrate 121. By forming an Al film or a Si film on the resin stamper 101 in advance, the separation can be easily performed. The film may be formed of film other than metal, such as a dielectric thin film. The thin film of the resin stamper 101 may be applied with release agent such as siloxane, a fluoromonomoleclular film, or the like.

Figure 6A:
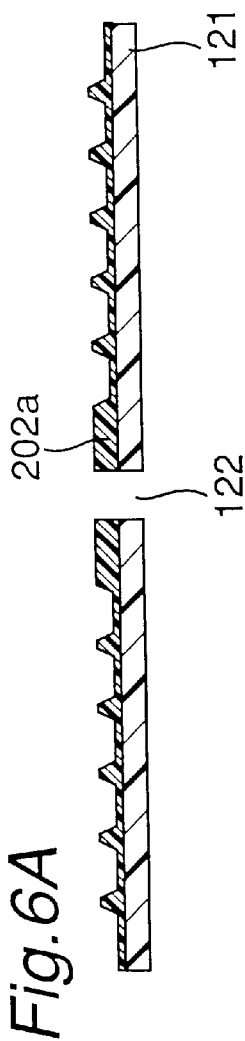
FIGS. 6A to 6C are drawings showing a process (4) of the manufacturing method of the optical disk according to the first embodiment of the present invention.
Figure 6B:
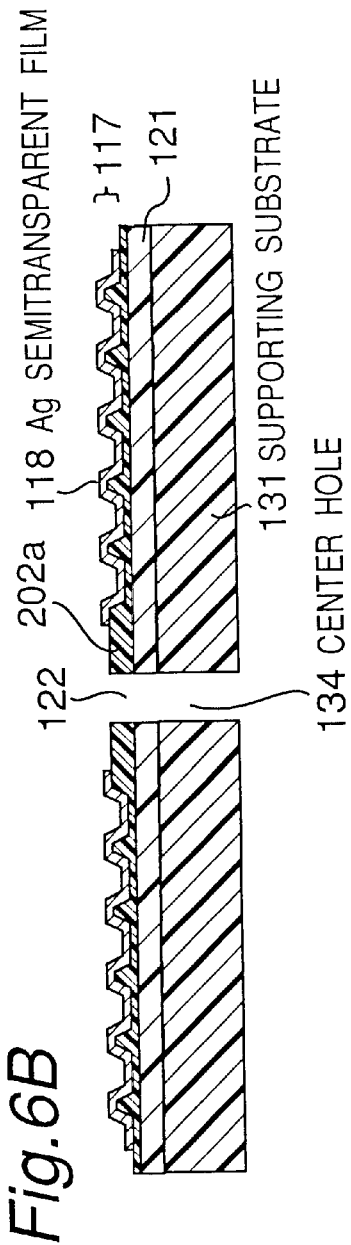

As shown in FIG. 6B, a semitransparent reflective film 118 (in this embodiment, a film made of approximately 20 nm deposited metal mainly composed of Ag) is then formed on the second substrate 121 (shown in FIG. 6A) on which the asperity pits are transferred. The semitransparent reflective film 118 may be formed from metals mainly composed of Rh, Au, or Si, or formed of a dielectric reflective film. The second substrate 121 is formed as thin as 80 µm and thus has poor strength. In forming the semitransparent reflective film, the second substrate may not be easily handled or the film cannot be formed easily.

In order to facilitate the handling and film forming, a supporting substrate 131 is bonded to the second substrate 121 on the side face opposite to the principal plane on which the asperity pits are formed, as shown in FIG. 6B. By bonding the supporting substrate 131 in this manner, the second substrate 121 has excellent strength to help the handling and film forming. The supporting substrate 131 is formed of a polycarbonate substrate having a thickness of 1.0 mm, a diameter 120 mm, and a center hole with a 15 mm diameter. The resin stamper after transferring the signal pits which cannot be used for the signal transfer any more may be used as the supporting substrate 131. The second substrate 121 and the supporting substrate 131 are bonded with radiation cured resin having weak adhesion in this embodiment, but may be bonded with another adhesive or static electricity. The second substrate 121 is preferably maintained substantially flat and horizontal to form the film 118 uniformly after the adhesion of the second substrate 121 and the supporting substrate 131. The second substrate 121 and the supporting substrate 131 may be separated after forming the film, or the first substrate 111 may be placed such that the center hole 112 of the first substrate 111 is eccentric to a center hole 134 of the supporting substrate 131 when the first substrate 111 and the second substrate 121 are bonded each other.

After separating the supporting substrate 131, it is preferable that there is no residual adhesive or damage on the principal plane of the second substrate 121 to which the supporting substrate 131 was bonded. The second substrate 121 and the supporting substrate 131 are separated by the same method as used to separate the resin stamper 101 from the second substrate 121. By forming the second substrate 121 and the supporting substrate 131 to have different inner or outer peripheries, the separation can be performed easily. If the handling and the film forming can be performed alone, the second substrate 121 needs not to be bonded with the supporting substrate 131.

Figure 6C:
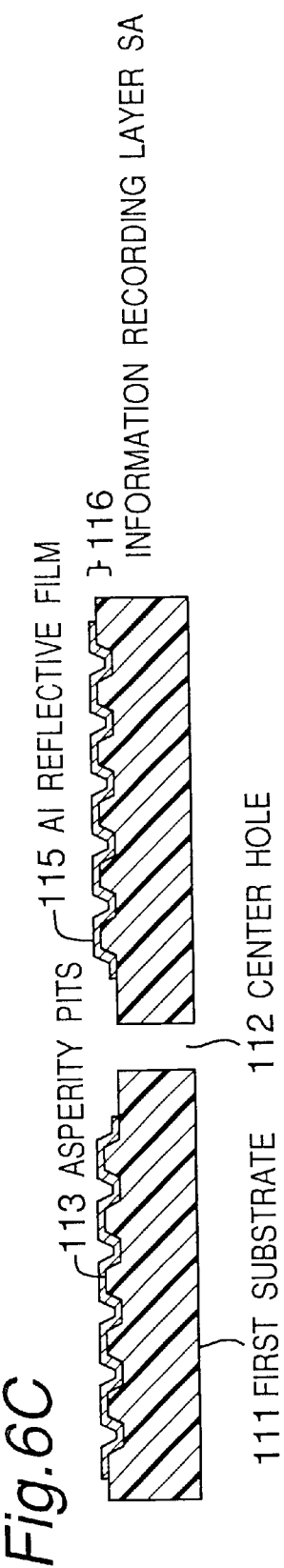

The first substrate 111 shown in FIG. 6C is formed of a polycarbonate substrate made to have a thickness of 1.1 mm, a diameter 120 mm, and a center hole with a 15 mm diameter. The first substrate 111 has asperity pits 113 on a principal plane. The first substrate 111 may be formed of resin material other than polycarbonate, such as acrylic resin, polyolefin-based resin, or the like. The sputtering is performed on the asperity pits 113 to deposit a reflective film 115 mainly composed of Al of 100 nm. In this time, the reflective film 115 may be formed from metal other than Al, for example, Ag. The first substrate 111 is formed by the injection molding. Since the first substrate 111 and the resin stamper 101 have the same thickness, the injection molding and the film forming of the first substrate 111 and the resin stamper 101 can be performed with the same facility. The first substrate 111 is not the substrate on which the recording/reproduction is performed, and thus it may be formed from non-transparent resin having low transmittance.

Figure 7:
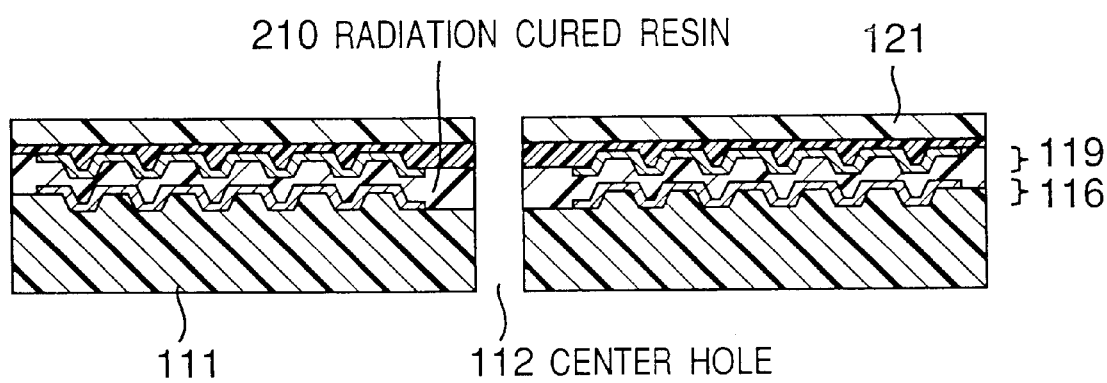
FIG. 7 is a drawing showing a process (5) of the manufacturing method of the optical disk according to the first embodiment of the present invention.

The second substrate 121 and the first substrate 111 on which the information recording layer is formed are bonded to each other with use of radiation cured resin 210 such that the information recording layers 119 and 116 face to each other, as shown in FIG. 7. The method of the bonding is the same method as used to bond the resin stamper 101 and the first substrate 111. More specifically, the radiation cured resin 210 is applied on one of the substrates, the substrates are wrapped over each other, and then the substrates are rotated to spread the radiation cured resin 210 substantially uniformly. After spreading the resin, ultraviolet radiation is emitted to cure the radiation cured resin 210. By setting the thickness of a clamp portion at approximate 1.2 mm after bonding the first substrate 111 and the second substrate 121, it can maintain the compatibility to CD or DVD thickness.

Figure 8A:
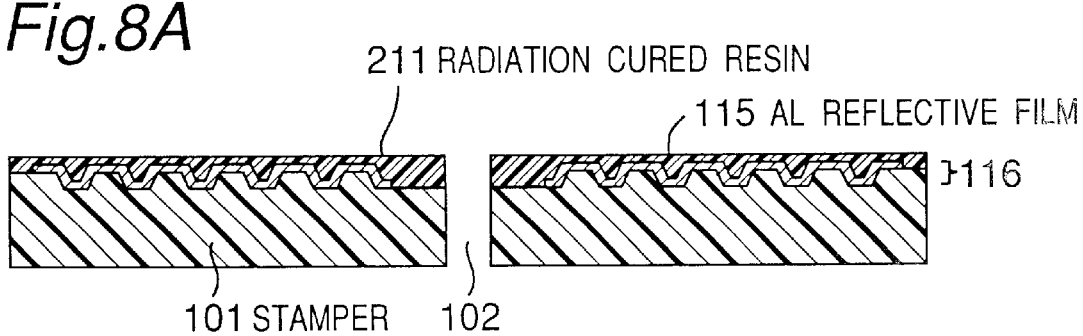
FIGS. 8A and 8B are drawings showing a process (6) of the manufacturing method of the optical disk according to the first embodiment of the present invention.
Figure 8B:
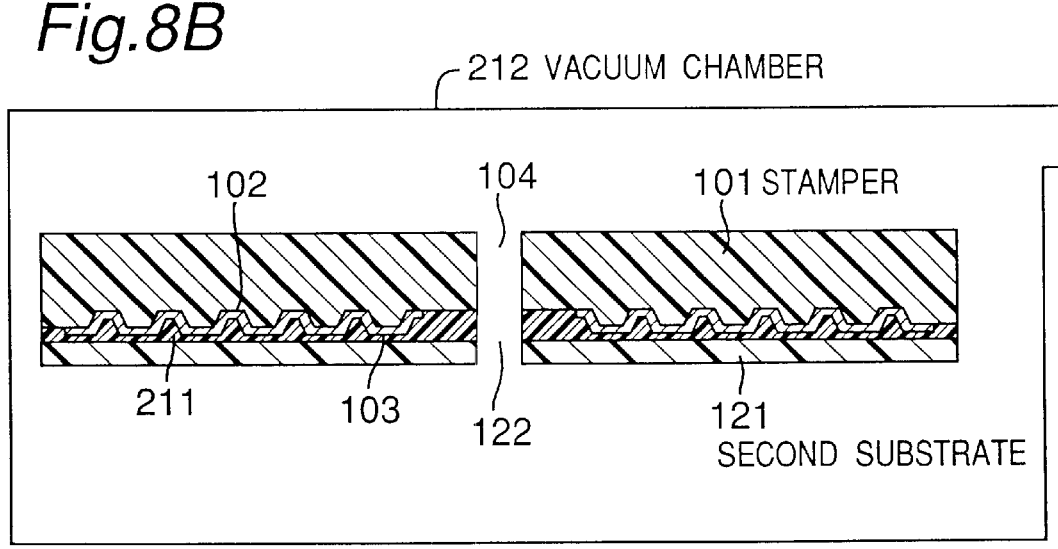

The resin stamper 101 and the first substrate 111, or the first substrate 111 and the second substrate 121 may be bonded in a vacuum circumstance. In this case, radiation cured resin 211 is spin-coated on one or both of the substrates or on the bonding plane of the resin stamper as shown in FIG. 8A, and then the substrates or the resin stamper are wrapped over each other in a vacuum as shown in FIG. 8B, and the radiation cured resin 211 is cured by radiation thereafter. By bonding in a vacuum, no bubbles are inserted into the interface thereof. Similarly, the stamper is formed from light resin material, and thus can be easily rotated for spin-coating the radiation cured resin on the stamper. In addition, the resin stamper will not easily curved or distorted in contrast to the metal stamper.

As described above, according to the above-mentioned manufacturing method, the optical disk having information recording layers can be formed on the substrate having a thickness of 0.3 mm or less which cannot be formed by the injection molding, resulting in the optical disk having high density.

It will be obvious to those of ordinary skill in the art that the present embodiment can be applied to other embodiments such as a rectangular or polygonal card-like recording medium, modifications of a disk-like recording medium, or the like within a scope from where the spirit of the invention as defined can be maintained free from any deviation.

Second Embodiment

Figure 9:
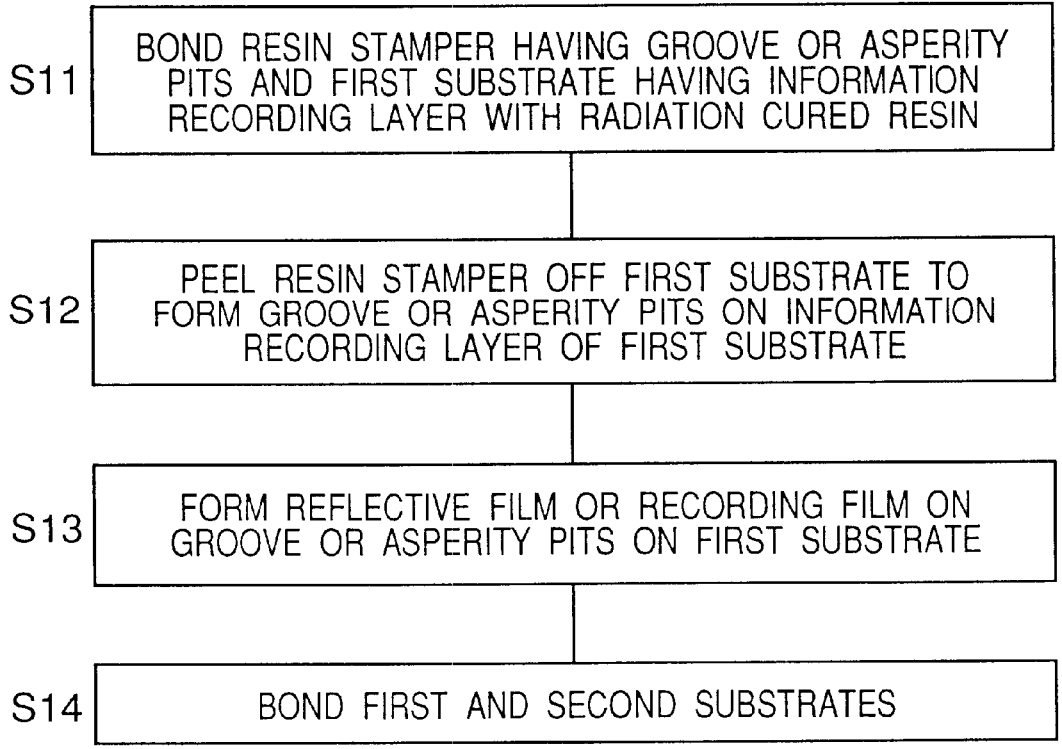
FIG. 9 is a flowchart showing a flow of the manufacturing method of the optical disk according to the second embodiment of the present invention.

Another embodiment of a manufacturing method of an optical disk according to the present invention will be described in conjunction with FIGS. 9 to 16B. FIG. 9 is a flowchart showing a flow of manufacturing method of the optical disk according to the second embodiment.

Figure 10A:
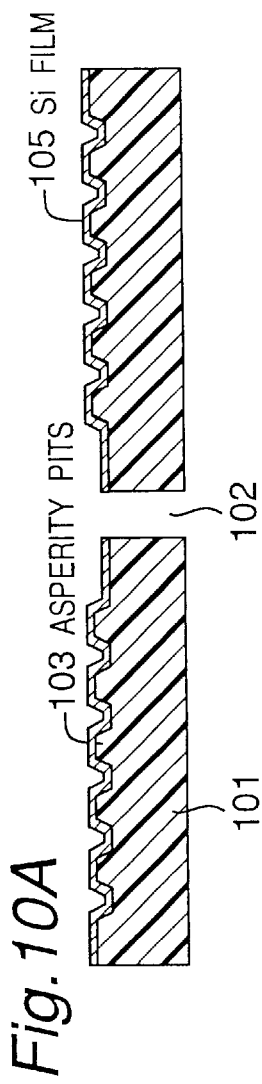
FIGS. 10A to 10C are drawings showing a process (1) of the manufacturing method of the optical disk according to the second embodiment of the present invention.

A resin stamper 101 shown in FIG. 10A is formed of a polycarbonate substrate made by the injection molding to have a thickness of 1.1 mm, a diameter 120 mm, and a center hole with a 15 mm diameter. The resin stamper 101 has asperity pits 103 on one of principal planes. A resin stamper 101 may be formed of resin material other than polycarbonate, such as acrylic resin, polyolefin-based resin, or the like. The sputtering is provided on the asperity pits to deposit metal 105 mainly composed of Si for 20 nm.

Figure 10B:
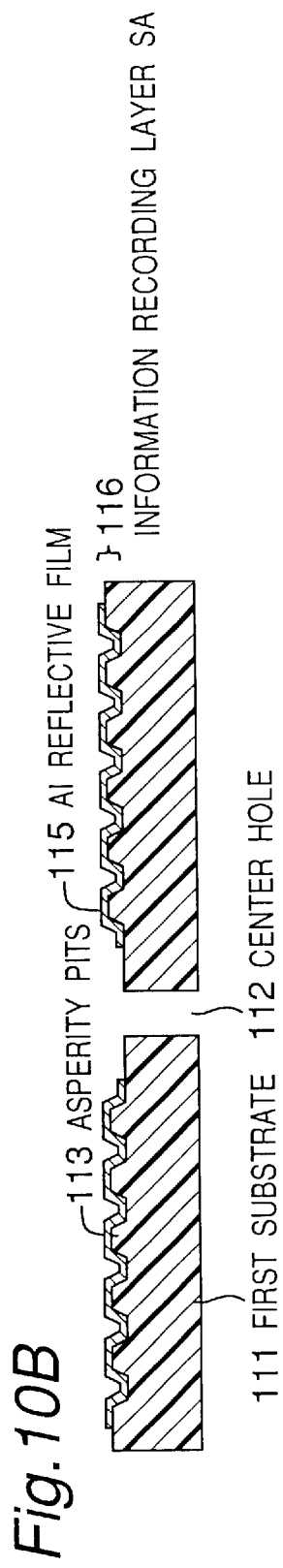

The first substrate 111 shown in FIG. 10B is formed of a polycarbonate substrate made to have a thickness of 1.1 mm, a diameter 120 mm, and a center hole with a 15 mm diameter. The first substrate 111 has a principal plane on which an information recording layer (SA) 116 comprising asperity pits 113 and an Al reflective film 115 is formed. The first substrate 111 may be formed of resin material other than polycarbonate, such as acrylic resin, polyolefin-based resin, or the like. The first substrate 111 is not the substrate from which side the recording/reproduction is performed, and thus it may be formed from non-transparent resin having low transmittance.

Figure 10C:
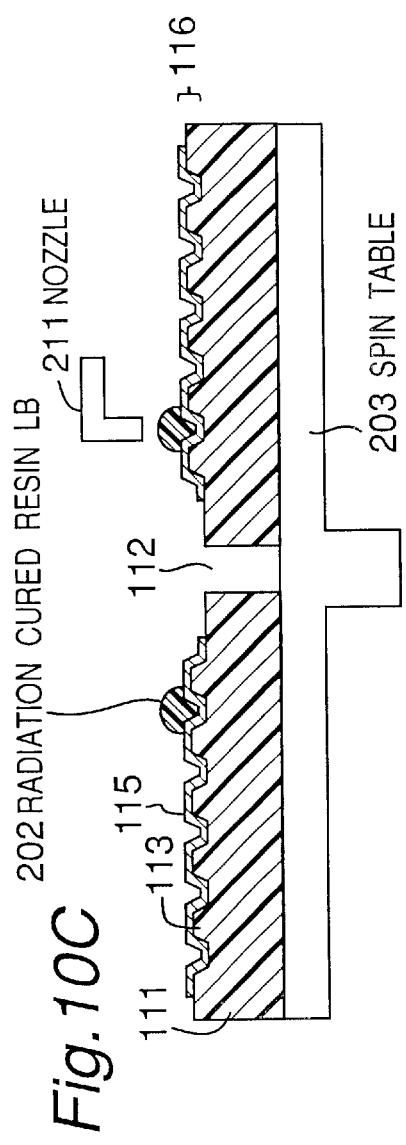

After preparing the resin stamper 101 and the first substrate 111 as shown in FIGS. 10A and 10B, radiation cured resin 202 is applied onto the first substrate 111 to make a circle having a radius of approximate 27 mm with a nozzle 211, as shown in FIG. 10C. In this time, a spin table 203 on which the first substrate 111 is placed or the nozzle 211 is rotated at a low speed (20 to 120 rpm).

Figure 11A:
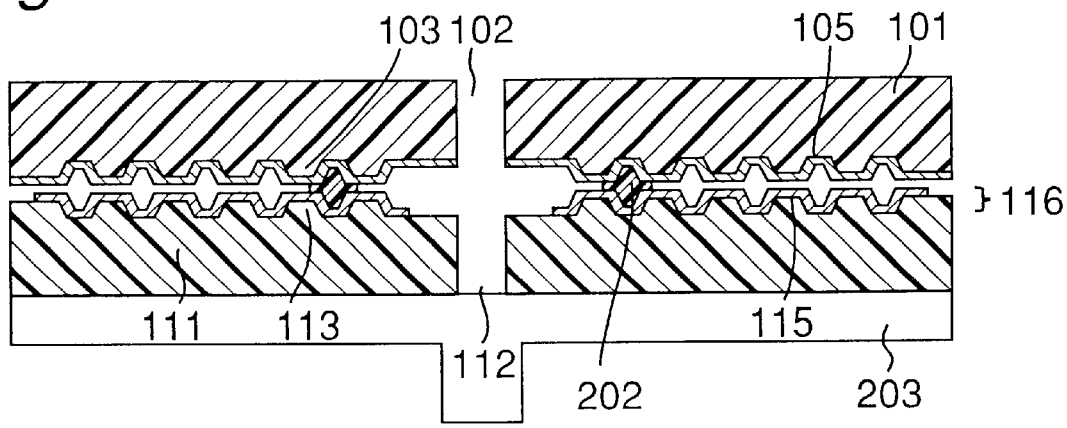
FIGS. 11A and 11B are drawings showing a process (2) of the manufacturing method of the optical disk according to the second embodiment of the present invention.

Next, the resin stamper 101 is placed on the first substrate 111 to be concentric with the first substrate 111, as shown in FIG. 11A. It is noted that, instead of this, the radiation cured resin 202 may be applied onto the stamper 101 circularly, and then the stamper 101 may be placed over the first substrate 111.

Figure 11B:
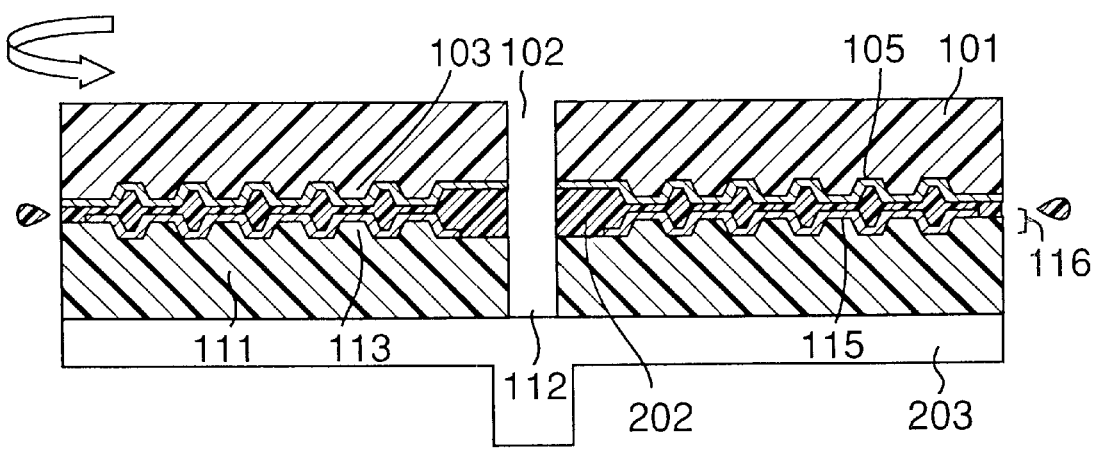

After placing the stamper and the first substrate, the spin table 203 is rotated at a high speed (1000 to 10000 rpm, for example) to rotate the substrate so that the radiation cured-resin 202 may be extended to the outer periphery of the substrate, as shown in FIG. 11B. By rotating the substrate in this manner, the formation by bubbles may be easily minimized on the bonded interface and the surplus radiation cured resin may be shaken off.

By making inner circumference diameters of the resin stamper 101 and the first substrate 111 to be substantially equal, the center of the information recording layer 116 of the first substrate 111 can be aligned to the center of the groove or asperity pits of the resin stamper 101. The alignment can be easily attained by providing the spin table 203 with a center pin having substantially equal size to that of the center holes 102 and 112. In order to decrease the eccentricity more, a mechanism for aligning the centers before extending and curing the radiation cured resin may be provided.

Subsequently, radiation 205 and 206 is emitted as shown in FIG. 12A to cure the radiation cured resin 202. The radiation may be emitted from resin stamper side (radiation 205) and/or first substrate side (radiation 206). In this time, the transmittance of the radiation may be decreased depending on the material of the resin stamper 101 and the first substrate 111 or the film. Thus, the radiation cured resin may not be easily cured by the radiation incident in a direction vertical to the principal planes of the resin stamper 101 and the first substrate 111. Therefore, to cure the resin, it is effective to emit radiation 208 parallel to the principal plane of the resin stamper 101 and the first substrate 111 so that the radiation is emitted into the edge of the principal planes, as shown in FIG. 12B. It is more effective to focus the radiation by a lens 209 such that the radiation is effectively incident into the edge faces. In order to more securely attain the curing, it is preferable to emit the radiation from a plurality of positions.

Figure 13A:
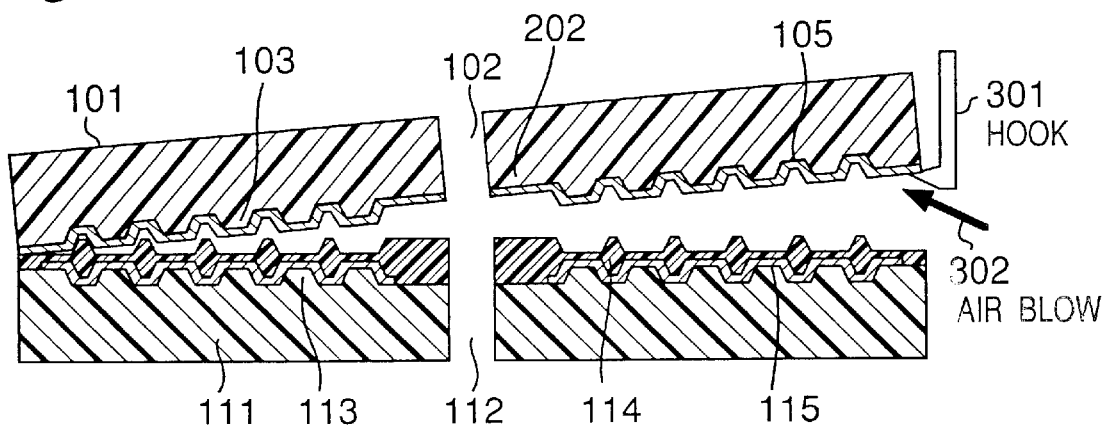
FIGS. 13A and 13B are drawings showing a process (4) of the manufacturing method of the optical disk according to the second embodiment of the present invention.
Figure 13B:
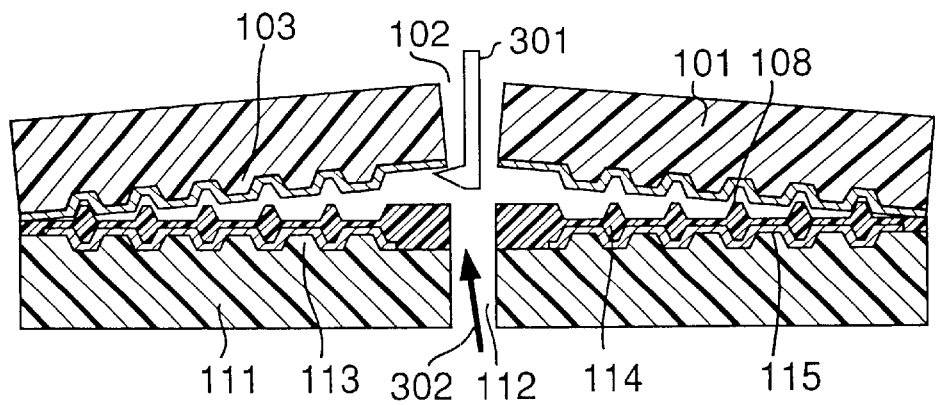

The resin stamper 101 is then peeled off the first substrate 111 as shown in FIGS. 13A and 13B. In this embodiment, a part of the outer or inner periphery of the resin stamper 101 is raised with a hook 301 formed in a hook shape and blow air 302 into the interface between the stamper 101 and the second substrate 111 with use of an air blower to separate them. The outer circumference diameter of the resin stamper 101 may be approximately equal to that of the first substrate 111. The resin stamper 101 may be formed to have the outer circumference diameter different from that of the first substrate 111. Thus, the hook 301 can be easily inserted into the interface of the stamper 101 and the first substrate 111 to effectively separate them.

It is preferable to employ, as the radiation cured resin 202, radiation cured resin which is excellent in transferability and has poor adhesion to the stamper 101 and excellent adhesion to the information recording layer 116 of the first substrate 111. In this embodiment, the radiation cured resin having excellent adhesion to Al and poor adhesion to Si is employed. Accordingly, forming a Si film on the resin stamper 101 in advance allows the separation to be easily performed. The stamper 101 may have the film formed from another metal such as Ag, Au, or Al, or a non-metal film such as a dielectric thin film, depending on a type of the radiation cured resin 202. The thin film on the resin stamper 101 such as the metal film needs not to be formed if the adhesion of the stamper 101 to the resin material forming the resin stamper 101 is week. The asperity pits on the resin stamper 101 or the thin film formed on the resin stamper 101 may be applied with a release agent.

Figure 14A:
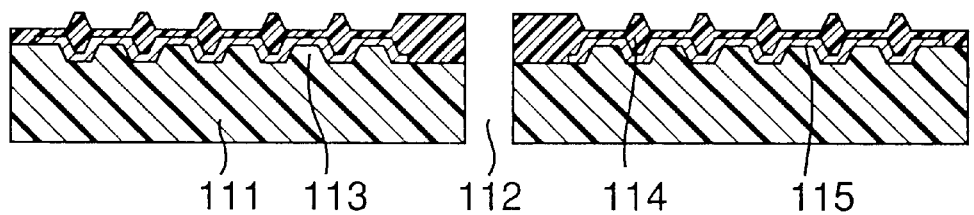
FIGS. 14A and 14B are drawings showing a process (5) of the manufacturing method of the optical disk according to the second embodiment of the present invention.
Figure 14B:
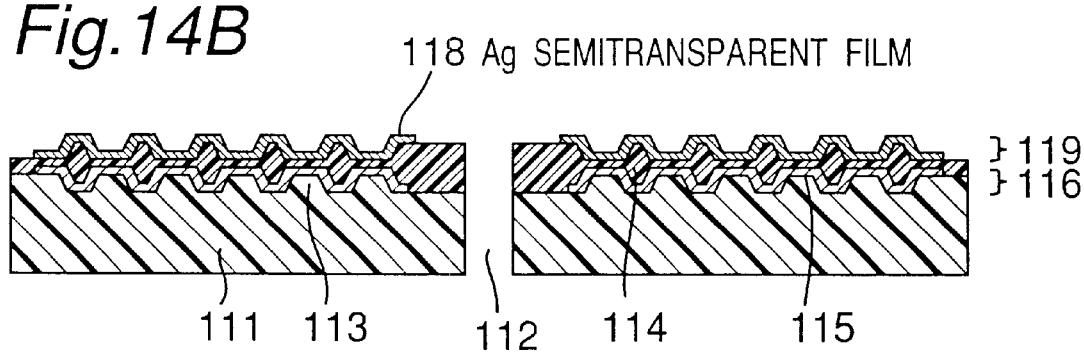

As shown in FIG. 14B, a semitransparent reflective film 118 (in the present embodiment, a film made of approximately 20 nm of deposited metal mainly composed of Ag) is then formed on the first substrate 111 (shown in FIG. 14A) on which the asperity pits are transferred, thereby forming the information recording layer 119. The reflective film 118 may be formed of metal mainly composed of Rh, or formed of a dielectric reflective film.

Figure 15A:
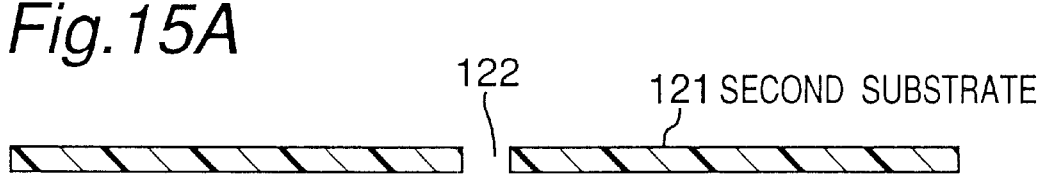
FIGS. 15A and 15B are drawings showing a process (6) of the manufacturing method of the optical disk according to the second embodiment of the present invention.

The second substrate 121 shown in FIG. 15A is formed of a polycarbonate sheet-like substrate having a thickness of 80 $\mu$m, a diameter 119.5 mm, and a center hole with a 22 mm diameter. The second substrate 121 has no information recording layer, and is formed smooth. The second substrate 121 is formed by cutting a sheet made by the casting method. The second substrate 121 may be formed of acrylic resin, norbolnane-based resin, or the like.

Figure 15B:
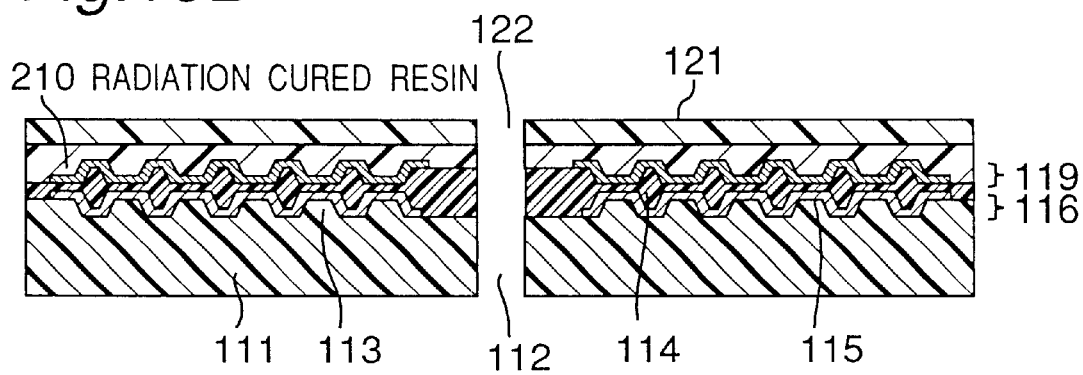

The second substrate 121 and the first substrate 111 on which the information recording layers 116 and 119 are formed are bonded each other via the radiation cured resin 210 such that the information recording layers 116 and 119 formed on the principal planes face each other, as shown in FIG. 15B. The substrates are bonded by the same method as used to bond the resin stamper 101 and the first substrate 111. More specifically, the radiation cured resin 210 is applied on one of the substrates circularly, the substrates are overlapped each other, and then the first and second substrates 111 and 121 integrated by the radiation cured resin 210 are rotated to extend the radiation cured resin 210 substantially uniformly. After extending the resin, ultraviolet radiation is emitted to cure the radiation cured resin 210. With use of the sheet-like second substrate 121 as a light transmission layer, the light transmission layer can be formed to have a substantially uniform thickness. The light transmission layer preferably has a thickness of 0.3 mm or less, more preferably, of approximate 0.1 mm or less.

Figure 16A:
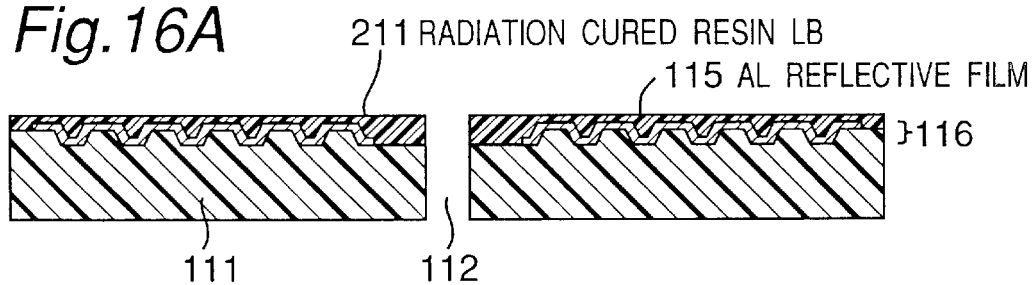
FIGS. 16A and 16B are drawings showing a process (7) of the manufacturing method of the optical disk according to the second embodiment of the present invention.
Figure 16B:
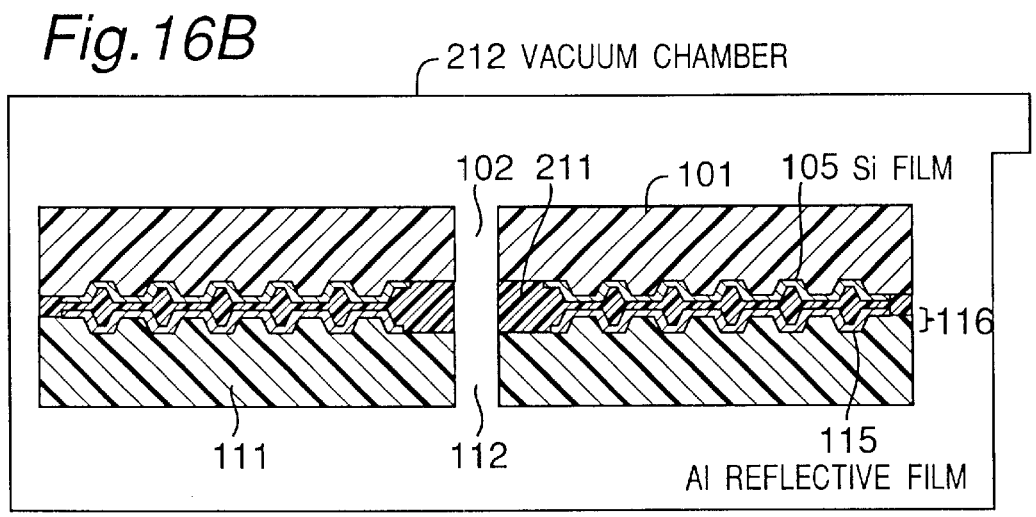

The resin stamper 101 and the first substrate 111, and the first substrate 111 and the second substrate 121 may be bonded in a vacuum circumstance. In this case, the radiation cured resin 211 is spin-coated on one of the substrates or on the bonding plane of the resin stamper as shown in FIG. 16A, and then the substrates or the resin stamper are overlapped on each other in a vacuum as shown in FIG. 16B. The radiation cured resin 211 is cured by radiation thereafter. By bonding the substrates or the resin stamper in a vacuum, no bubbles are inserted into the interface thereof.

As described above, according to the above-mentioned manufacturing method, the optical disk having high density can be attained.

Third Embodiment

Another embodiment of a manufacturing method of an optical disk according to the present invention will be described in conjunction with FIGS. 17 to 19B. The same or like description as presented in the above embodiments will be omitted.

Figure 17:
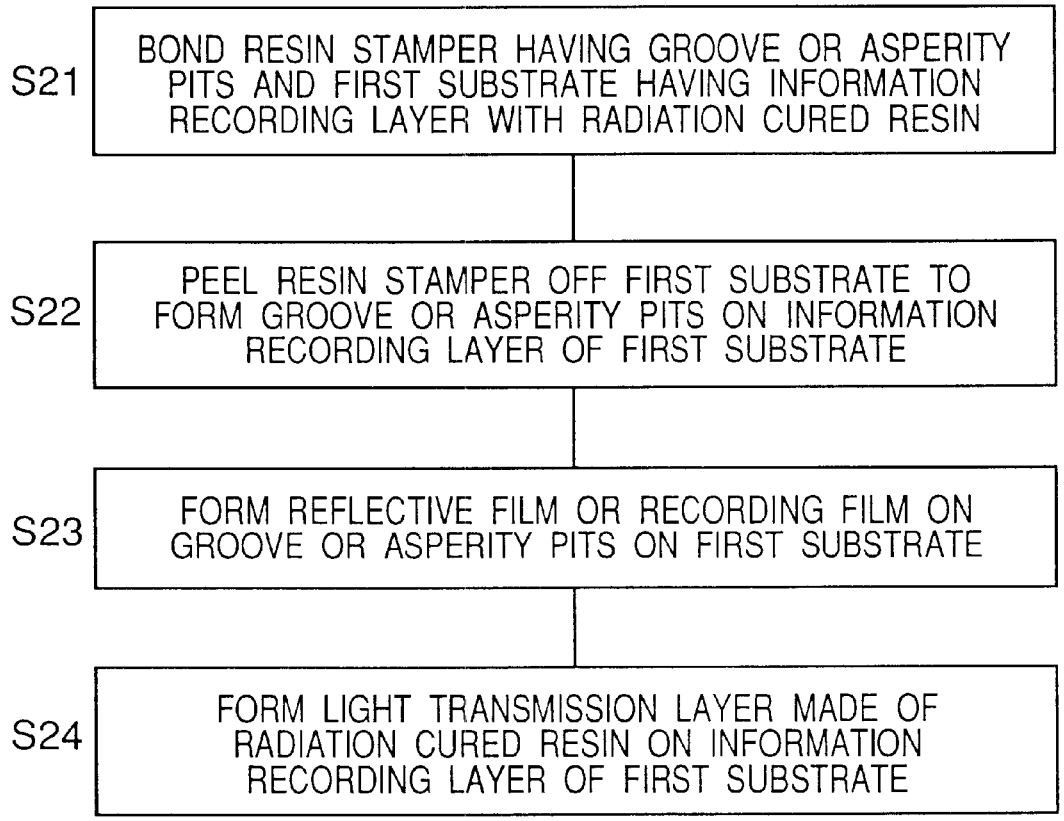
FIG. 17 is a flowchart showing a flow of the manufacturing method of the optical disk according to the third embodiment of the present invention.

FIG. 17 is a flowchart showing a flow of manufacturing method of the optical disk according to this embodiment.

The manufacturing steps to the step of forming a first substrate 511 having a first information recording layer 517, and a second information recording layer 518 are the same as those described in the second embodiment (layers 119 and 116), as shown in FIG. 18A.

In the present embodiment, a light transmission layer on the information recording layer 518 of the first substrate 511 is formed with the radiation cured resin.

As shown in FIG. 18B, the radiation cured resin 602 is applied on the information recording layer 518 on the first substrate 511 to make a circle with a radius of approximate 24 mm by a nozzle 601. In this time, a spin table 603 on which the first substrate 511 is placed or the nozzle 601 is rotated at a low speed (20–120 rpm).

Next, the spin table 603 is rotated at a high speed (200 to 10000 rpm) to rotate the first substrate 511 so that the radiation cured resin 602 may be spread substantially uniformly over the information recording layer 518, as shown in FIG. 19A. Rotating speed or the rotation time may be changed according to viscosity of the radiation cured resin 602. Thus, the radiation cured resin 602 can be spread substantially uniformly on the first substrate 511.

Subsequently, as shown in FIG. 19B, radiation 605 is emitted to cure the radiation cured resin 602. In this embodiment, the light transmission layer made of the radiation cured resin 602 with a thickness of approximate 0.1 mm is formed. Most of the radiation cured resins cannot be easily cured in contact with oxygen. Therefore, the radiation 605 is emitted in a nitrogen atmosphere 612 to cure the radiation cured resin 602. By forming the light transmission layer from the radiation cured resin, the optical disk can be attained with a lower manufacturing cost.

As described above, according to the above-mentioned manufacturing methods of the second and third embodiments, it is possible to produce an optical disk that has a thin substrate from a side of which data is recorded/reproduced and which has multiple information recording layers. More specifically, since the used stamper is formed of light and flexible resin, it can be easily handled. Further, the radiation cured resin for transmitting signal pits can be spread or extended substantially uniformly on the substrate by rotating the substrate by using substantially the same facility as that used for the adhesion step in the manufacturing step of the DVD. In addition, even if the stamper cannot be easily peeled off the substrate and needs to be replaced, the stamper can be easily replaced with a new one since the stamper is formed of resin and can be formed with mass production at a low manufacturing cost.

Fourth Embodiment

A further embodiment of a manufacturing method of an optical disk according to the present invention will be described in conjunction with FIGS. 20 to 27B. FIG. 20 is a flowchart showing a flow of a manufacturing method of the optical disk according to the fourth embodiment.

Figure 21A:
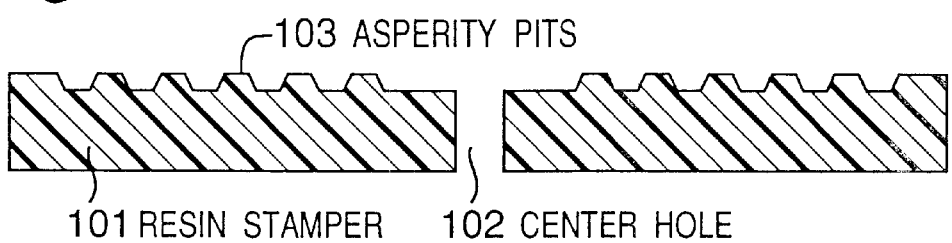
FIGS. 21A to 21C are drawings showing a process (1) of the manufacturing method of the optical disk according to the fourth embodiment of the present invention.
Figure 21B:
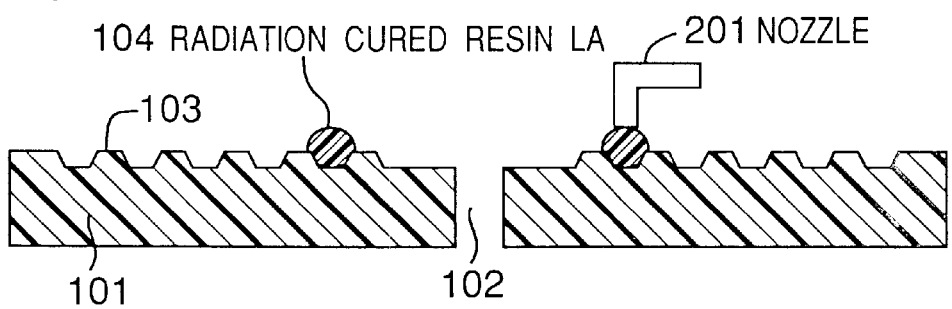

A resin stamper 101 shown in FIG. 21A is formed of a polycarbonate substrate made by the injection molding to have a thickness of 1.1 mm, a diameter 120 mm, and a center hole with a 15 mm diameter. The resin stamper 101 has asperity pits 103 at a principal plane. The resin stamper 101 may be formed of resin material other than polycarbonate, such as acrylic resin, polyolefin-based resin, or the like. The resin stamper 101 having the thickness of 1.1 mm is used in this embodiment, but the stamper may have a smaller thickness, for example, of 0.6 mm. By forming the resin stamper 101 to have the smaller thickness, the material cost can be further decreased more. As shown in FIG. 21B, first radiation cured resin (hereinafter referred to as "radiation cured resin LA") 104 is dropped onto the asperity pits 103 of the resin stamper 101 circularly by a nozzle 201. The resin stamper is then rotated to shake off surplus resin and spread the resin substantially uniformly.

Subsequently, radiation 202 is emitted as shown in FIG. 22A to cure the radiation cured resin LA 104. In the present embodiment, it is preferable to rotate the resin stamper 101 in a vacuum. By rotating the resin stamper 101 in a vacuum, the resin can be inserted into the groove deeply. In this time, it is preferable to perform the resin curing subsequent to the rotation in the atmosphere, i.e., under the atmosphere pressure, and thus the resin can be strongly stuck to the stamper. That is, it is preferable to perform a process of placing the radiation cured resin 104 onto the resin stamper 101 by rotating the resin stamper 101 under a pressure lower than that of the following process of curing the resin 104. Thus, filling and transferring the radiation cured resin to the stamper 101 can be effectively performed. 157 The first substrate 111 shown in FIG. 22B is formed of a polycarbonate substrate made to have a thickness of 1.1 mm, a diameter 120 mm, and a center hole 112 with a 15 mm diameter. The first substrate 111 has a principal plane on which an information recording layer (SA) 116 comprising asperity pits 113 and an Al reflective film 115 is formed. The first substrate 111 may be formed of resin material other than polycarbonate, such as acrylic resin, polyolefin-based resin, or the like. Since the first substrate 111 is not a substrate from a side of which data is recorded/reproduced, it may be formed from non-transparent resin having low transmittance. The second radiation cured resin (hereinafter referred to as "radiation cured resin LB") 114 is applied onto the first substrate 111 to make a circle having a radius of approximate 27 mm by a nozzle 211, as shown in FIG. 22C.

Figure 23A:
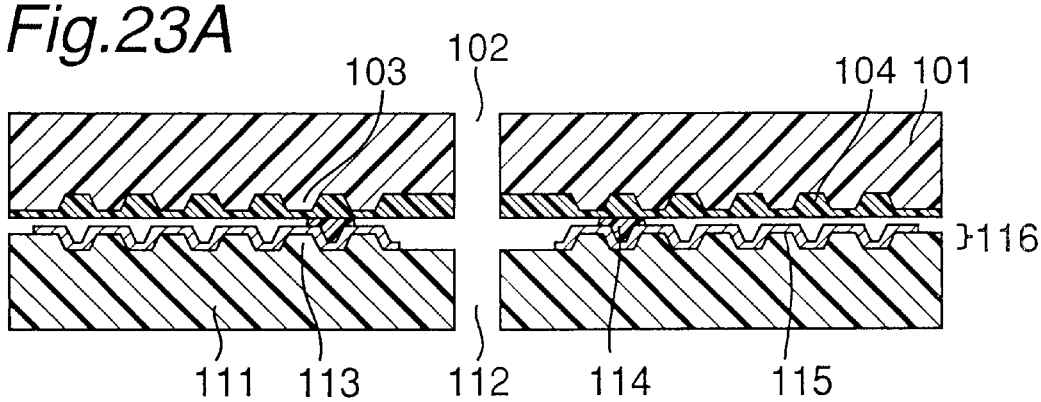
FIGS. 23A to 23C are drawings showing a process (3) of the manufacturing method of the optical disk according to the fourth embodiment of the present invention.
Figure 23B:
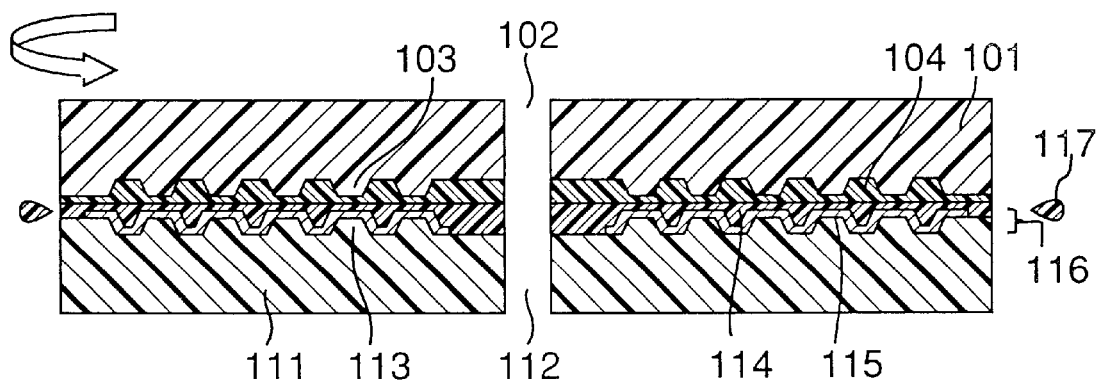

Next, the resin stamper 101 is placed concentrically on the first substrate 111, as shown in FIG. 23A. It is noted that the resin stamper 101 may be placed on the first substrate 111 after the radiation cured resin LB 114 is applied circularly onto the radiation cured resin LA 104 on the stamper 101. After placing the stamper 101 on the first substrate 111, they are rotated at a high speed (1000 to 10000 rpm, for example) so that the radiation cured resin LB 114 may be extended to the outer periphery of the substrate, as shown in FIG. 23B. By rotating the substrate in this manner, the formation of bubbles may be easily minimized on the bonded interface and the surplus radiation cured resin LB 114 may be shaken off.

By making center hole diameters of the resin stamper 101 and the first substrate 111 equal, the center of the information recording layer SA of the first substrate 111 can be aligned to the center of the asperity pits of the resin stamper 101. The alignment can be easily attained by providing the spin table with a center pin having approximately equal size to that of the center holes 102 and 112. In order to decrease the eccentricity more, a mechanism for aligning the centers before extending and curing the radiation cured resin LB 114 may be provided.

Figure 23C:
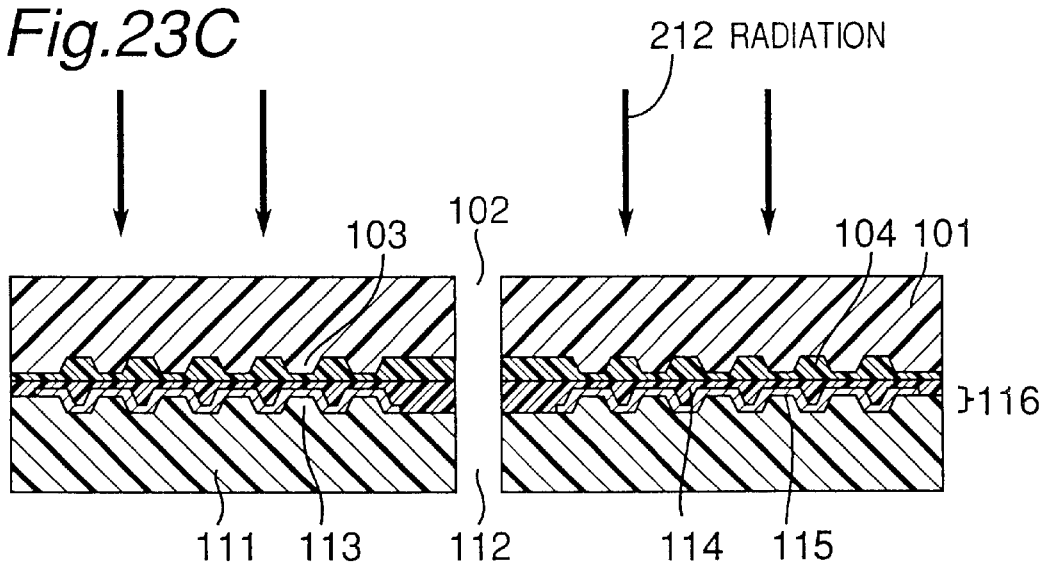

Subsequently, as shown in FIG. 23C, radiation 212 is emitted to cure the radiation cured resin LB 114. The first substrate 111 has the information recording layer 116, and therefore, the radiation cured resin LB 114 cannot be easily cured by the radiation emitted from the side of the first substrate 111. Accordingly, the radiation transmittance of the resin stamper 101 must be sufficient to cure the radiation cured resin. In the present embodiment, the stamper is formed from transparent polycarbonate to facilitate the resin curing. The stamper may be formed from another material as long as the material has sufficient radiation transmittance.

Figure 24A:
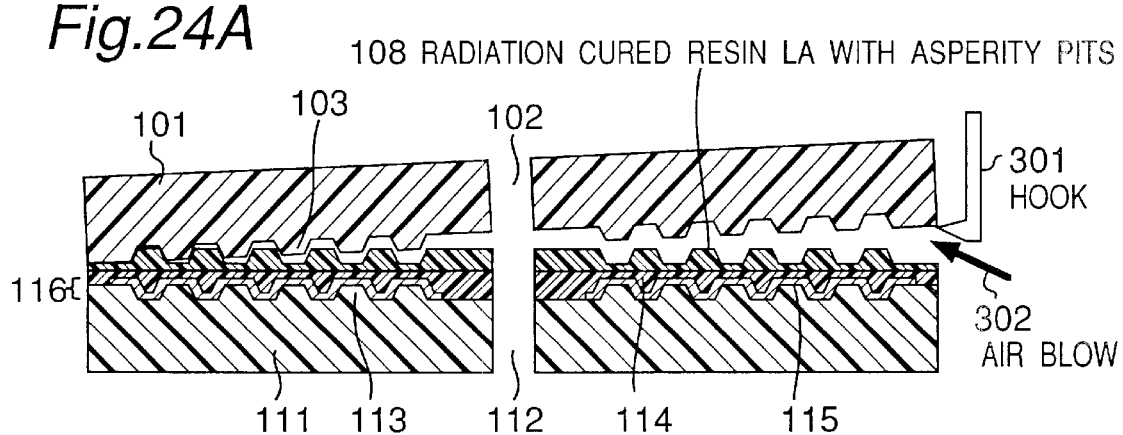
FIGS. 24A and 24B are drawings showing a process (4) of the manufacturing method of the optical disk according to the fourth embodiment of the present invention.
Figure 24B:
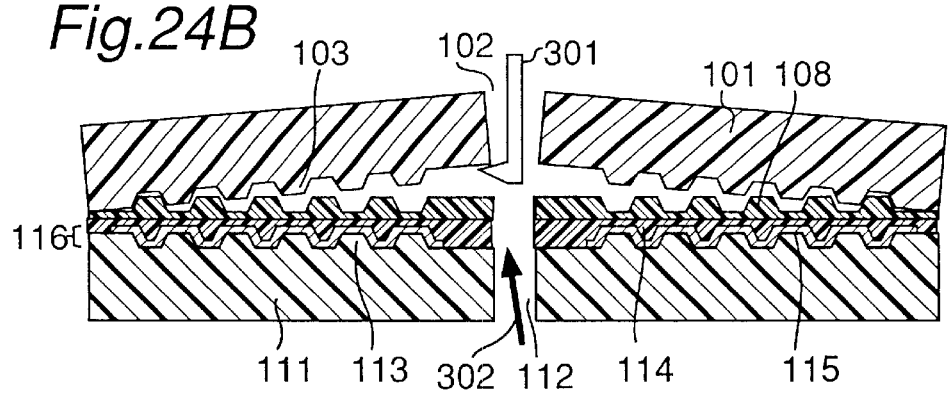

The resin stamper 101 is then peeled off at the interface between the resin stamper 101 and the radiation cured resin LA 108 (the radiation cured resin LA 104 to which the asperity pits are transferred) as shown in FIGS. 24A and 24B. This allows the radiation cured resin LA 108 to which the asperity pits are transferred to be formed on the information recording layer 116 of the first substrate 111. In this embodiment, a part of the outer or inner periphery of the resin stamper 101 raised up with a hook 301 formed in a hook shape and blow air 302 into the interface between the stamper and the first substrate with using an air blower to separate them. The outer circumference diameter of the resin stamper 101 may be approximately equal to that of the first substrate 111. In FIG. 24A, the outer diameters of the stamper 101 and the first substrate 111 may be set to be different, and thus the hook 301 can be easily inserted into the interface of the stamper and the first substrate, to effectively separate them. For example, the resin stamper 101 may be formed to have a diameter larger than that of the first substrate 111 by 0.5 to 1 mm, for example. The outer periphery of the resin stamper 101 can formed to have a thickness smaller than that of the inner portion by about 0.1 to 0.3 mm such that the hook 301 can be easily inserted into the interface. It is preferable to employ as the radiation cured resin LA 108 the radiation cured resin excellent in stickability and transferability and having poor adhesion to the resin stamper 101.

Especially, it is preferable to employ, as the radiation cured resin LB 114, the radiation cured resin having high adhesion to the information recording layer 116 of the first substrate 111 and the radiation cured resin LA 108. In contrast, it is preferable to employ, as the radiation cured resin LA 104, the radiation cured resin having poor adhesion to the resin stamper 101. In this manner, by employing the radiation cured resin LA that has poor adhesion to the resin stamper 101, and the radiation cured resin LB that has high adhesion to both the information recording layer 116 of the first substrate 111 and the radiation cured resin LA, the resin stamper 101 can be separated from the radiation cured resin LA more easily. In order to avoid the sticking the radiation cured resin LA 108 (104) to the resin stamper 101, which makes the separation difficult, the radiation cured resin LA 108 may be applied such that the resin LA 108 is extended to the outer periphery of the resin stamper 101 and that the inner circumference diameter of the resin LA 108 is smaller than that of the resin LA 104. It is preferable that the hardness of the radiation cured resin LA which adheres to the stamper to transfer the pits is higher than that of the radiation cured resin LB for bonding the radiation cured resin LA and the information recording layer, and that the glass transition temperature of the radiation cured resin LA is higher than that of the radiation cured resin LB. By employing two types of radiation cured resins in this manner, the transferability and the stickability can be separated to the different types of the radiation cured resins, which makes the development of the radiation cured resin easy.

The stamper 101 may be processed to facilitate the separation in consideration of the separation of the radiation cured resin LA. The stamper 101 may have the film mainly formed from metal such as Si, Ag, or Au, or a non-metal film such as a dielectric thin film. The asperity pits 103 on the resin stamper 101 or the thin film formed on the resin stamper 101 may be applied with a release agent such as siloxane, a fluoromonomoleclular film, or the like. The stamper 101 may be formed from material having a predetermined level of transmittance of ultraviolet rays, such as glass or metal silicon, instead of resin.

Figure 25:
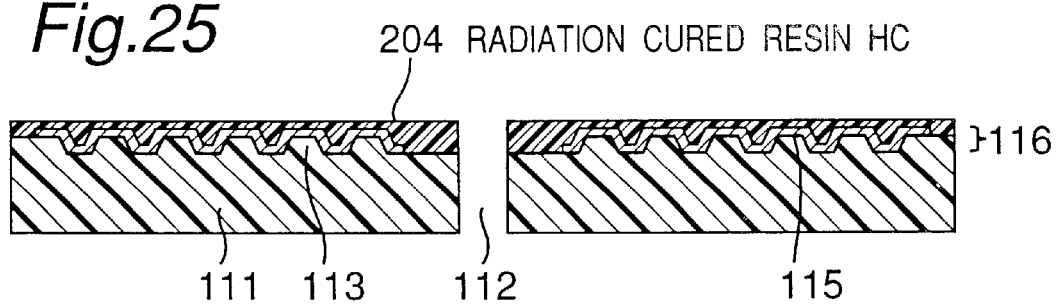
FIG. 25 is a drawing showing a process (5) of the manufacturing method of the optical disk according to the fourth embodiment of the present invention.

The information recording layer 116 has poor tensile strength, the information recording layer 116 may be damaged in peering the resin stamper 101. By applying third radiation cured resin (hereinafter referred to as "radiation cured resin HC") onto the information recording layer 116 to protect it as shown in FIG. 25 in advance, the damage to the information recording layer 116 may be prevented. In this time, the radiation cured resin HC is preferably applied to cover at least the inner peripheral edge to the outer peripheral edge of the information recording layer 116. Further, it is preferable that the inner periphery of the radiation cured resin HC covers a part or all of the clamp region of the first substrate 111, and the outer periphery of the radiation cured resin HC covers the outer peripheral edge of the first substrate 111. In this time, the radiation cured resin HC preferably has hardness higher than the pencil hardness of B.

Figure 26A:
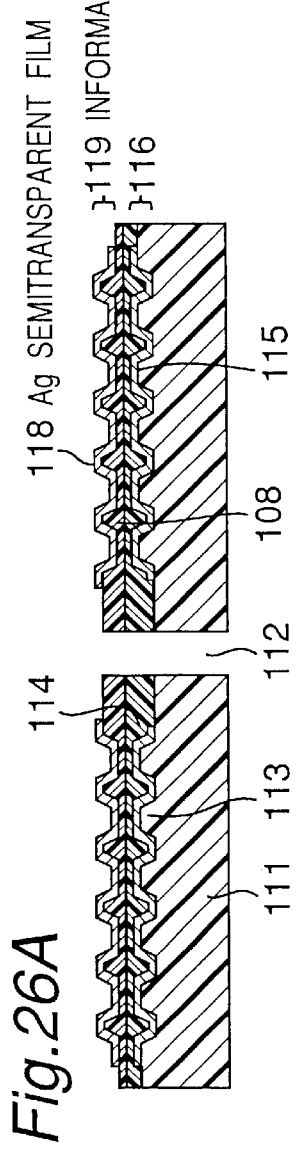
FIGS. 26A to 26C are drawings showing a process (6) of the manufacturing method of the optical disk according to the fourth embodiment of the present invention.
Figure 26B:
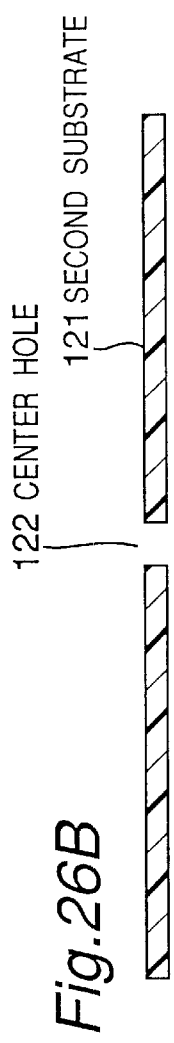

As shown in FIG. 26A, a semitransparent reflective film 118 (in the present embodiment, a metal film mainly composed of Ag) is formed with a thin 20 nm thickness onto the first substrate 111 on which the asperity pits are transferred, in order to make the second information recording layer 119. The reflective film 118 may be formed from metal mainly composed of Rh, or formed of a dielectric reflective film. The second substrate 121 shown in FIG. 26B is formed of a polycarbonate sheet-like substrate having a thickness of 80 μm, an outer circumference diameter 119.5 mm, and a center hole 122 with a 22 mm diameter. The second substrate 121 has no information recording layer, and is formed smooth. The second substrate 121 is formed by cutting a sheet made by the casting method. The second substrate 121 may be formed of acrylic resin, norbolnane-based resin, or the like.

Figure 26C:
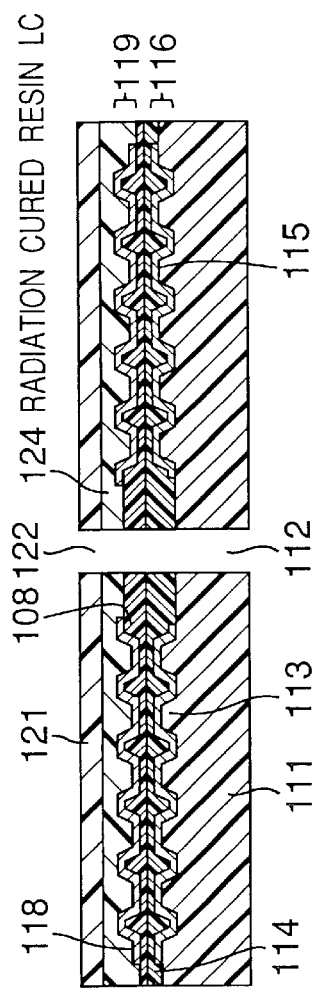

The second substrate 122 and the first substrate 111 on which the information recording layer 116 and the information recording layer 119 are formed are bonded to each other via fourth radiation cured resin (hereinafter referred to as "radiation cured resin LC") 124 such that the information recording layers 116 and 119 formed on the principal planes face to each other, as shown in FIG. 26C. The substrates are bonded by the same method as used to bond the resin stamper 101 and the first substrate 111. More specifically, the radiation cured resin LC is applied on one of the substrates substantially circularly, the substrates are overlapped on each other, and then the first and second substrates 111 and 121 integrated by the radiation cured resin LC are rotated to spread the radiation cured resin LC substantially uniformly. After spreading the resin, ultraviolet radiation is emitted to cure the radiation cured resin LC.

Using the sheet-like second substrate 121 as a light transmission layer, the light transmission layer can be formed to have a substantially uniform thickness. The radiation cured resin LB and the radiation cured resin LC may be made of the same material. The thickness of the optical information recording medium formed with the light transmission layer is set at 1.2 mm to have a compatibility to CD or DVD thickness.

Figure 27A:
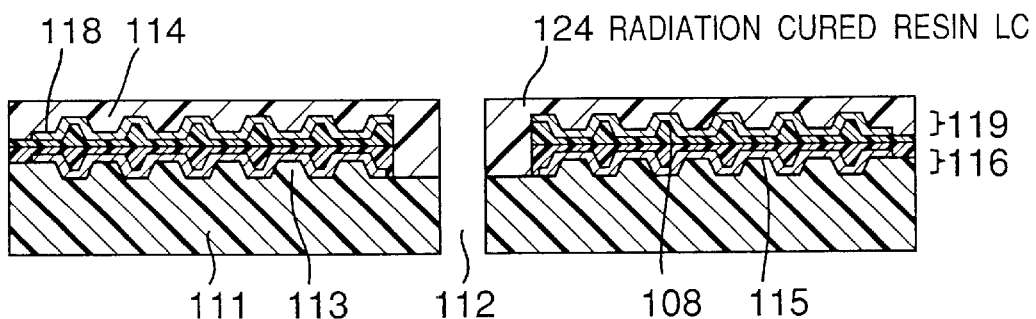
FIGS. 27A and 27B are drawings showing a process (7) of the manufacturing method of the optical disk according to the fourth embodiment of the present invention.
Figure 27B:
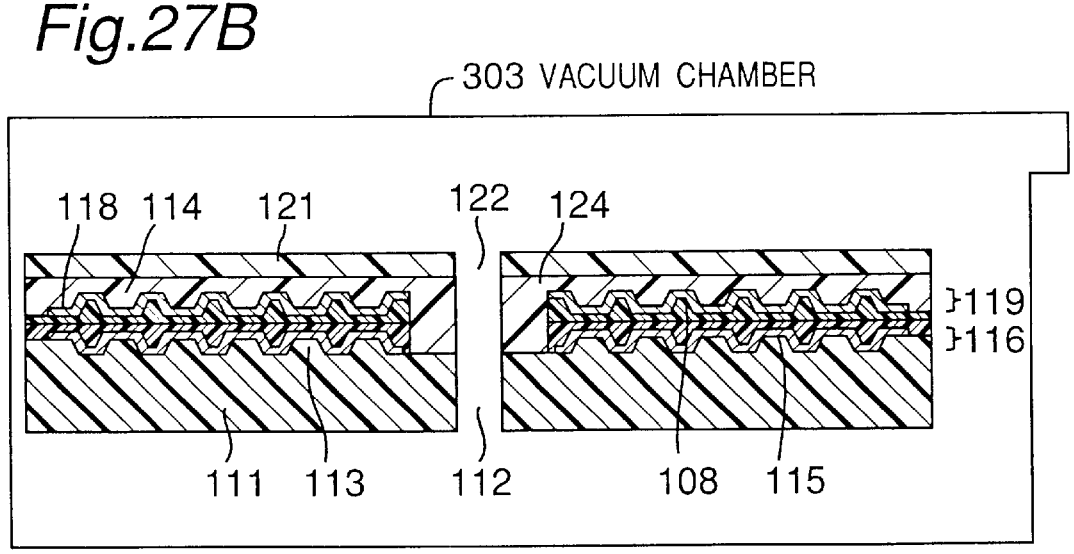

The resin stamper 101 and the first substrate 111, and the first substrate 111 and the second substrate 121 may be bonded in a vacuum circumstance. The case wherein the first substrate 111 and the second substrate 121 are bonded each other will be described below as an example. Radiation cured resin is spin-coated on either or both of the substrates 111 and 121, (or on the plane adhering to the resin stamper 101) as shown in FIG. 27A. Then the substrates are overlapped on each other in a vacuum chamber 303 as shown in FIG. 27B, and the radiation cured resin is cured by radiation thereafter. By bonding the substrates or the resin stamper in a vacuum in this manner, no care needs to be taken for preventing the insertion of bubbles into the interface thereof. Further, the stickiness between the radiation cured resin and the substrate or the stamper can be thereby improved. With the improvement of the stickiness of the substrate, the transferability of the asperity pits can be also improved.

When the light transmission layer is formed from the radiation cured resin, the manufacturing cost can be reduced. According to the present embodiment, the light transmission layer is provided to the optical disk. If the optical information recording medium is stable without the light transmission layer, the light transmission layer does not need to be formed.

Fifth Embodiment

Figure 28:
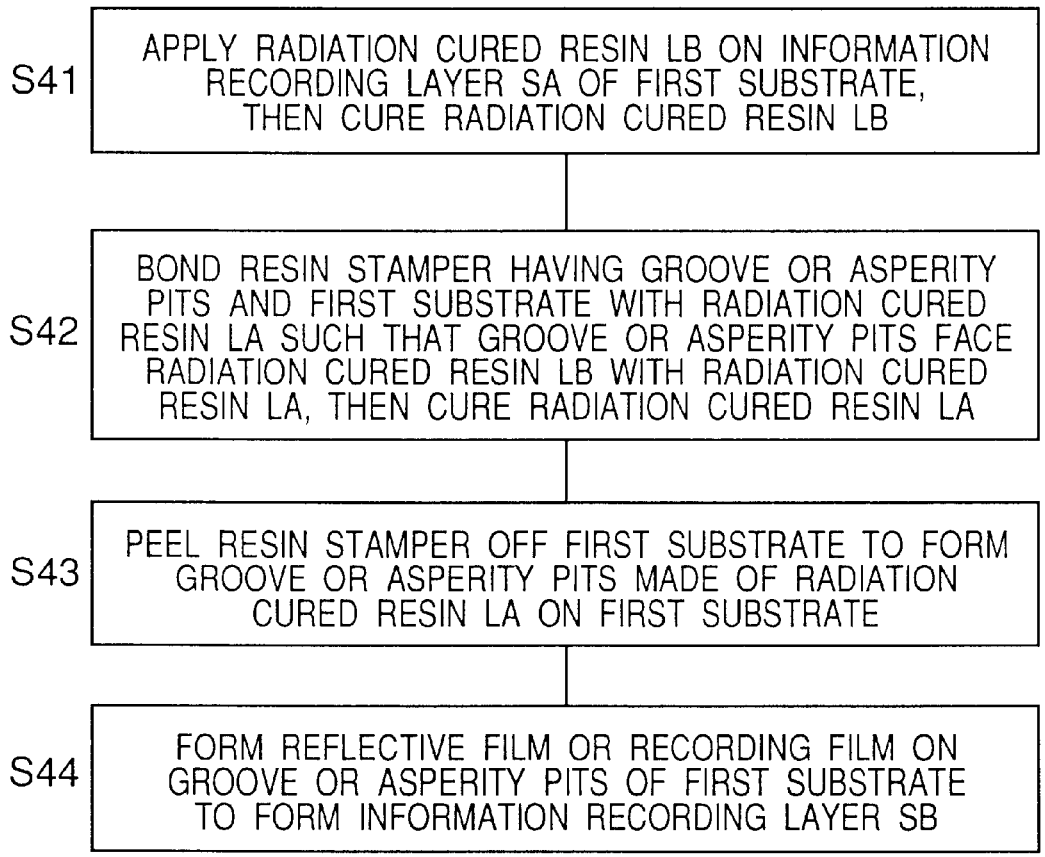
FIG. 28 is a flowchart showing a flow of the manufacturing method of the optical disk according to the fifth embodiment of the present invention.

An additional embodiment of a manufacturing method of an optical disk according to the present invention will be described in conjunction with FIGS. 28 to 29B. FIG. 28 is a flowchart showing a flow of manufacturing method of the optical disk according to the fifth embodiment. The same or like description as presented in the above embodiments will be omitted. A resin stamper 401 and a first substrate 411 are the same as those of the above-mentioned embodiments (101 and 111).

Figure 29A:
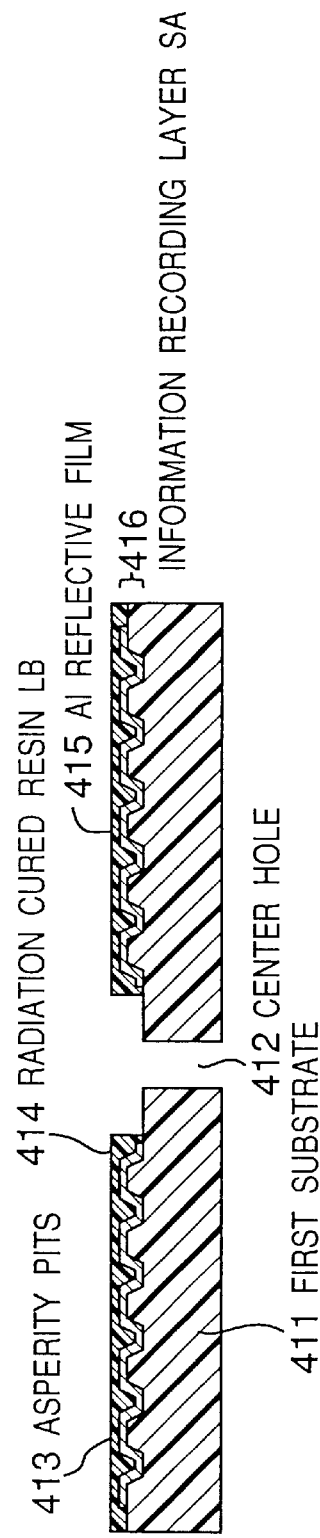
FIGS. 29A and 29B are drawings showing a process of the manufacturing method of the optical disk according to the fifth embodiment of the present invention.
Figure 29B:
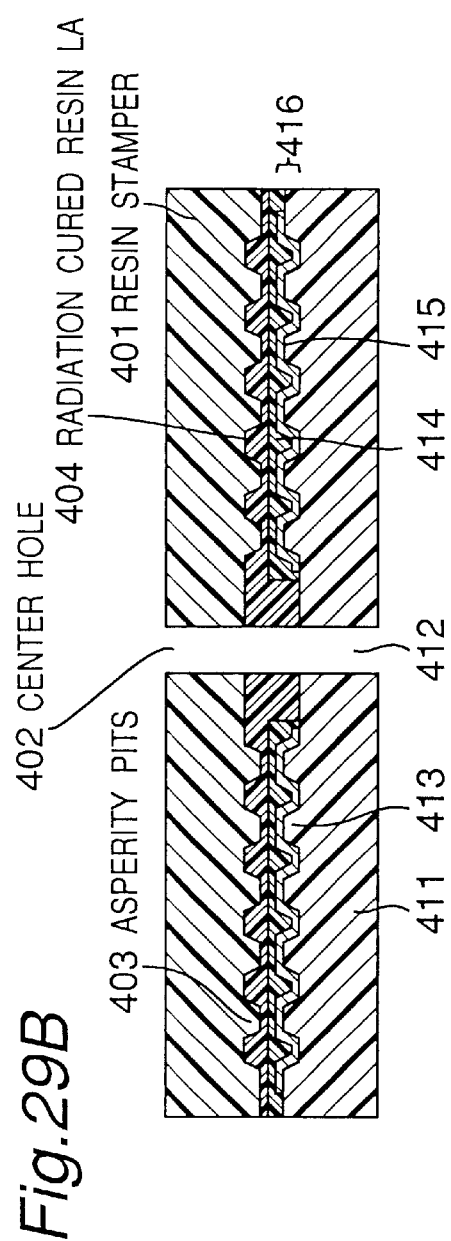

As shown in FIG. 29A, radiation cured resin LB 414 is applied onto an information recording layer 416 of the first substrate 411, and the radiation cured resin LB is cured by emitting radiation. The radiation cured resin is applied substantially uniformly by the spinning in the same method as the case in conjunction with FIGS. 21B and 21C in the fourth embodiment. Then, with the same method shown in FIGS. 23C and 24A of the fourth embodiment, the resin stamper 401 is bonded with the first substrate 411 by radiation cured resin LA 404 as shown in FIG. 29B, and the radiation is emitted to cure the radiation cured resin LA.

By making inner circumference diameters of the resin stamper 401 and the first substrate 411 equal, the center of the information recording layer SA of the first substrate 411 can be aligned to the center of the asperity pits 403 of the resin stamper 401. The alignment can be easily attained by providing the spin table with a center pin having substantially equal size to that of center holes 402 and 412. In order to decrease the eccentricity more, a mechanism for aligning the centers before extending and curing the radiation cured resin may be provided. The radiation is emitted to cure the radiation cured resin LA. As described in the first embodiment, since the first substrate has the information recording layer SA, the radiation cured resin LA cannot be easily cured by the radiation emitted from the side of the first substrate. Accordingly, the radiation transmittance of the resin stamper must be sufficient to cure the radiation cured resin. In the present embodiment, the stamper is made of transparent polycarbonate to facilitate the resin curing. The stamper may be made of another material if the material has sufficient radiation transmittance.

As described in the fourth embodiment, the resin stamper 401 and the first substrate 411 may be bonded in a vacuum circumstance. By bonding in a vacuum circumstance, no care needs to be taken for preventing bubbles from being inserted into the interface thereof. Further, the stickiness of the radiation cured resin to the substrate or the stamper can be thereby improved. Further, the transferability of the asperity pits onto the radiation cured resin can be also thereby improved.

The resin stamper 401 is then peeled off the radiation cured resin LA 108 as described in conjunction with FIGS. 24A and 24B in the fourth embodiment. It is preferable to employ as the radiation cured resin LA the radiation cured resin which is excellent in stickability and transferability and which has poor adhesion to the resin stamper 401. In order to avoid the sticking the radiation cured resin LA to the resin stamper 401, which makes the separation difficult, the radiation cured resin LB is applied such that the radiation cured resin LB is extended to the outer periphery of the resin stamper 401, and that the inner circumference diameter of the radiation cured resin LB is smaller than that of the radiation cured resin LA. By employing two types of radiation cured resins, effects of the transferability and the stickability can be separated to the different types of the radiation cured resins, respectively, resulting in more easiness in developing the radiation cured resin.

The stamper 401 may be processed to facilitate the separation in consideration of the separation of the radiation cured resin LA. For example, the stamper 401 may have the film mainly made of metal such as Si, Ag, or Au, or a non-metal film such as a dielectric thin film. The asperity pits on the resin stamper 401 or the thin film formed on the resin stamper 401 may be applied with a release agent.

When the information recording layer 416 has poor tensile strength, the information recording layer 416 may be damaged in peering the resin stamper 401. By applying radiation cured resin HC onto the information recording layer 416 to protect it in advance as shown in FIG. 25 of the fourth embodiment, the damage to the information recording layer 416 may be prevented. In this time, the radiation cured resin HC is preferably applied to cover from the inner peripheral edge to the outer peripheral edge of the information recording layer 416. Further, it is preferable that the inner periphery of the radiation cured resin HC covers a part or all of the clamp region of the first substrate 411, and that the outer periphery of the radiation cured resin HC covers the outer peripheral edge of the first substrate 411. In this time, the radiation cured resin HC preferably has a hardness higher than the pencil hardness B.

The following steps of forming a semitransparent reflective film to make a light transmission layer are performed by the same way as in the fourth embodiment. Thus, the optical information recording medium such as shown in FIG. 26C of the fourth embodiment can be attained.

Sixth Embodiment

Figure 30:
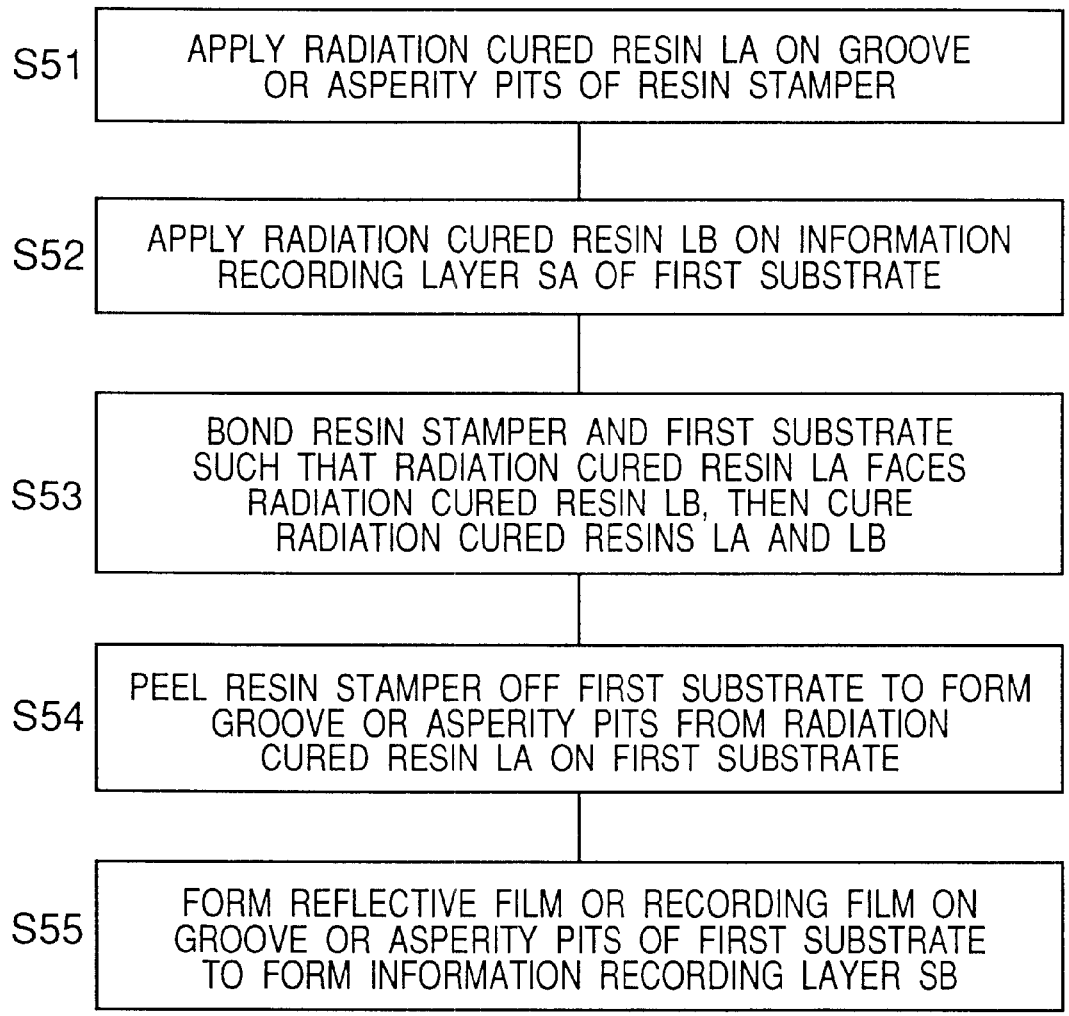
FIG. 30 is a flowchart showing a flow of the manufacturing method of the optical disk according to the sixth embodiment of the present invention.

Another embodiment of a manufacturing method of an optical disk according to the present invention will be described in conjunction with FIGS. 30 to 31C. FIG. 30 is a flowchart showing a flow of manufacturing method of the optical disk according to the sixth embodiment. The same or like description as presented in the above embodiments will be omitted. The resin stamper and the first substrate are the same as those of the above-mentioned embodiments.

As shown in FIG. 31A the radiation cured resin LA 504 is applied onto the asperity pits 503 of the resin stamper 501, and as shown in FIG. 31B the radiation cured resin LB 514 is applied onto a signal recording layer SA 116 of the first substrate 511. As in the steps in conjunction with FIGS. 21B and 21C of the fourth embodiment, the radiation cured resin is applied substantially uniformly by the spinning.

Figure 21C:
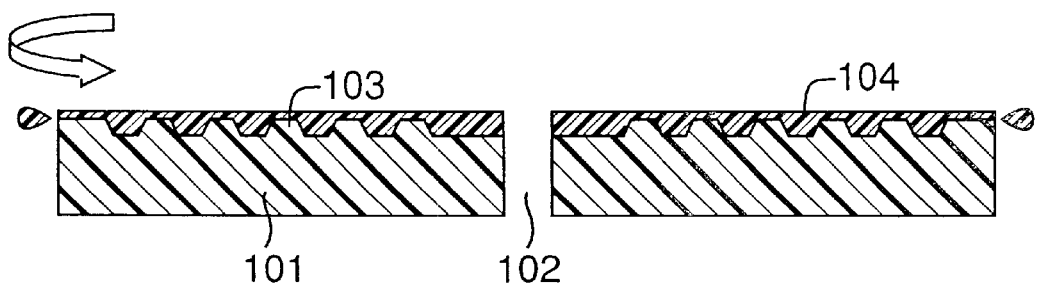

Then, with the same method shown in FIG. 21C, the resin stamper 501 is placed over the first substrate 511 such that the radiation cured resins LA and LB face each other (see FIG. 31C). The placing is performed in a vacuum to prevent the insertion of bubbles. After the placing, the radiation is emitted to cure the radiation cured resins LA and LB. Since the first substrate 511 has the information recording layer 516, the radiation cured resin LA cannot be easily cured by the radiation emitted from the side of the first substrate 511. Accordingly, the radiation transmittance of the resin stamper 501 must be sufficient to cure the radiation cured resin. In the present embodiment, the stamper is made of transparent polycarbonate to facilitate the resin curing. The stamper may be made of another material if the material has sufficient radiation transmittance.

By making the inner circumference diameters of the resin stamper 501 and the first substrate 511 equal, the center of the information recording layer SA of the first substrate 511 can be aligned to the center of the asperity pits 503 of the resin stamper 503. The alignment can be easily attained by providing the spin table with a center pin having substantially equal size to that of the center holes 502 and 512. In order to decrease the eccentricity more, a mechanism for aligning the centers after extending the radiation and before curing the radiation cured resin may be provided.

The resin stamper is then peeled off in a way as shown in FIGS. 24A and 24B in the fourth embodiment. It is preferable to employ as the radiation cured resin LA the radiation cured resin which is excellent in stickability and transferability and which has poor adhesion to the resin stamper. It is preferable to employ as the radiation cured resin LB the radiation cured resin which has high adhesion to the information recording layer of the first substrate and the radiation cured resin LA. Adherence of the radiation cured resin LA to the first substrate, or the radiation cured resin LB to the resin stamper makes the separation difficult. To solve the problem, the radiation cured resin LB is extended to the outer periphery of the first substrate, and the radiation cured resin LA is extended to the outer periphery of the stamper. By employing two types of radiation cured resins, effects of the transferability and the adhesion can be separated to the different types of the radiation cured resins, respectively, resulting in easiness in developing the radiation cured resin.

The stamper 501 may be processed to facilitate the separation in consideration of the separation of the radiation cured resin LA, as in the fourth embodiment.

By placing radiation cured resin HC onto the information recording layer SA to protect it in advance as shown in FIG. 25 of the fourth embodiment, the damage to the information recording layer SA may be reduced. In this time, the radiation cured resin is preferably applied to cover at least from the inner peripheral edge to the outer peripheral edge of the information recording layer SA. Further, it is preferable that in the inner periphery, the radiation cured resin HC covers a part or all of the clamp region of the first substrate, and in the outer periphery, the radiation cured resin HC covers the outer peripheral edge of the first substrate. In this time, the radiation cured resin HC preferably has the hardness higher than the pencil hardness B.

The following steps including forming a semitransparent reflective film on the first substrate to which the pits are transferred to make a light transmission layer are the same as those in the first embodiment. With this method, the optical information recording medium as shown in FIG. 26C of the fourth embodiment can be obtained.

Seventh Embodiment

Figure 32:
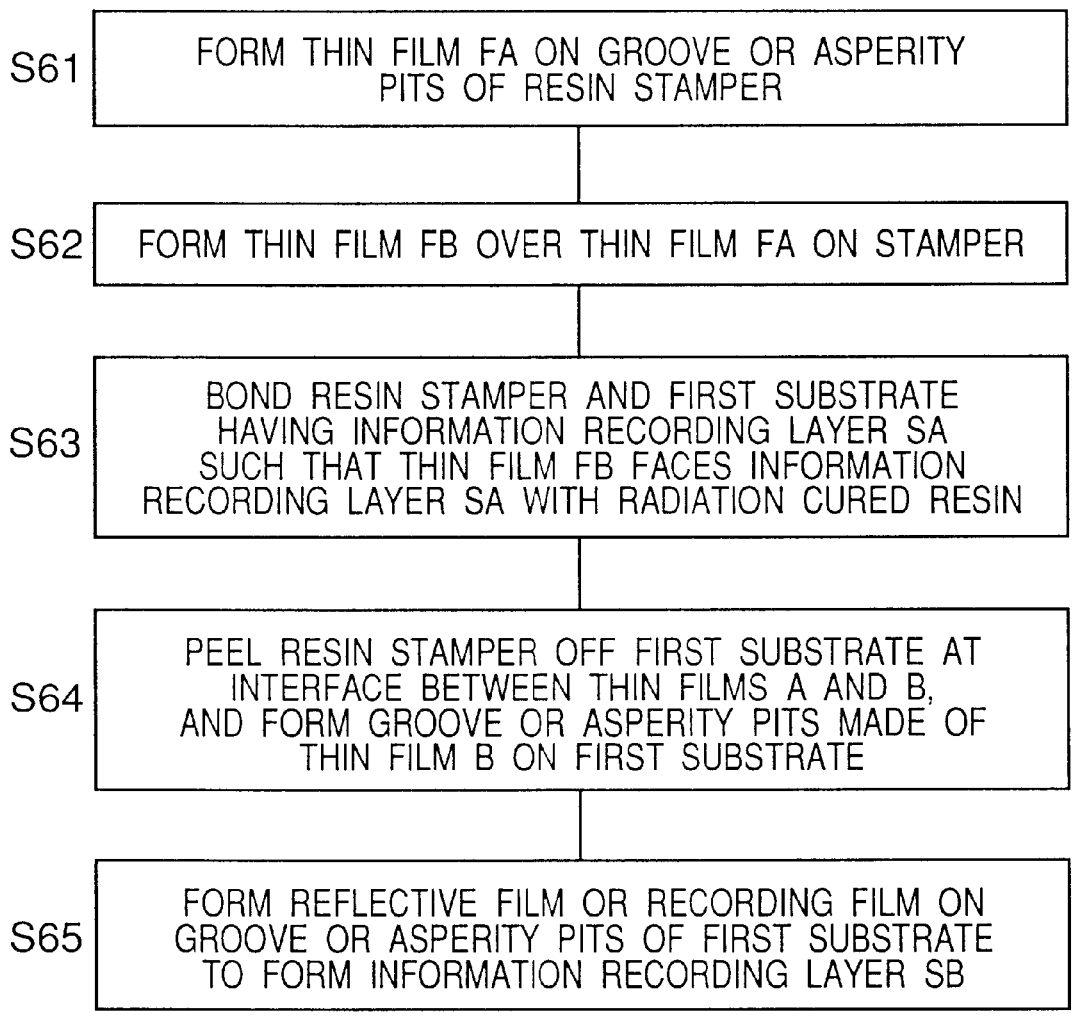
FIG. 32 is a flowchart showing a flow of the manufacturing method of the optical disk according to the seventh embodiment of the present invention.

Another embodiment of a manufacturing method of an optical disk according to the present invention will be described in conjunction with FIGS. 32 to 35B. FIG. 32 is a flowchart showing a flow of manufacturing method of the optical disk according to this embodiment. The same or like description as presented in the above embodiments will be omitted. The resin stamper and the first substrate are the same as those of the above-mentioned embodiments.

Figure 33A:
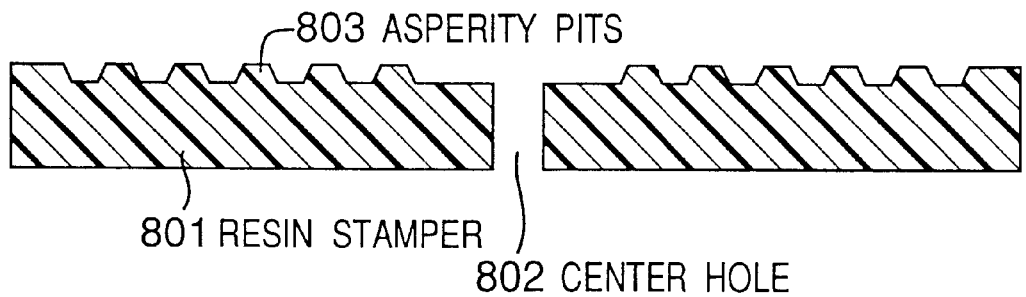
FIGS. 33A to 33C are drawings showing a process (1) of the manufacturing method of the optical disk according to the seventh embodiment of the present invention.

A resin stamper 801 shown in FIG. 33A is formed of a polycarbonate substrate made by the injection molding to have a thickness of 1.1 mm, a diameter 120 mm, and a center hole 802 with a 15 mm diameter. The resin stamper 801 has asperity pits 803 on one of principal planes. A resin stamper 801 may be made of resin material other than polycarbonate, such as acrylic resin, polyolefin-based resin, or the like. The resin stamper 801 has the thickness of 1.1 mm in this embodiment, but may have a smaller thickness, for example, of 0.6 mm. By reducing the thickness, the material cost can be further decreased.

Figure 33B:
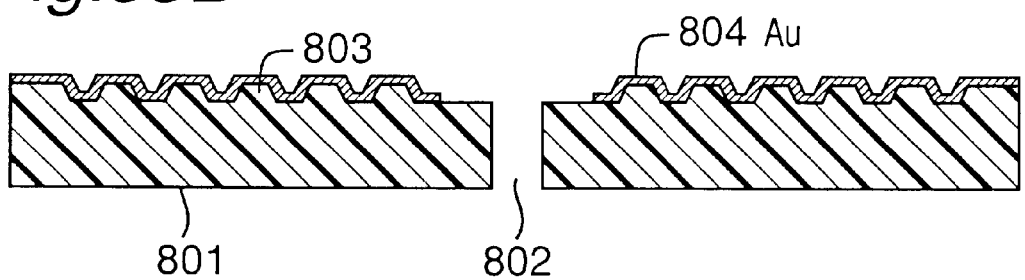
Figure 33C:
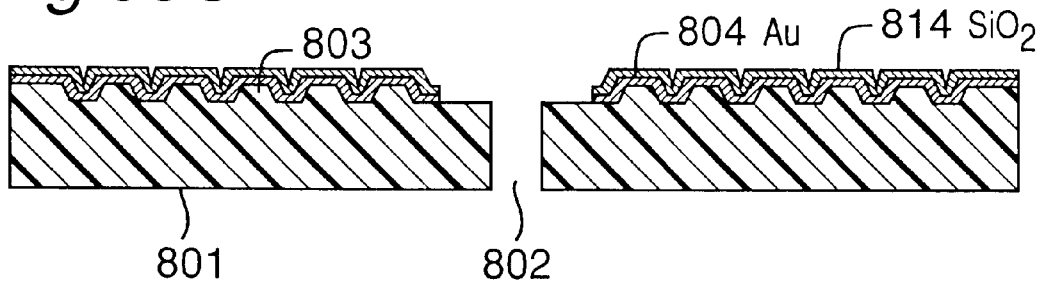

As shown in FIG. 33B, a first thin film (hereinafter referred to as "thin film FA") 804 is formed over the asperity pits 803 of the resin stamper 801. The thin film FA is formed by sputtering Au for an approximate 20 nm thickness. Subsequently, as shown in FIG. 33C, a second thin film (hereinafter referred to as "thin film FB") 814 is formed over the thin film FA. The thin film FB is formed by sputtering $SiO_2$ for a approximate 20 nm thickness.

Figure 34A:
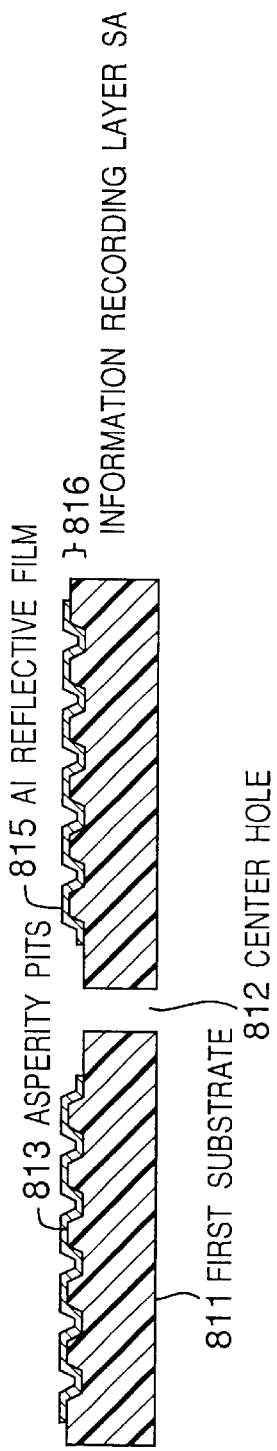
FIGS. 34A to 34C are drawings showing a process (2) of the manufacturing method of the optical disk according to the seventh embodiment of the present invention.

The first substrate 811 shown in FIG. 34A is formed from a polycarbonate substrate made by injection molding to have a thickness of 1.1 mm, a diameter 120 mm, and a center hole 812 with a 15 mm diameter. The first substrate 811 has on one of its principal planes an information recording layer SA 816 comprising asperity pits 813 and an Al reflective film 815. The first substrate 811 may be formed of resin material other than polycarbonate, such as acrylic resin, polyolefin-based resin, or the like. The first substrate 811 is not the substrate on which the recording/reproduction is performed, and thus may be formed from non-transparent resin having low transmittance.

Figure 34B:
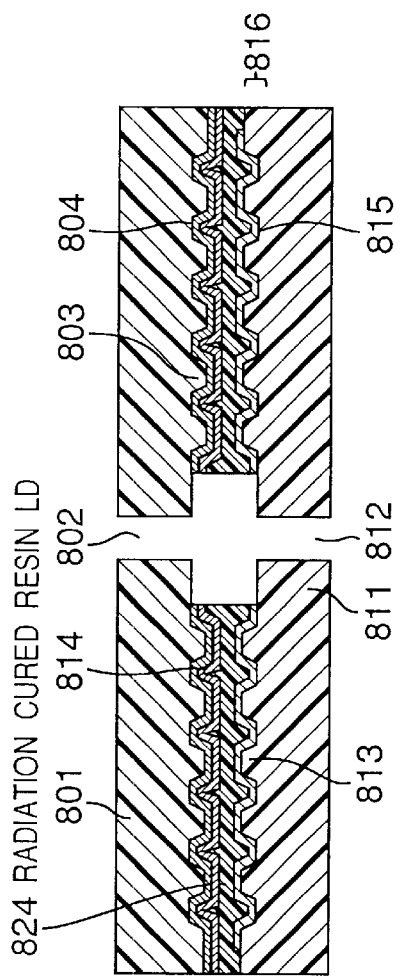

In the same manner as shown in FIGS. 22C to 23C of the fourth embodiment, the resin stamper 801 is bonded to the first substrate 811 with radiation cured resin LD 824 as shown in FIG. 34B. By making inner circumference diameters of the resin stamper 801 and the first substrate 811 equal to each other, the center of the information recording layer 816 of the first substrate 811 can be aligned to the center of the asperity pits 803 of the resin stamper 801. The alignment can be easily attained by providing the spin table with a center pin having substantially equal size to that of the center holes 802 and 812. In order to decrease the eccentricity more, a mechanism for aligning the centers after extending and before curing the radiation cured resin may be provided.

Figure 34C:
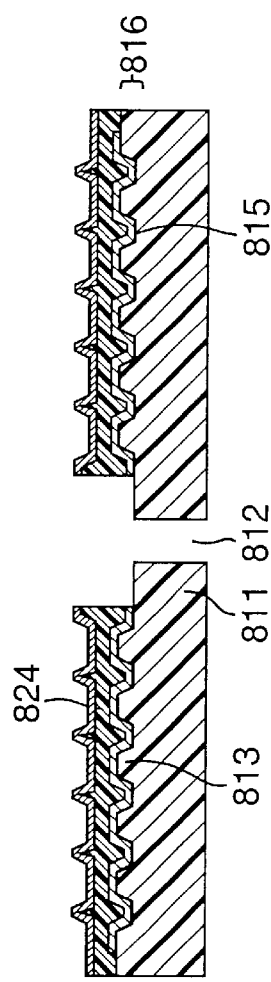

The resin stamper 801 is then peeled off at the interface of the thin film FA 804 and the thin film FB 814 in the same manner as shown in FIGS. 24A and 24B in the fourth embodiment. By peeling the stamper in this manner, the asperity pits 808 made of $SiO_2$ are formed on the first substrate 811 as shown in FIG. 34C. Since Au and $SiO_2$ have low adhesion, it is easy to separate them. The combination of the materials of the thin films can be changed in consideration of adhesion and transferability. The thin films FA and FB can be formed from a plurality of materials, respectively. The thin film FB is preferably transparent since the recording/reproducing light passes therethrough. Since bond of the thin film FB and the resin stamper makes the separation difficult, it is preferably that the outer circumference diameter of the thin film FA is set to be larger than that of the thin film FB, and that the inner circumference diameter of the thin film FA is set to be smaller than that of the thin film FB.

By placing radiation cured resin HC over the information recording layer SA to protect it in advance as shown in FIG. 25, the damage to the information recording layer SA may be prevented. In this time, the radiation cured resin HC is preferably applied to cover at least the inner peripheral edge to the outer peripheral edge of the information recording layer SA. Further, it is preferable that in the inner periphery the radiation cured resin HC covers a part or all of the clamp region of the first substrate, and that in the outer periphery the radiation cured resin HC covers the outer peripheral edge of the first substrate. In this time, the radiation cured resin HC preferably has the hardness higher than the pencil hardness B.

The semitransparent reflective film (in this embodiment, a film formed from metal mainly composed of Ag) 818 is formed to have a thickness of 20 nm on the first substrate 811 on which the asperity pits are transferred as shown in FIG. 35A, to form a second information recording layer 819. The following steps including forming a semitransparent reflective film to make a light transmission layer are performed as in the fourth embodiment. This can provide the optical information recording medium as shown in FIG. 35B.

Eighth Embodiment

It is described above that the second information recording layer can be easily formed over the first information recording layer of the first substrate according to any one of the manufacturing methods of the fourth to seventh embodiments. In the first to seventh embodiments, the information recording medium having a double layer structure as shown in FIGS. 26C and 35B is described. Furthermore, the information recording medium having a triple, a four layer, as shown in FIGS. 36A and 36B, or a five or more layer (multilayer) structure can be formed over the first information recording layer of the first substrate by repeatedly performing the process as described in the fourth to seventh embodiments.

In this embodiment, the radiation cured resin HC is used for a protection layer, the radiation cured resin LB or the radiation cured resin LD for an intermediate layer, the radiation cured resin LA or the thin film FB, and the information recording layer for a recording layer. As described in the fourth to seventh embodiments, the protection layer does not have to be provided to the optical disk if the information recording layer will not be deteriorated by damage or corrosion. As described in the above-mentioned embodiments, a light transmission layer is not essential for the optical disk, but it is preferable to be provided to the optical disk in order to protect the information recording layer. The optical recording/reproducing system of the present embodiment can set N.A. to around 0.9 and the wavelength to around 400 nm. In order to maintain the tilt margin at the same level as that of the DVD, the light transmission layer has a thickness of approximate 0.1 mm.

When the information recording medium is formed to have more than one basic layer comprising the protection layer, the intermediate layer, and the recording layer, or comprising the intermediate layer and the recording layer, as described above, a high-density information recording medium having a plurality of information recording layers can be attained and manufactured with ease by using the method described in any of the fourth to seventh embodiments. In consideration of the influence of the crosstalk, the crosserase, and the spherical aberration during recording or reproducing operation, the thickness of the basic layer may be preferably set within a scope from 15 µm to 45 µm, more preferably, from 20 µm to 40 µm.

In consideration of the influence of the deterioration or the like of the recording/reproducing light beam, the refractive indexes of the protection layer and the intermediate layer are set substantially equal. In consideration of the influence of the deterioration or the like of the recording/reproducing light beam due to the absorption, the protection layer and the intermediate layer are made of substantially transparent material. The information recording layer and the recording layer thereof may be formed as a read-only type, or a rewritable type. Similarly, one information recording medium may have both the recording types.

According to the third to eighth embodiments, the multilayer optical information recording medium can be easily formed. Especially, it is possible to make a multilayer optical disk having a thin substrate from a side of which laser beam is emitted to record/reproduce data. Since the stamper is made of hard material operable to pass a part of the radiation having a specific wavelength, more specifically of resin, the stamper is light and flexible to be easily handled.

Further, the radiation cured resin for transmitting signal pits can be spread substantially uniformly on the substrate by rotating the substrate with the use of substantially the same apparatus used for the adhesion step in the manufacturing step of the DVD. In addition, even if the stamper cannot be easily peeled off the substrate and needs to be replaced with a new one, the stamper can be easily replaced with the new one, since the stamper is made of resin and can be formed in mass production at a low manufacturing cost. According to the present invention, the above-mentioned advantages can be attained.

In the above-mentioned embodiments, the resin stamper separated to transfer the asperity pits can be re-used, or may be abandoned if the efficiency of transferring the signal is deteriorated by repeated use. The stamper can be made of low-cost material, and thus the disk manufacturing cost will be decreased in comparison with the case using a plurality of metal stampers. Further, the resin stamper can be formed in mass-production by injection molding.

In the above-mentioned embodiments, a so-called read-only type information recording medium is described which has an information recording layer comprising the asperity pits corresponding to the recorded data signal and the reflective layer. The present invention is, however, not limited to such a read-only type information recording medium, but also can be applied to the recordable type recording medium comprising a thin film layer on which a data signal can be recorded after the disk has been manufactured.

In the above-mentioned embodiments, on the stamper, a groove may be provided instead of or as well as the asperity pits.

According to the above-mentioned manufacturing method, the optical disk having information recording layers can be formed on the substrate having a thickness of 0.3 mm or less which cannot be formed by the injection molding, and the optical disk having high density can be attained.

Although the present invention has been described in connection with specified embodiments thereof, many other modifications, corrections and applications are apparent to those skilled in the art. Therefore, the present invention is not limited by the disclosure provided herein but limited only to the scope of the appended claims.

What is claimed is:

1. A method of manufacturing an optical information recording medium, said manufacturing method comprising:
   bonding a stamper having a principal plane formed with a groove or asperity pits and a second substrate having a thickness of 0.3 mm or less with radiation cured resin so as to cause the groove or the asperity pits to face to the second substrate, the stamper being transparent, and the groove or the asperity pits having a thin film formed thereon;
   emitting radiation so as to pass at least a part of the radiation through the stamper to cure the radiation cured resin;
   peeling off the stamper to form the groove or the asperity pits on a face the second substrate;
   forming a metal film or a recording film on the groove or the asperity pits on the second substrate to create a second information recording layer on the second substrate; and
   bonding a first substrate and the second substrate on which the second information recording layer is formed, such that the second information recording layer is placed between the first and second substrates.

2. The manufacturing method according to claim 1, wherein the first substrate has a first information recording layer on a plane at which the first substrate adheres to the second substrate.

3. The manufacturing method according to claim 1, wherein a light beam for data recording or data reproduction is emitted from a side of the second substrate.

4. The manufacturing method according to claim 1, wherein the stamper is formed by injection molding.

5. The manufacturing method according to claim 1, wherein the stamper is made of resin.

6. The manufacturing method according to claim 5, wherein the resin is polycarbonate.

7. The manufacturing method according to claim 1, wherein said bonding of the stamper and the second substrate comprises rotating the stamper and the second substrate integrated by the radiation cured resin to spread the radiation cured resin substantially uniformly.

8. The manufacturing method according to claim 1, wherein said bonding of the stamper and the second substrate comprises,
   applying the radiation cured resin substantially uniformly on a part or whole of a adhering plane of at least one of the stamper and the first substrate, and
   bonding the stamper and the second substrate in a vacuum.

9. The manufacturing method according to claim 1, wherein the thin film is made of metal or semimetal.

10. The manufacturing method according to claim 9, wherein the metal is aluminum or metal mainly composed of aluminum.

11. The manufacturing method according to claim 9, wherein the semimetal is silicon or metal mainly composed of silicon.

12. The manufacturing method according to claim 1, further comprising applying the thin film with a release agent thereon to the groove or the asperity pits.

13. The manufacturing method according to claim 1, wherein a thickness of the second substrate is substantially 0.1 mm.

14. The manufacturing method according to claim 1, wherein a thickness of a clamp portion after the first substrate and the second substrate are bonded together is substantially 1.2 mm.

15. The manufacturing method according to claim 1, wherein a thickness of the stamper is substantially equal to that of the first substrate.

16. The manufacturing method according to claim 1, wherein each of the stamper and the second substrate has a center hole, and the center holes of the stamper and the second substrate have different diameters.

17. The manufacturing method according to claim 1, wherein the stamper and the second substrate have different outer diameters.

18. The manufacturing method according to claim 1, further comprising
bonding a supporting substrate and the second substrate at a face of the second substrate opposite to the face formed with the groove or the asperity pits,
wherein the metal film is a reflective film.

19. The manufacturing method according to claim 18, wherein a sum of thicknesses of the second substrate and the supporting substrate is substantially equal to that of the stamper or the first substrate.

20. The manufacturing method according to claim 1, wherein said bonding of the stamper and the second substrate comprises rotating the stamper to spread the radiation cured resin substantially uniformly, and said rotating is performed under a lower pressure than during said emitting of the radiation.

21. A method of manufacturing an optical information recording medium, said manufacturing method comprising:
bonding a stamper having a principal plane formed with a groove or asperity pits and a first substrate having a first information recording layer with radiation cured resin so as to cause the groove or the asperity pits to face to the first information recording layer, the stamper being transparent, and the groove or the asperity pits having a thin film formed thereon;
emitting radiation so as to pass at least a part of the radiation through the stamper to cure the radiation cured resin;
peeling off the stamper to form the groove or the asperity pits on the first information recording layer of the first substrate;
forming a metal film or a recording film over the groove or the asperity pits on the first substrate to create a second information recording layer on the first substrate; and
forming a light transmission layer over the second information recording layer.

22. The manufacturing method according to claim 21, wherein a thickness of the light transmission layers is 0.3 mm or less.

23. The manufacturing method according to claim 21, wherein a thickness of the light transmission layer is substantially 0.1 mm.

24. The manufacturing method according to claim 21, wherein the light transmission layer is made of radiation cured resin.

25. The manufacturing method according to claim 21, wherein said forming of the light transmission layer comprises bonding the first substrate to a second substrate.

26. The manufacturing method according to claim 21, wherein the stamper is formed by injection molding.

27. The manufacturing method according to claim 21, wherein the stamper is made of resin.

28. The manufacturing method according to claim 21, wherein said bonding of the stamper and the first substrate comprises rotating the stamper and the first substrate integrated by the radiation cured resin to spread the radiation cured resin substantially uniformly.

29. The manufacturing method according to claim 21, wherein said bonding of the stamper and the first substrate comprises
applying the radiation cured resin substantially uniformly on a part or whole of a bonding plane of at least one of the stamper and the first substrate, and
bonding the first substrate and the stamper in a vacuum.

30. The manufacturing method according to claim 21, further comprising applying a release agent to the asperity pits of the stamper.

31. The manufacturing method according to claim 21, further comprising forming a thin film on the groove or the asperity pits of the stamper.

32. The manufacturing method according to claims 31, wherein the thin film is made of metal or semimetal.

33. The manufacturing method according to claim 32, wherein the semimetal is silicon metal mainly composed of silicon.

34. The manufacturing method according to claim 31, wherein the thin film is made electric.

35. The manufacturing method according to claim 31, wherein said applying of the thin film comprises applying the thin film with a release agent thereon.

36. The manufacturing method according to claim 21, wherein said emitting of the radiation comprises emitting the radiation substantially parallel to the principal plane of the stamper.

37. The manufacturing method according to claim 21, wherein a thickness at a clamp portion is substantially 1.2 mm.

38. The manufacturing method according to claim 21, wherein a thickness of the stamper is substantially equal to a thickness of the first substrate.

39. The manufacturing method according to claims 21, wherein each of the stamper and the first substrate has a center hole, and the center holes of the stamper and the first substrate have substantially same diameters.

40. The manufacturing method according to claim 21, wherein the stamper and the first substrate have different outer diameters.

41. The manufacturing method according to claim 21, wherein said bonding of the stamper and the first substrate comprises rotating the stamper to spread the radiation cured resin substantially uniformly, and said rotating is performed under a lower pressure than during said emitting of the radiation.

42. An optical information recording medium manufactured by said manufacturing method according to claim 21.

43. A method of manufacturing an optical information recording medium, said manufacturing method comprising:
applying first radiation cured resin onto a groove or asperity pits formed on a principal plane of a stamper, the groove or the asperity pits having a thin film formed thereon;
bonding the stamper and a first substrate having a principal plane on which a first information recording layer is formed with second radiation cured resin such that the first radiation cured resin and the first information recording layer face each other, and curing the second radiation cured resin by emitting radiation so as to pass at least a part of the radiation through the stamper to cure the second radiation cured resin;

peeling off the stamper to form a groove or asperity pits made of the first radiation cured resin on the first substrate; and forming a reflective film or a recording film on the groove or the asperity pits on the first substrate to make a second information recording layer.

44. The manufacturing method according to claim 43, further comprising applying third radiation cured resin on the first information recording layer of the first substrate prior to said bonding of the stamper and the first substrate advance, and curing the third radiation cured resin.

45. The manufacturing method according to claim 44, wherein the third radiation cured resin has a pencil hardness of B.

46. The manufacturing method according to claim 44, wherein said applying of the third radiation cured resin comprises applying the radiation cured resin at least from an inner peripheral edge to an outer peripheral edge of the first information recording layer.

47. The manufacturing method according to claim 40, further comprising forming a light transmission layer on the second information recording layer.

48. The manufacturing method according to claim 47, wherein a thickness of the fight transmission layer is 0.3 mm or less.

49. The manufacturing method according to claim 48, wherein a thickness of the light transmission layer is substantially 0.1 mm.

50. The manufacturing method according to claim 47, wherein the light transmission layer is made of radiation cured resin.

51. The manufacturing method according to claim 47, wherein the light transmission layer comprises radiation cured resin and a resin substrate.

52. The manufacturing method according to claim 43, wherein the stamper transmits at least a part of radiation that has a wavelength capable of curing the first or second radiation cured resin, the at least part of the radiation being emitted through the stamper to cure the first or second radiation cured resin.

53. The manufacturing method according to claim 43, wherein the stamper is made of resin.

54. The manufacturing method according to claim 53, wherein the stamper is formed by injection molding.

55. The manufacturing method according to claim 53, wherein the stamper is made of polycarbonate.

56. The manufacturing method according to claim 43, wherein said bonding of the stamper and the first substrate comprises rotating the stamper and the first substrate integrated by the second radiation cured resin to spread the second radiation cured resin substantially uniformly.

57. The manufacturing method according to claim 43, wherein said bonding of the stamper and the first substrate comprises, applying the second radiation cured resin substantially uniformly on at least a part of at least one of the stamper and the first substrate, and bonding the first substrate and the stamper in a vacuum.

58. The manufacturing method according to claim 43, wherein an inner diameter of the first radiation cured resin is equal to or smaller than an inner diameter of the second radiation cured resin.

59. The manufacturing method according to claim 43, wherein said applying of the first radiation cured resin comprises applying the first radiation cure resin toward an outer peripheral edge of the stamper.

60. The manufacturing method according to claim 43, further comprising applying a process for facilitating release of the stamper from the first radiation cure resin to the groove or the asperity pits of the stamper.

61. The manufacturing method according to claim 60, wherein said applying of the process comprises applying a release agent to the groove or the asperity pits of the stamper.

62. The manufacturing method according to claim 60, wherein said applying of the process comprising forming a film mainly formed from metal or a dielectric film on the groove or the asperity pits of the stamper.

63. The manufacturing method according to claim 43, wherein each of the stamper and the first substrate has a center hole, and the center holes of the stamper and the first substrate are substantially equal to each other in diameter.

64. The manufacturing method according to claims 43, wherein said bonding of the stamper and the first substrate comprises rotating the stamper to spread the second radiation cured resin substantially uniformly, and said rotating is performed under a lower pressure than during said curing of the second radiation cure resin.

65. An optical information recording medium manufactured by said manufacturing method according to claim 43.

66. A method of manufacturing an optical information recording medium, said manufacturing method comprising:

applying second radiation cured resin onto a first information recording layer formed on a principal plane of a first substrate, and curing the second radiation cured resin;

bonding a stamper having a principal plane formed with a groove or asperity pits and the first substrate with first radiation cured resin such that the groove or asperity pits and the second radiation cured resin face each other, the groove or the asperity pits having a thin film formed thereon and curing the first radiation cured resin by emitting radiation so as to pass at least a part of the radiation through the stamper to cure the first radiation cured resin;

peeling off the stamper to form a groove or asperity pits made of the first radiation cured resin on the first substrate; and forming a reflective film or a recording film on the groove or the asperity pits on the first substrate to make a second information recording layer.

67. The manufacturing method according to claim 66, wherein said bonding of the stamper and the first substrate comprises rotating the stamper and the first substrate integrated by the first radiation cured resin to spread the first radiation cured resin substantially uniformly.

68. The manufacturing method according to claim 66, wherein said bonding of the stamper and the first substrate comprises, applying the first radiation cured resin substantially uniformly on at least a part of at least one of the stamper and the first substrate, and bonding the first substrate and the stamper in a vacuum.

69. The manufacturing method according to claim 66, wherein an inner diameter of the second radiation cured resin is equal to or smaller than an inner diameter of the first radiation cured resin.

70. The manufacturing method according to claim 66, wherein said applying of the second radiation cured resin comprises applying the second radiation cure resin toward an outer peripheral edge of the first substrate.

71. The manufacturing method according to claim 66, further comprising applying third radiation cured resin on the first information recording layer of the first substrate prior to said bonding of the stamper and the first substrate, and curing the third radiation cured resin.

72. The manufacturing method according to claims 71, wherein the third radiation cured resin has a pencil hardness of B.

73. The manufacturing method according to claim 71, wherein said applying of the third radiation cured resin comprises applying the third radiation cured resin at least from an inner peripheral edge to an outer peripheral edge of the first information recording layer.

74. The manufacturing method according to claim 66, further comprising forming a light transmission layer on the second information recording layer.

75. The manufacturing method according to claim 74, wherein a thickness of the light transmission layer is 0.3 mm or less.

76. The manufacturing method according to claim 75, wherein a thickness of the light transmission layer is substantially 0.1 mm.

77. The manufacturing method according to claim 74, wherein the light transmission layer is made of radiation cured resin.

78. The manufacturing method according to claim 74, wherein the light transmission layer comprises radiation cured resin and a resin substrate.

79. The manufacturing method according to claim 60, wherein the stamper is made of resin.

80. The manufacturing method according to claim 79, wherein the stamper is formed by injection molding.

81. The manufacturing method according to claim 79, wherein the stamper is made of polycarbonate.

82. The manufacturing method according to claim 66, wherein each of the stamper and the first substrate has a center hole, and the center holes of the stamper and the first substrate are substantially equal to each other in diameter.

83. The manufacturing method according to claim 66, wherein the stamper transmits at least a part of radiation that has a wavelength capable of curing the first or second radiation cured resin, the at least part of the radiation being emitted through the stamper to cure the first or second radiation cured resin.

84. The manufacturing method according to claim 66, further comprising applying a process for facilitating release of the stamper from the first radiation cured resin to the groove or the asperity pits of the stamper.

85. The manufacturing method according to claim 84, wherein said applying of the process comprises applying a release agent to the groove or the asperity pits of the stamper.

86. The manufacturing method according to claim 84, wherein said applying of the process comprises forming a film mainly formed from metal or a dielectric film on the groove or the asperity pits of the stamper.

87. The manufacturing method according to claim 66, wherein said bonding of the stamper and the first substrate comprises rotating the stamper to spread the first radiation cured resin substantially uniformly, and said rotating is performed under a lower pressure than during said curing.

88. An optical information recording medium manufactured by said manufacturing method according to claim 66.

89. A method of manufacturing an optical information recording medium, said manufacturing method comprising:
applying first radiation cured resin onto a groove or asperity pits formed on a principal plane of a stamper, the groove or asperity pits having a thin film formed thereon;
applying second radiation cured resin onto a first information recording layer formed on a principal plane of a first substrate;
bonding the stamper and the first substrate such that the first radiation cured resin and the second radiation cured resin face each other, and curing the first and second radiation cured resins by emitting radiation so as to pass at least a part of the radiation through the stamper to cure the first and second radiation cured resins;
peeling off the stamper to form a groove or asperity pits made of the first radiation cured resin on the first substrate; and
forming a reflective film or a recording film over the groove or the asperity pits on the first substrate to form a second information recording layer.

90. The manufacturing method according to claim 89, wherein said bonding of the stamper and the first substrate comprises placing and bonding the stamper and the first substrate together in a vacuum.

91. The manufacturing method according to claim 89, wherein said bonding of the stamper and the first substrate comprises rotating the stamper to spread the second radiation cured resin substantially uniformly, and said rotating is performed under a lower pressure than during said curing of the first and second radiation cure resins.

92. The manufacturing method according to claim 89, further comprising applying third radiation cured resin on the first information recording layer of the first substrate prior to said bonding of the stamper and the first substrate, and curing the third radiation cured resin.

93. The manufacturing method according to claim 92, wherein the third radiation cured resin has a pencil hardness of B.

94. The manufacturing method according to claim 92, wherein said applying of the third radiation cured resin comprising applying the third radiation cured resin at least from an inner peripheral edge to an outer peripheral edge of the first information recording layer.

95. The manufacturing method according to claim 89, further comprising forming a light transmission layer on the second information recording layer.

96. The manufacturing method according to claim 95, wherein a thickness of the light transmission layer is 0.3 mm or less.

97. The manufacturing method according to claim 96, wherein a thickness of the light transmission layer is substantially 0.1 mm.

98. The manufacturing method according to claim 95, wherein the light transmission layer is made of radiation cured resin.

99. The manufacturing method according to claim 95, wherein the light transmission layer comprises radiation cured resin and a resin substrate.

100. The manufacturing method according to claim 89, wherein the stamper is made of resin.

101. The manufacturing method according to claim 100, wherein the stamper is formed by injection molding.

102. The manufacturing method according to claim 100, wherein the stamper is made of polycarbonate.

103. The manufacturing method according to claim 89, wherein each of the stamper and the first substrate has a center hole, and the center holes of the stamper and the first substrate are substantially equal to each other in diameter.

104. The manufacturing method according to claim 89, wherein the stamper transmits at least a part of radiation that has a wavelength capable of curing the first or second radiation cured resin, the at least part of the radiation being emitted through the stamper to cure the first or second radiation cure resin.

105. The manufacturing method according to claim 89, further comprising applying a process for facilitating release of the stamper from the first radiation cure resin to the groove or the asperity pits of the stamper.

106. The manufacturing method according to claim 105, wherein said applying of the process comprises applying a release agent to the groove or the asperity pits of the stamper.

107. The manufacturing method according to claim 105, wherein said applying of the process comprises forming a film mainly formed from metal or a dielectric film on the groove or the asperity pits of the stamper.

108. The manufacturing method according to claim 89, wherein said applying of the first radiation cured resin comprises applying the first radiation cure resin toward an outer peripheral edge of the stamper.

109. The manufacturing method according to claim 89, wherein said applying of the second radiation cured resin comprises applying the second radiation cure resin toward an outer peripheral edge of the first substrate.

110. An optical information recording medium manufactured by said manufacturing method according to claim 89.

111. A method of manufacturing an optical information recording medium, said manufacturing method comprising:
forming a first thin film comprising at least one layer on a groove or asperity pits formed on a principal plane of a stamper;
forming a second thin film comprising at least one layer over the first thin film;
bonding the stamper and a first substrate having a principal plane on which a first information recording layer is formed with radiation cured resin such that the second thin film and the first information recording layer face each other;
peeling off the stamper and the first substrate at an interface of the first and second thin films to form a groove or asperity pits made of the second thin film on the first substrate; and
forming a reflective film or recording film on the groove or the asperity pits on the first substrate to form a second information recording layer.

112. The manufacturing method according to claim 111, wherein the stamper and the first and second thin films transmit at least a part of radiation that has a wavelength capable of curing the radiation cured resin.

113. The manufacturing method according to claim 111, wherein said bonding of the stamper and the first substrate comprises rotating the stamper and the first substrate integrated by the radiation cured resin to spread the radiation cured resin substantially uniformly.

114. The manufacturing method according to claim 111, wherein said bonding of the stamper and the first substrate comprises
applying the radiation cured resin substantially uniformly onto at least a part of a bonding plane of at least one of the stamper and the first substrate, and
bonding the first substrate and the stamper in a vacuum.

115. The manufacturing method according to claim 111, wherein inner diameters of the first and second thin films are equal to or smaller than an inner diameter of the radiation cured resin.

116. The manufacturing method according to claim 111, wherein said forming of the first and second thin films comprises forming the first and second thin films to an outer peripheral edge of the stamper.

117. The manufacturing method according to claim 111, wherein the first thin film is made of Au and the second thin film is formed of $SiO_2$.

118. The manufacturing method according to claims 111, further comprising applying third radiation cured resin on the first information recording layer of the first substrate prior to said bonding of the stamper and the first substrate, and curing the third radiation cured resin.

119. The manufacturing method according to claim 118, wherein the third radiation cured resin has a pencil hardness of B.

120. The manufacturing method according to claim 118, wherein said applying of the third radiation cured resin comprises applying the third radiation cured resin at least from an inner peripheral edge to an outer peripheral edge of the first information recording layer.

121. The manufacturing method according to claim 111, further comprising forming a light transmission layer on the second information recording layer.

122. The manufacturing method according to claim 121, wherein a thickness of the light transmission layer is 0.3 mm or less.

123. The manufacturing method according to claim 122, wherein a thickness of the light transmission layer is substantially 0.1 mm.

124. The manufacturing method according to claim 121, wherein the light transmission layer is made of radiation cured resin.

125. The manufacturing method according to claim 121, wherein the light transmission layer comprises radiation cured resin and a resin substrate.

126. The manufacturing method according to claim 111, wherein the stamper is made of resin.

127. The manufacturing method according to claim 126, wherein the stamper is formed by injection molding.

128. The manufacturing method according to claim 126, wherein the stamper is made of polycarbonate.

129. The manufacturing method according to claim 111, wherein each of the stamper and the first substrate has a center hole, and the center holes of the stamper and the first substrate are substantially equal to each other in diameter.

130. The manufacturing method according to claim 111, wherein said bonding of the stamper and the first substrate comprises rotating the stamper to spread the radiation cured resin substantially uniformly, and said rotating is performed under a lower pressure than during curing.

131. An optical information recording medium manufactured by said manufacturing method according to claim 111.

* * * * *

UNITED STATES PATENT AND TRADEMARK OFFICE
CERTIFICATE OF CORRECTION

PATENT NO. : 6,743,320 B2
DATED : June 1, 2004
INVENTOR(S) : Kazuya Hisada et al.

It is certified that error appears in the above-identified patent and that said Letters Patent is hereby corrected as shown below:

Drawings,
Add the following text -- 206 UV LIGHT -- to the third downward pointing arrow from the right in Fig. 4C.

Column 29,
Line 57, change "layers" to -- layer --.

Column 30,
Line 23, change "claims" to -- claim --.
Line 26, after "silicon" insert -- of --.
Line 29, change "electric" to -- of dielectric --.
Line 43, change "claims" to -- claim --.

Column 31,
Line 14, delete "advance".
Line 26, change "fight" to -- light --.

Column 32,
Line 18, change "claims" to -- claim --.

Column 33,
Line 5, change "claims" to -- claim --.
Line 28, change "60" to -- 66 --.

Column 36,
Line 13, change "claims" to -- claim --.

Signed and Sealed this

Twenty-eighth Day of September, 2004

JON W. DUDAS
*Director of the United States Patent and Trademark Office*